United States Patent
Oh et al.

(10) Patent No.: US 9,686,655 B2
(45) Date of Patent: Jun. 20, 2017

(54) APPARATUS AND METHOD FOR TRANSMITTING SIGNAL IN COMMUNICATION SYSTEM

(75) Inventors: Seong Keun Oh, Gyeonggi-do (KR); Min Lee, Gyeonggi-do (KR)

(73) Assignee: AJOU UNIVERSITY INDUSTRY COOPERATION FOUNDATION, Gyeonggi-Do (KR)

( * ) Notice: Subject to any disclaimer, the term of this patent is extended or adjusted under 35 U.S.C. 154(b) by 632 days.

(21) Appl. No.: 13/810,172

(22) PCT Filed: Jul. 14, 2011

(86) PCT No.: PCT/KR2011/005186
§ 371 (c)(1),
(2), (4) Date: Jan. 14, 2013

(87) PCT Pub. No.: WO2012/008771
PCT Pub. Date: Jan. 19, 2012

(65) Prior Publication Data
US 2013/0107791 A1    May 2, 2013

(30) Foreign Application Priority Data
Jul. 14, 2010  (KR) .......................... 10-2010-0068063

(51) Int. Cl.
H04W 4/08      (2009.01)
H04B 7/0452    (2017.01)
(Continued)

(52) U.S. Cl.
CPC ............ H04W 4/08 (2013.01); H04B 7/0452 (2013.01); H04B 7/0697 (2013.01); H04W 72/121 (2013.01)

(58) Field of Classification Search
CPC ......... H03F 3/211; G08C 17/02; G04C 23/00; G01S 13/878; H03G 3/348; H03G 3/3042;
(Continued)

(56) References Cited

U.S. PATENT DOCUMENTS

| 7,483,719 B2 | 1/2009 | Kim et al. ................. 455/562.1 |
| 7,675,988 B2 | 3/2010 | Kim et al. ..................... 375/267 |

(Continued)

FOREIGN PATENT DOCUMENTS

| KR | 10-2005-0046306 | 5/2005 | ............... H04B 7/02 |
| KR | 10-2005-0122143 | 12/2005 | ............... H04B 7/02 |
| KR | 10-2006-0005683 | 1/2006 | ............... H04B 7/04 |

OTHER PUBLICATIONS

International Search Report (ISR) in PCT/KR2011/005186 dated Feb. 6, 2012.
(Continued)

Primary Examiner — Alpus H Hsu
Assistant Examiner — Dharmesh Patel
(74) Attorney, Agent, or Firm — Harness, Dickey & Pierce, P.L.C.

(57) ABSTRACT

Provided are an apparatus and method for grouping multiple user data and transmitting the grouped data in a multiple antenna system. According to the method, a plurality of user groups are configured, and at least one antenna group is assigned to the plurality of user groups. Then, user signals for each user group are combined using at least one user multiplexing method to generate a user group signal, and a plurality of user group signals are combined using at least one group multiplexing method. Then, the combined user group signal is transmitted to a plurality of users belonging to the plurality of user groups using the at least one antenna group.

19 Claims, 45 Drawing Sheets

(51) Int. Cl.
*H04B 7/06* (2006.01)
*H04W 72/12* (2009.01)

(58) Field of Classification Search
CPC ........ H04B 1/48; H04B 1/0483; H04B 1/707;
H04B 1/712; H04B 1/7107; H04B
1/7115; H04B 1/7117; H04B 7/216;
H04B 7/0413; H04M 1/725; H04M
1/72502; H04M 1/72505; H04J 13/00;
H04J 13/16; H04J 411/0003; H04L 1/06;
H04L 1/0003; H04L 1/0618; H04L
5/0007; H04L 5/0023; H04L 7/0008;
H04L 12/189; H04L 12/185; H04L
12/403; H04L 43/50; H04L 12/2697;
H04L 43/0852; H04Q 1/288; H04Q
11/0478; H04N 5/4401; H04N 21/2365;
H04N 21/2368; H04N 21/4341; H04N
21/4347; H04W 4/06; H04W 8/26; H04W
16/10; H04W 16/01
USPC ....... 370/252, 312, 319, 320, 329, 334, 335,
370/431, 464, 537; 455/13.3, 63.1, 103,
455/452.1, 462, 500; 375/148, 257, 267
See application file for complete search history.

(56) References Cited

U.S. PATENT DOCUMENTS

| | | | | |
|---|---|---|---|---|
| 2008/0056414 | A1* | 3/2008 | Kim | ...................... H04B 7/063 375/347 |
| 2008/0125051 | A1* | 5/2008 | Kim | ...................... H04B 7/0452 455/67.13 |
| 2008/0192683 | A1* | 8/2008 | Han et al. | ...................... 370/329 |
| 2011/0070913 | A1* | 3/2011 | Zhang | ................... H04B 7/0452 455/509 |

OTHER PUBLICATIONS

Costa, M. (1983) "Writing on dirty paper." *IEEE Trans. Inform. Theory*, vol. IT-29(3):439-441.

Kawakami, et al. (2005) "Electrically Steerable Passive Array Radiator (ESPAR) Antennas." *IEEE Antennas and Propagation Magazine*, vol. 47(2):43-49.

Lee, et al. (2007) "A per-user successive MMSE precoding technique in multiuser MIMO systems." *in Proc. IEEE VTC2007—Spring*, Dublin, Ireland, pp. 2374-2378.

Spencer, et al. (2004) "Zero-forcing methods for downlink spatial multiplexing in multiuser MIMO channels." *IEEE Trans. Signal Processing*, vol. 52(2):461-471.

Stankovic, et al. (2004) "Multi-user MIMO downlink precoding for users with multiple antennas." *in Proc. 12th Wireless World Research Forum (WWRF)*, Toronto, ON, Canada (6 pages).

Stankovic, et al. (2005) "Successive optimization Tomlinson-Harashima precoding (SO THP) for multi-user MIMO system." *Acoustics, Speech, and Signal Processing, 2005. Proceedings. (ICASSP '05). IEEE International Conference on* Mar. 18-23, 2005, Philadelphia, PA, vol. 3:III-1117-III-1120.

Svantesson, et al. (2001) "High-Resolution Direction Finding Using a Switched Parasitic Antenna." *In Proc. IEEE SSP 2001*, Singapore, (4 pages).

* cited by examiner

APPARATUS AND METHOD FOR TRANSMITTING SIGNAL IN COMMUNICATION SYSTEM

CROSS-REFERENCE TO RELATED APPLICATIONS

This application is a national phase application of PCT Application No. PCT/KR2011/005186, filed on Jul. 14, 2011, which claims the benefit and priority to Korean Patent Application No. 10-2010-0068063, filed Jul. 14, 2010. The entire disclosures of the applications identified in this paragraph are incorporated herein by references.

FIELD

The following description relates to an apparatus and method for transmitting signals in a communication system, and more particularly, to an apparatus and method for grouping multiple user signals and transmitting the grouped signal in a communication system.

BACKGROUND

In general, a wireless channel environment shows a lower reliability than a wired channel environment, due to multi-path propagation, shadowing, wave attenuation, time-varying noise, inter-cell interference, etc. These are the major causes of a low data transmission speed, that is, a low data rate in wireless communication. Accordingly, in order to implement a high-speed wireless environment providing a high data rate, there is the greatest need to remove the causes.

As technology for removing the causes, a Multiple-Input Multiple-Output (MIMO) system has been proposed. The MIMO system is a representative example of a multiple antenna system. The MIMO system has an advantage in that it can increase the system performance without supplying additional power and spectrum.

Generally, a multiple antenna system supports a single user mode (hereinafter, referred to as a "SU mode") and a multi user mode (hereinafter, referred to as a "MU mode").

A multiple antenna system that supports the SU mode transmits signals to the same user through a plurality of transmission antennas, and a multiple antenna system that supports the MU mode transmits signals to a plurality of users through a plurality of transmission antennas.

The multiple antenna system that supports the MU mode has been proposed, in order to provide more improved performance than the multiple antenna system that supports the SU mode, while minimizing the number of antennas and complexity in hardware configuration. Also, the MU mode is focused on increasing a system transmission capacity using Spatial Division Multiple Access (SDMA) scheduling.

Meanwhile, communication systems have adopted various multiplexing schemes in order to increase frequency efficiency. Representative examples of such multiplexing schemes are code division multiplexing, frequency division multiplexing, time division multiplexing, etc.

The code division multiplexing is a spread-spectrum technology of spreading a signal to be sent to a wider frequency band than the corresponding frequency band. That is, in the code division multiplexing, digitalized data is divided into several frames, and the respective frames are transmitted in correspondence to codes.

The frequency division multiplexing is a method of segmenting the frequency band of a communication medium into a plurality of narrower frequency bands and simultaneously transmitting the segmented frequency bands. In this case, a receiving party can filter a desired frequency component and restore it.

The time division multiplexing is a method of transmitting signals with time differences over a single transmission path. In the time division multiplexing, time is partitioned into basic time durations called time slots, the time slots are combined into a predetermined size of frame, and each time slot is allocated to a specific location on a frame for each channel.

However, the multiple antenna system requires a method of transmitting signals using a radio resource flexibly while increasing frequency efficiency when transmitting a plurality of independent user signals through a single radio resource. Also, a method of flexibly adjusting transmission factors so that all users' requirements can be maximally satisfied in various transmission environments is needed.

Technical Problem

The present invention provides an apparatus and method for efficiently transmitting signals using a limited radio resource in a communication system, and a system supporting the apparatus and method.

The present invention also provides an apparatus and method for separately performing user multiplexing on user signals for each user group and group multiplexing on user group signals in a communication system, and a system supporting the apparatus and method.

The present invention also provides an apparatus and method for combining user signals for each user group using a user multiplexing method, combining user group signals combined for individual user groups using a group multiplexing method, and transmitting the combined user group signal in a communication system, and a system supporting the apparatus and method.

The present invention also provides a method of grouping users into a plurality of user groups for the purposes of transmission through the efficient use of resources, multi-casting, channel-adaptive transmission, transmission differentiation among groups, spatial division transmission among groups, etc. in a communication system.

The present invention also provides a method of enabling a plurality of user groups to share at least one antenna group or to mutually exclusively use antenna groups in a communication system.

The present invention also provides a method of multiplexing user signals for each user group using at least one user multiplexing method among power division multiplexing, code division multiplexing, and spatial division multiplexing in a communication system.

The present invention also provides a method of multiplexing user group signals multiplexed for individual user groups using at least one group multiplexing method among power division multiplexing, code division multiplexing, and spatial division multiplexing in a communication system.

Technical Solution

According to an aspect, there is provided a communication method of simultaneously transmitting a plurality of signals to a plurality of user groups using at least one antenna group in a communication system, including: assigning the at least one antenna group to the plurality of user groups; generating a user group signal by combining user signals for each user group using at least one user multiplexing method; combining a plurality of user group signals using at least one group multiplexing method; and transmitting the combined user group signal to a plurality of users belonging to the plurality of user groups using the at least one antenna group. The communication method further comprises configuring the plurality of user groups.

In configuring the plurality of user groups, each user group is configured to include at least one user of the plurality of users for the purpose of at least one transmission through the efficient use of resources, multicasting, channel-adaptive transmission, spatial division transmission among groups, and transmission differentiation among groups, and in the transmission differentiation among the groups, at least one among a Received Signal Strength Indicator (RSSI), a Signal-to-Noise Ratio (SNR), a Signal-to-Interference plus Noise Ratio (SINR), an error rate, a channel capacity, a providable data rate, the variance of a providable data rate, an outage rate, the correlation among user channels, the correlation among antennas, a channel rank, channel quality factors for individual streams, the use of channel quality information, and the use of channel state information, according to channel conditions; Quality-of-Service (QoS), a traffic class, and a location, according to service conditions; the cost, the terminal capability, and a security level, according to user conditions; and a transmission method, a user multiplexing method, a group multiplexing method, group combining codes, group combining weight vectors, antenna groups, the transmission power, layer priorities, modulation parameters, and coding parameters, according to transmission conditions is differentiated among the plurality of user groups and transmitted.

The plurality of user groups are configured such that the plurality of user groups are different from each other in terms of at least one of channel condition factors, service condition factors, user condition factors, and transmission condition factors, and such that a plurality of users included in the same user group among the plurality of user groups are identical to each other in terms of at least one of channel condition factors, service condition factors, user condition factors, and transmission condition factors.

The channel condition factors include quality factors related to channel characteristics, quality factors related to spatial characteristics, and the use of channel information; the quality factors related to channel characteristics include a RSSI, a SNR, a SINR, an error rate, a channel capacity, a providable data rate, the variance of a providable data rate, and an outage rate; the quality factors related to spatial characteristics include the correlation among user channels, the correlation among antennas, a rank of a channel matrix, and channel quality factors for each stream; the use of channel information includes the use of channel quality information and the use of channel state information; the service condition factors include QoS, a traffic class, and a location; the user condition factors include the cost, the terminal capability, and a security level; and the transmission condition factors include a transmission method, a user multiplexing method, a group multiplexing method, a group combining weight vector, an antenna group, the transmission power, layer priorities, modulation parameters, and coding parameters; and the transmission methods include a duplexing method, a multiplexing method, a multiple access method, a modulation method, a channel coding method, and a Multiple-Input Multiple-Output (MIMO) transmission method.

The assigning of the at least one antenna group includes assigning the at least one antenna group such that at least two user groups of the plurality of user groups share at least one antenna group, or such that at least one antenna group is independently assigned to each of all or a part of the plurality of user groups.

The generating of the user group signal includes combining a plurality of user signals for each user group using at least one user multiplexing method among a power division multiplexing method, a code division multiplexing method, and a spatial division multiplexing method.

The combining of the plurality of user group signals includes combining a plurality of user group signals, each user group signal to which a plurality of user signals have been combined, using at least one group multiplexing method among a power division multiplexing method, a code division multiplexing method, and a spatial division multiplexing method.

At least one user group signal of the plurality of user group signals is generated by combining at least two user group signals, and the spatial division multiplexing method is one of a pre-coding method, a dirty-paper coding (DPC) method, a spatial multiplexing method, a beamforming method, an antenna selection method, a transmit diversity method, and an antenna group division method.

Transmission factors for each antenna are used independently over a plurality of antennas, or at least one of transmission factors for each antenna is used over a plurality of antennas in common, in order to simultaneously transmit a plurality of signals to the plurality of user groups using the at least one antenna group, and the transmission factors for each antenna are at least one among the number of users for each antenna, the number of layers for each antenna, layer priorities for each antenna, a data rate of each antenna, the data rate of each user signal for each antenna, the transmission power of each antenna, the transmission power of each user signal for each antenna, modulation parameters of each user signal for each antenna, and coding parameters of each user signal for each antenna.

In the generating of the user group signal, at least one of transmission factors for each user signal is used independently over a plurality of user signals, or at least one of transmission factors for each user signal is used over a plurality of user signals in common.

The transmission factors for each user signal are at least one among a data rate for each user signal, an antenna data rate for each user signal, an antenna group for each user signal, the number of antennas for each user signal, the transmission power for each user signal, the antenna transmission power for each user signal, modulation parameters for each user signal, and coding parameters for each user signal.

In the combining of the plurality of user group signals, at least one of transmission factors for each user group signal is used independently over a plurality of user group signals, or at least one of transmission factors for each user group signal is used over a plurality of user group signals in common.

The transmission factors for each user group signal are at least one among a data rate for each user group signal, an antenna group for each user group signal, the transmission power for each user group signal, a transmission method for each user group signal, a user multiplexing method for each user group signal, a group multiplexing method for each user group signal, a group combining code for each user group signal, a group combining weight vector for each user group signal, layer priorities for each user group signal, modulation parameters for each user group signal, and coding parameters for each user group signal.

According to another aspect, there is provided a communication apparatus of simultaneously transmitting a plurality of signals to a plurality of user groups using at least one antenna group in a communication system, including: a transmitting apparatus configured to assign at least one antenna group to a plurality of user groups, to generate a user group signal by combining user signals for each user group using at least one user multiplexing method, to combine a plurality of user group signals using at least one group multiplexing method, and to transmit the combined user group signal to a plurality of users belonging to the plurality of user groups using the at least one antenna group.

The transmitting apparatus configures the plurality of user groups such that each user group includes at least one user of the plurality of users for the purpose of at least one among transmission through the efficient use of resources, multi-casting, channel-adaptive transmission, spatial division transmission among groups, and transmission differentiation among groups, and in the transmission differentiation among the groups, at least one of a RSSI, a SNR, a SINR, an error rate, a channel capacity, a providable data rate, the variance of a providable data rate, an outage rate, the correlation among user channels, the correlation among antennas, a channel rank, channel quality factors for individual streams, the use of channel quality information, and the use of channel state information, according to channel conditions; QoS, a traffic class, and a location, according to service conditions; the cost, the terminal capability, and a security level, according to user conditions; and a transmission method, a user multiplexing method, a group multiplexing method, group combining codes, group combining weight vectors, antenna groups, the transmission power, layer priorities, modulation parameters, and coding parameters, according to transmission conditions is differentiated among the plurality of user groups and transmitted.

The transmitting apparatus configures the plurality of user groups such that the plurality of user groups are different from each other in terms of at least one of channel condition factors, service condition factors, user condition factors, and transmission condition factors, and such that a plurality of users included in the same user group among the plurality of user groups are identical to each other in terms of at least one of channel condition factors, service condition factors, user condition factors, and transmission condition factors.

The channel condition factors include quality factors related to channel characteristics, quality factors related to spatial characteristics, and the use of channel information; the quality factors related to channel characteristics include a RSSI, a SNR, a SINR, an error rate, a channel capacity, a providable data rate, the variance of a providable data rate, and an outage rate; the quality factors related to spatial characteristics include the correlation among user channels, the correlation among antennas, a rank of a channel matrix, and channel quality factors for each stream; the use of channel information includes the use of channel quality information and the use of channel state information; the service condition factors include QoS, a traffic class, and a location; the user condition factors include the cost, the terminal capability, and a security level; and the transmission condition factors include a transmission method, a user multiplexing method, a group multiplexing method, a group combining weight vector, an antenna group, the transmission power, layer priorities, modulation parameters, and coding parameters; and the transmission methods include a duplexing method, a multiplexing method, a multiple access method, a modulation method, a channel coding method, and a MIMO transmission method.

The transmitting apparatus assigns the at least one antenna group such that at least two user groups of the plurality of user groups share at least one antenna group, or such that at least one antenna group is independently assigned to each of all or a part of the plurality of user groups.

A plurality of user signals for each user group independently use at least one antenna group assigned to the user group.

The transmitting apparatus generates the user group signal by combining a plurality of user signals for each user group using at least one user multiplexing method among a power division multiplexing method, a code division multiplexing method, and a spatial division multiplexing method, and the transmitting apparatus combines the plurality of user group signals using at least one group multiplexing method of the power division multiplexing method, the code division multiplexing method, and the spatial division multiplexing method.

At least one user group signal of the plurality of user group signals is generated by combining at least two user group signals.

The spatial division multiplexing method is one of a pre-coding method, a DPC method, a spatial multiplexing method, a beamforming method, an antenna selection method, a transmit diversity method, and an antenna group division method.

The transmitting apparatus uses independently transmission factors for each antenna over a plurality of antennas, or uses at least one of transmission factors for each antenna over a plurality of antennas in common, and the transmission factors for each antenna are at least one among the number of users for each antenna, the number of layers for each antenna, layer priorities for each antenna, a data rate of each antenna, the data rate of each user signal for each antenna, the transmission power of each antenna, the transmission power of each user signal for each antenna, modulation parameters of each user signal for each antenna, and coding parameters of each user signal for each antenna.

The transmitting apparatus uses independently at least one of transmission factors for each user signal over a plurality of user signals, or uses at least one of transmission factors for each user signal over a plurality of user signals in common, and the transmission factors for each user signal are at least one among a data rate for each user signal, an antenna data rate for each user signal, an antenna group for each user signal, the number of antennas for each user signal, the transmission power for each user signal, the antenna transmission power for each user signal, modulation parameters for each user signal, and coding parameters for each user signal.

The transmitting apparatus uses independently at least one of transmission factors for each user group signal over a plurality of user group signals, or uses at least one of transmission factors for each user group signal over a plurality of user group signals in common, and the transmission factors for each user group signal are at least one among a data rate for each user group signal, an antenna group for each user group signal, the transmission power for each user group signal, a transmission method for each user group signal, a user multiplexing method for each user group signal, a group multiplexing method for each user group signal, a group combining code for each user group signal, a group combining weight vector for each user group signal, layer priorities for each user group signal, modulation parameters for each user group signal, and coding parameters for each user group signal.

Advantageous Effects

The communication apparatus according to the embodiment of the present invention can efficiently use resources by simultaneously transmitting a plurality of independent user signals using at least two methods of power division, code division, and spatial division.

Since the communication apparatus according to the embodiment of the present invention can simultaneously provide independent services to a plurality of user groups each including a plurality of specific users while providing communication services to the user groups using a group multiplexing method, the communication apparatus can efficiently provide a multi-cast service. Also, since the communication apparatus can transmit independent user signals to users belonging to each user group, the communication apparatus can efficiently provide services required by individual users.

The communication apparatus according to the embodiment of the present invention configures at least two user groups according to the characteristics of channel states so as to maintain signal quality even at cell boundaries through adaptive transmission and transmit reliable signals to the user groups.

The communication apparatus according to the embodiment of the present invention configures at least two user groups based on a RSSI, a SNR, a SINR, an error rate, a channel capacity, a providable data rate, variance of a providable data rate, an outage rate, correlation among user channels, correlation among antennas, a channel rank, channel quality factors for individual streams, use of channel quality information, use of channel state information, QoS, a traffic class, a location, cost, terminal capability, a security level, a transmission method, a user multiplexing method, a group multiplexing method, a group combining code, a group combining weight vector, an antenna group, the transmission power, layer priorities, modulation parameters, and coding parameters, and performs group multiplexing, thereby allowing transmission differentiation among groups.

The communication apparatus according to the embodiment of the present invention configures at least two user groups according to the spatial locations of users and performs group multiplexing, thereby allowing spatial division transmission among groups.

The communication apparatus according to the embodiment of the present invention combines a plurality of user signals using various multiplexing methods and simultaneously transmits the combined signal through a single radio resource, thereby accommodating a plurality of users using a small capacity of radio resource, resulting in a significantly increase of a cell capacity.

Figure 1:
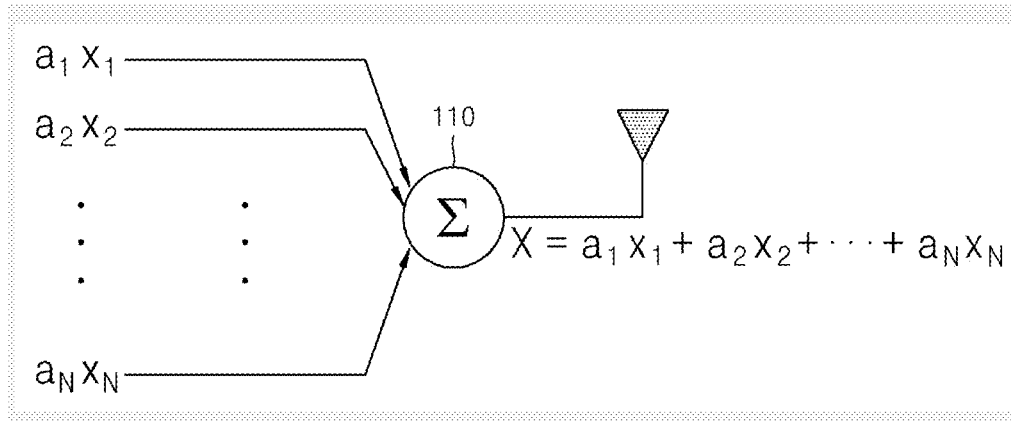
FIG. 1 is a view for explaining the concept of a power division multiplexing method which is one of user multiplexing methods according to embodiments of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

Hereinafter, embodiments of the present invention are described with reference to the accompanying drawings. It should be understood that the detailed description for related well-known functions and configurations is not provided in order not to make the spirit of the present invention unclear in describing the present invention. The following terms are defined in consideration of functions of the present invention and may be changed according to users or operator's intentions or customs. Thus, the terms shall be defined based on the contents described throughout the specification.

According to embodiments of the present invention, which will be described below, at least one antenna group is assigned to a plurality of user groups, user signals of each user group are combined using at least one user multiplexing method, and the combined user signals corresponding to the individual user groups are combined using at least one group multiplexing method, so that a plurality of signals are simultaneously transmitted to the plurality of user groups using the at least one antenna group.

According to an embodiment of the present invention, in order to simultaneously transmit a plurality of signals to a plurality of user groups using at least one antenna group, a plurality of user groups are configured.

Also, according to an embodiment of the present invention, a plurality of user groups consisting of a plurality of users are configured for the purposes of transmission through the efficient use of resources, multicasting, channel-adaptive transmission, transmission differentiation among groups, etc. Accordingly, each user group consists of at least one user.

Also, according to an embodiment of the present invention, when a plurality of user groups are configured, for transmission differentiation among the user groups, at least one of a Received Signal Strength Indicator (RSSI), a Signal-to-Noise Ratio (SNR), a Signal-to-Interference plus Noise Ratio (SINR), an error rate, a channel capacity, a providable data rate, variance of a providable data rate, an outage rate, correlation among user channels, correlation among antennas, a channel rank, channel quality factors for individual streams, use of channel quality information, and use of channel state information according to channel conditions; Quality-of-Service (QoS), a traffic class, and a location according to service conditions; cost, terminal capability, and a security level according to user conditions; a transmission method, a user multiplexing method, a group multiplexing method, group combining codes, group combining weight vectors, antenna groups, the transmission power, layer priorities, modulation parameters, and coding parameters according to transmission conditions is differentiated among the user groups and transmitted.

Also, according to an embodiment of the present invention, at least one antenna group is assigned to at least two of the plurality of user groups such that the two user groups share the antenna group, or at least one antenna group which is mutually exclusively used is assigned to all or a part of the two user groups. Here, each antenna group is configured to include at least one antenna. A plurality of antenna groups are configured to share at least one antenna, or each of the plurality of antenna groups is configured to include at least one antenna that is mutually exclusively used.

Also, according to an embodiment of the present invention, a "user multiplexing method" in which a plurality of independent user signals of a user group are combined and simultaneously transmitted using at least one antenna group is used.

The user multiplexing method includes a power division multiplexing method, a code division multiplexing method, a spatial division multiplexing method, etc. The spatial division multiplexing method for user multiplexing includes pre-coding, dirty-paper coding (DPC), spatial multiplexing, beamforming, antenna selection, antenna group division, transmit diversity, etc.

One user multiplexing method of the power division multiplexing method, the code division multiplexing method, and the spatial division multiplexing method is used to simultaneously transmit a plurality of independent signals to at least two users. At this time, the individual user groups may use user multiplexing methods independently. That is, the plurality of user groups may use the same user multiplexing method to combine user signals of each user group, or the plurality of user groups may use two or more user multiplexing methods at the same time to combine user signals of each user group.

Also, the plurality of user groups may use different user multiplexing methods, respectively, to combine user signals of each user group.

However, if a certain user group is configured with a single user, the user group is not subject to user multiplexing.

Also, according to an embodiment of the present invention, a "group multiplexing method" in which a plurality of independent user signals corresponding to a plurality of user groups are combined and simultaneously transmitted using at least one antenna group is used.

The group multiplexing method includes a power division multiplexing method, a code division multiplexing method, a spatial division multiplexing method, etc. The spatial division multiplexing method for group multiplexing includes pre-coding, beamforming, antenna selection, antenna group division, etc.

Also, according to an embodiment of the present invention, in order to simultaneously transmit a plurality of independent user group signals to a plurality of user groups, one group multiplexing method of the power division multiplexing method, the code division multiplexing method, and the spatial division multiplexing method can be used, or two or more group multiplexing methods can be used at the same time.

Meanwhile, according to an embodiment of the present invention, by combining a plurality of user group signals using at least one group multiplexing method, a plurality of user groups can be configured as an upper user group. Also, by grouping the upper user group with at least another user group (or another upper user group), a second upper user group can be configured. The user groups configuring the upper user group or the second upper user groups can be independently subject to group multiplexing or/and user multiplexing.

In addition, according to an embodiment of the present invention, at least two methods of the power division multiplexing method, the code division multiplexing method, and the spatial division multiplexing method can be used to simultaneously transmit a plurality of signals to the plurality of user groups.

If user multiplexing and/or group multiplexing is performed using the power division multiplexing method when signals are transmitted to a plurality of user groups using at least one antenna group, at least one among the number of users, the number of layers, layer priorities, user groups, the transmission power, a data rate, coding parameters, and modulation parameters can be used independently in each antenna group.

Also, when at least two antenna groups are used, a multiple antenna transmission method can be used to transmit a user signal to at least one user belonging to each user group. The multiple antenna transmission method includes a spatial multiplexing method, a Space-Time Coding (STC) method, a transmit diversity method, etc. Also, when signals are transmitted to a plurality of user groups using at least two antenna groups, by combining a user group signal combined by at least one multiple antenna transmission method with at least another user group signal using at least one group multiplexing method, a plurality of signals can be simultaneously transmitted.

For implementing the embodiments of the present invention, as described above, user groups will be defined, and a method of configuring the user groups, user multiplexing methods, and group multiplexing methods will be described in detail, below. Also, combinations of the user multiplexing methods and the group multiplexing methods will be described in detail, below.

A. User Group

According to an embodiment of the present invention, when a plurality of signals are simultaneously transmitted to a plurality of user groups, it is characterized that the plurality of user groups are different from each other in terms of at least one of channel conditions, service conditions, user conditions, and transmission conditions among the user groups. Also, it is characterized that a plurality of users belonging to the same user group are identical to each other in terms of at least one of channel conditions, service conditions, user conditions, and transmission conditions among the users.

The above-mentioned terms can be described as follows.

Channel conditions: channel conditions may be classified into quality factors related to channel characteristics, quality factors related to spatial characteristics, and methods of using channel information.

The quality factors related to channel characteristics may include fading, path fading, shadowing, delay spread, multipath, home-cell interference, inter-cell interference, doppler, and antenna gain, which are channel characteristics, and a RSSI, a SNR, a SINR, an error rate, a channel capacity, a providable data rate, variance of a providable data rate, and an outage rate, which are decided by channel allocation, etc. Also, factors related to channel characteristics may be used as quality factors related to channel characteristics.

RSSI is an index indicating received signal strength measured at a receiving terminal.

SNR is a signal-to-noise ratio, and is an index indicating a ratio of signal power with respect to noise power.

SINR is a signal-to-interference noise ratio, and is an index indicating a ratio of signal power with respect to interference and noise power.

Error rate is the generation probability of errors upon signal transmission, and includes a Bit Error Rate (BER), a Block Error Rate (BLER), a Frame Error Rate (FER), a Packet Error Rate (PER), etc.

Channel capacity is a maximum amount of data that can be transmitted without errors through the corresponding channel.

Providable data rate is a data rate at which data can be actually transmitted in consideration of channel characteristic factors, and the proviable data rate may be represented in the form of an instantaneous data rate or an average data rate, and includes a total data rate, a data rate for each user, a data rate for each stream, etc.

Variance of a providable data rate is an index indicating a degree of change of a providable data rate according to channel characteristics.

Outage rate is the probability of communication outage that may occur when the quality of a channel is lower than predetermined communication outage criteria, and the communication outage criteria include a RSSI, a SNR, a SINR, an error rate, a channel capacity, a providable data rate, etc. For example, if the communication outage criteria is set to a SNR of 0 dB, a user's outage rate is decided according to a probability at which the user experiences a channel whose SNR is lower than 0 dB.

2) Quality factors related to spatial characteristics are quality factors for considering spatial characteristics in addition to quality factors related to channel characteristics when signals are transmitted to a plurality of user groups using multiple antennas, and the quality factors related to spatial characteristics include correlation among user channels, correlation among antennas, the rank of a channel matrix, a channel quality factor for each stream, etc. Also, factors related to spatial characteristics may be used as channel quality factors related to spatial characteristics.

Correlation among user channels is an index indicating the degree of similarity in channel characteristics among user channels, and if the correlation among user channels is high, there will be performance deterioration upon spatial division transmission to multiple users due to the similarity of channel characteristics.

Correlation among antennas is an index indicating the degree of similarity in channel characteristics among channels formed through a plurality of antennas when a receiving user device uses the plurality of antennas, and if the correlation among antennas us high, there will be performance deterioration upon spatial division transmission to multiple antennas due to the similarity of channel characteristics among antennas.

Rank of a channel matrix is an index indicating the number of data streams to be independently usable through a matrix channel formed among a transmitter and a receiver.

Channel quality factor for each stream represents the strength of each stream belonging to the number of data streams to be independently usable through a matrix channel formed among a transmitter and a receiver, and the channel quality factor for each stream includes a RSSI, a SNR, a SINR, an error rate, a channel capacity, a providable data rate, variance of a providable data rate, an outage rate, etc.

Methods of using channel information are classified into a method of using channel quality information and a method of using channel state information, according to channel information which a transmitter uses to transmit a plurality of user signals, as follows.

If a transmitter uses only channel quality information without using channel state information, all methods corresponding to open-loop transmission may be used to transmit signals. The open-loop transmission includes power division transmission, code division transmission, spatial multiplexing, beamforming, transmit diversity, antenna selection, antenna group division, etc.

If a transmitter uses channel state information, all methods corresponding to closed-loop transmission may be used to transmit signals. The closed-loop transmission includes DPC, Interference Alignment (IA), pre-coding, beamforming, etc.

Service Conditions: Service conditions relate to services required by users, and include QoS, a traffic class, a location, etc. Also, factors related to services may be used as service conditions.

QoS includes a required data rate, packet loss, delay, etc. about a service required by each user.

Traffic class is the kind of a service required by each user, and includes a large file, a voice call, a video call, video streaming, web browsing, a game, etc.

Location is a location at which each user is located, and includes a specific place, such as a hospital, a school, a police station, etc., or a user's coordinates in a cell, etc.

User conditions: user conditions are conditions related to a user who uses a service, and include cost, terminal capability, a security level, etc. Also, factors related to a user may be used as user conditions.

Cost is a service charge, and includes a user's requested price, a user's rate plan, etc.

Terminal capability is the performance of a terminal which each user possesses, and includes the number of antennas, processing power, a memory capacity, a signal processing speed, etc.

Security level is a security class requested by each user, and may be set stepwisely from zero class requiring no security.

Transmission conditions: transmission conditions are conditions related to signal transmission, and include transmission methods, user multiplexing methods, group multiplexing methods, group combining codes, group combining weight vectors, an antenna group, the transmission power, layer priorities, modulation parameters, coding parameters, etc. Also, factors related to signal transmission may be used as transmission conditions.

Transmission methods are methods of transmitting a single user signal, and include duplexing methods (Frequency Division Duplex (FDD), Time Division Duplex (TDD), Code Division Duplex (CDD), etc.), multiplexing methods (Frequency Division Multiplexing (FDM), Orthogonal Frequency Division Multiplexing (OFDM), Code Division Multiplexing (CDM), Time Division Multiplexing (TDM), Spatial Division Multiplexing (SDM), etc.), multiple access methods (Frequency Division Multiple Access (FDMA), Orthogonal Frequency Division Multiple Access (OFDMA), Code Division Multiple Access (CDMA), Time Division Multiple Access (TDMA), Spatial Division Multiple Access (SDMA), etc.), modulation methods (QAM, PAM, PSK, etc.), channel coding methods (LDPC, Turbo code, Convolution code, etc.), MIMO transmission methods (spatial multiplexing transmission, STC transmission, transmit diversity, etc.), etc.

User multiplexing methods are methods of combining a plurality of user signals, and include power division user multiplexing, code division user multiplexing, spatial division user multiplexing, etc.

Group multiplexing methods are methods of combining user group signals, and include power division group multiplexing, code division group multiplexing, spatial division group multiplexing, etc.

Group combining codes are individual user groups' unique codes that are used to combine groups when group multiplexing is performed through code division group multiplexing.

Group combining weight vectors are individual user groups' unique weight vectors that are used to combine groups when group multiplexing is performed through spatial division group multiplexing.

Antenna group is an antenna group that is allocated to transmit a user/group signal.

Transmission power is the transmission power that is allocated to transmit a user/group signal.

Layer priorities are the layer priorities of individual user signals when multiplexing is performed through power division multiplexing.

Modulation parameters are parameters according to a modulation method that is applied to a user/group signal.

Coding parameters are parameters according to a channel coding method that is applied to a user/group signal.

Now, an embodiment in which two user groups are configured will be described. However, the embodiment which will be described below can be applied to the case where three or more user groups are configured, and also at least two user groups can be configured to have at least two different condition factors.

If user groups are configured using the SNR among the channel conditions, users having a higher SNR (or a higher SINR) can be configured as a first user group, and users having a lower SNR (or a lower SINR) can be configured as a second user group, thereby configuring two user groups having different SNRs (or SINRs).

If user groups are configured using the correlation among user channels among the channel conditions, users having similar correlations among channels can be configured as a first user group, and users having similar correlation among user channels while having high correlation among channels with the first user group can be configured as a second user group, thereby configuring two user groups having high correlations among user channels.

Also, if user groups are configured using the QoS among the service conditions, users requiring a high data rate can be configured as a first user group, and users requiring a low data rate can be configured as a second user group, thereby configuring two user groups having different QoSs.

Also, if user groups are configured using the traffic class among the service conditions, users requiring a voice call service can be configured as a first user group, and users requiring a web browsing service can be configured as a second user group, thereby configuring two user groups having different traffic classes.

Also, if user groups are configured using the location among the service conditions, users located at a hospital can be configured as a first user group, and users located at a school can be configured as a second user group, thereby configuring two user groups located at different locations.

Also, if user groups are configured using the rate system among the user conditions, users who have subscribed to a higher rate system can be configured as a first user group, and users who have subscribed to a lower rate system can be configured as a second user group, thereby configuring two user groups that have subscribed to different rate systems.

Also, if user groups are configured using the terminal capability among the user conditions, users who possess new models of terminals can be configured as a first user group, and users who possess old models of terminals can be configured as a second user group, thereby configuring two user groups having different terminal capabilities.

Also, if user groups are configured using the security level among the user conditions, users requiring a higher security level can be configured as a first user group, and users requiring a lower security level can be configured as a second user group, thereby configuring two user groups having different security levels.

Also, if user groups are configured using the transmission method among the transmission conditions, users using the STC transmission method can be configured as a first user group, and users using the spatial multiplexing transmission method can be configured as a second user group, thereby configuring two user groups using different transmission methods.

Also, if user groups are configured using the antenna group among the transmission conditions, users using a first antenna group can be configured as a first user group, and users using a second antenna group can be configured as a second user group, thereby configuring two user groups using different antenna groups.

B. Methods of Configuring User Groups

According to embodiments of the present invention, when a plurality of signals are simultaneously transmitted to a plurality of user groups, at least two users are configured as a plurality of user groups each consisting of at least one user, for the purposes of transmission through the efficient use of resources, multicasting, channel-adaptive transmission, transmission services differentiation among groups, spatial division transmission among groups, etc.

First, when user groups are configured for transmission through the efficient use of resources, at least two user groups each consisting of at least one user are configured in order to simultaneously transmit a plurality of signals using a single radio resource.

Second, when user groups are configured for multicasting, at least two user groups each consisting of at least one user are configured in order to provide a multicasting service.

Third, when user groups are configured for channel-adaptive transmission, at least two user groups are configured in such a manner to group at least one user to a single user group according to the characteristics of a channel state for channel-adaptive transmission.

Fourth, when user groups are configured for transmission differentiation among groups, at least two user groups are configured in such a manner to group at least one user having similarity in terms of at least one of a RSSI, a SNR, a SINR, an error rate, a channel capacity, a providable data rate, variance of a providable data rate, an outage rate, correlation among user channels, correlation among antennas, a channel rank, a channel quality factor for each stream, use of channel quality information, and use of channel state information, according to channel conditions, to a group, for transmission differentiation among groups. Also, for transmission differentiation among groups, at least two user groups are configured in such a manner to group at least one user having similarity in terms of at least one of QoS, a traffic class, and a location according to service conditions, to a user group.

Also, for transmission differentiation among groups, at least two user groups are configured in such a manner to group at least one user having similarity in terms of at least one of cost, terminal capability, and a security level according to user conditions, to a group.

Also, for transmission differentiation among groups, at least two user groups are configured in such a manner to group at least one user having similarity in terms of at least one of a transmission method, a user multiplexing method, a group multiplexing method, group combining codes, group combining weight vectors, antenna groups, the transmission power, layer priorities, modulation parameters, and coding parameters according to transmission conditions, to a user group.

Fifth, when user groups are configured for spatial division transmission among groups, at least two user groups are configured in such a manner to group at least one user having similar spatial locations to a user group for spatial division transmission among groups.

Also, a plurality of user groups are configured in such a manner to group at least one user existing in the same sector in a communication area sectorized for spatial division transmission among groups, to a user group.

Also, a plurality of user groups are configured in such a manner to group at least one user at a spatial location to which a service can be provided using the same beam through beamforming for spatial division transmission among groups, to a user group.

C. User Multiplexing Methods

According to embodiments of the present invention, user multiplexing methods that can be applied to combine a plurality of independent user signals in a user group and simultaneously transmit the combined user signal using at least one antenna group can be defined as follows.

Power division user multiplexing method: by differentially allocating powers to individual user signals, a plurality of user signals are multiplexed and transmitted through power division among users.

Code division user multiplexing method: by allocating unique user combining codes to individual user signals, a plurality of user signals are multiplexed and transmitted through code division among users.

Spatial division user multiplexing method: by assigning unique user combining weight vectors to individual user signals, a plurality of user signals are multiplexed and transmitted through spatial division among users.

Hereinafter, the user multiplexing methods defined above will be described in more detail.

First, the power division user multiplexing method will be described with reference to FIGS. 1, 2, and 3. FIG. 1 is a view for explaining the concept of a power division user multiplexing method according to an embodiment of the present invention.

Referring to FIG. 1, the power division user multiplexing method is a method of differentially allocating powers to a plurality of independent user signals x1, x2, . . . , xN to overlap the plurality of independent user signals x1, x2, . . . , xN and transmit the overlapping user signal through a radio source. Particularly, the power division user multiplexing method is a multiplexing method of adjusting coupling coefficients a1, a2, . . . , aN through transmission power division according to a channel state to transmit signals in multiple layers so that individual receivers separate received signals through successive interference cancellation (SIC) & decoding.

If user indexes are denoted by a first user, a second user, a third user, etc. in the descending order of channel gain for power division user multiplexing transmission, the transmission power that is allocated to the individual users' signals can be defined as equation 1, below.

$$\text{user 1: } SNR_1 = \frac{|h_1|^2 P_1}{\sigma_n^2} \Rightarrow P_1 = \alpha_1 P_T = \frac{\sigma_n^2}{|h_1|^2} SNR_1 \quad \text{Equation (1)}$$

$$\text{user 2: } SNR_2 = \frac{|h_2|^2 P_2}{\sigma_n^2 + |h_2|^2 P_1} \Rightarrow P_2 = \alpha_2 P_T = \left[\frac{\sigma_n^2}{|h_2|^2} + P_1\right] SNR_2$$

$$\vdots \qquad \vdots \qquad \vdots$$

$$\text{user } i: SNR_i = \frac{|h_i|^2 P_i}{\sigma_n^2 + |h_i|^2 \sum_{j<i} P_j} \Rightarrow P_i = \alpha_i P_T = \left[\frac{\sigma_n^2}{|h_i|^2} + \sum_{j<i} P_j\right] SNR_i$$

PT: total transmission power
αi: ratio of power allocated to the signal of the user i with respect to the total transmission power PT
hi: channel gain between the transmitter and the user i
$\sigma_n^2$: variance of Additive White Gaussian Noise (AWGN)

Figure 2:
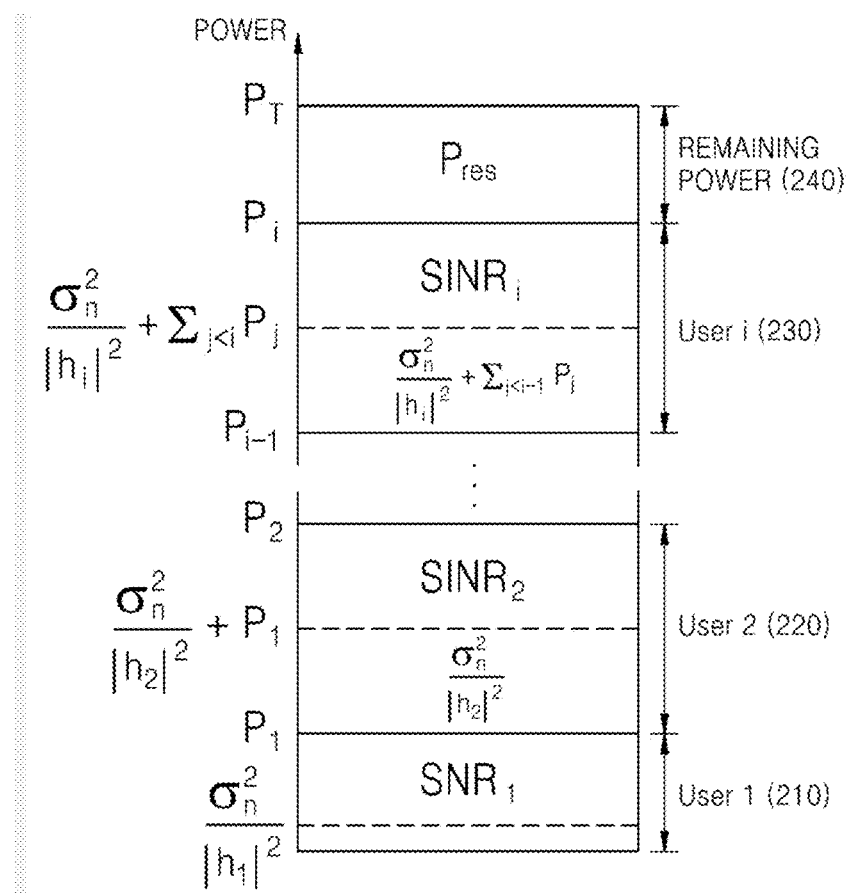
FIG. 2 is a view for explaining the concept of power allocation for the power division multiplexing method.

FIG. 2 is a view for explaining the concept of power allocation for the power division user multiplexing method. Referring to FIG. 2, transmission power P1 is allocated to the user 1 210, in consideration of effective noise $$\frac{\sigma_n^2}{|h_1|^2}$$

of the first user 210, in order to ensure SNR1 for the user 1 210, and transmission power P2 is allocated to the user 2 220, in consideration of effective noise $$\frac{\sigma_n^2}{|h_2|^2}$$

of the user 2 220 and the transmission power P1 of the user 1, which is interference to the user 2 220, in order to ensure SNR2 for the user 2 220. Also, transmission power Pi is allocated to the user i 230, in consideration of effective noise $$\frac{\sigma_n^2}{|h_2|^2}$$

of the user i 230 and a sum $\Sigma_{j<i} P_j$ of the preceding users' transmission power which is interference to the user i 230, in order to ensure SNRi for the user i 230. In this case, the remaining power Pres 240 is power resulting from subtracting a sum of the transmission power of the user 1 210 to the transmission power of the user i 230 from the total transmission power PT.

Figure 3:
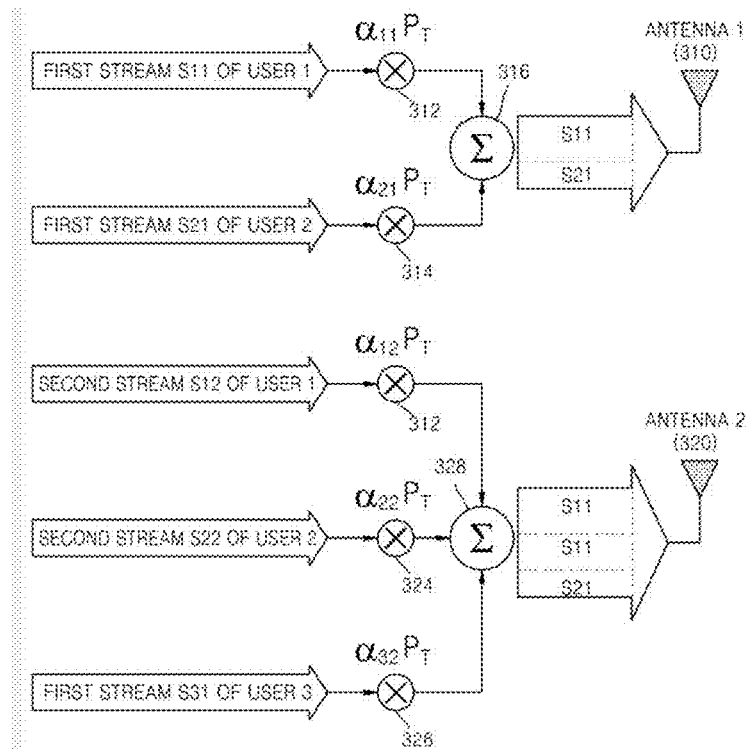
FIG. 3 is a view for explaining a power division user multiplexing method using multiple antennas, according to an embodiment of the present invention.

FIG. 3 is a view for explaining a method for user multiplexing through power division multiplexing using a multiple antenna group. In FIG. 3, signals subject to power division multiplexing are shown to be distinguished for individual layers according to user layer priorities, and the thickness of each user layer represents the amount of power allocated to the user.

Referring to FIG. 3, a first antenna 310 simultaneously transmits a first stream S11 of a first user and a first stream S21 of a second user through power divisions 312 and 314, and a second antenna 320 simultaneously transmits a second stream S12 of the first user, a second stream S22 of the second user, and a first stream S31 of a third user through power divisions 322, 324, and 326. At this time, the transmission power that is allocated to each user stream is calculated for each antenna in consideration of power ratio weights, using equation 2, below.

antenna 1  
Equation (2)

the first stream of the second user: $P_{21} =$ $$\alpha_{21} P_T = \frac{\sigma_n^2}{|h_{12}|^2} SINR_{21}$$

the first stream of the first user: $P_{11} =$ $$\alpha_{11} P_T = \left[ \frac{\sigma_n^2}{|h_{11}|^2} + P_{21} \right] SINR_{11}$$

antenna 2 second stream of the first user: $P_{12} =$ $$\alpha_{12} P_T = \frac{\sigma_n^2}{|h_{21}|^2} SINR_{12}$$

first stream of the third user: $P_{31} =$ $$\alpha_{32} P_T = \left[ \frac{\sigma_n^2}{|h_{23}|^2} + P_{12} \right] SINR_{31}$$

second stream of the second user: $P_{22} =$ $$\alpha_{22} P_T = \left[ \frac{\sigma_n^2}{|h_{22}|^2} + P_{12} + P_{22} \right] SINR_{22}$$

$\alpha_{ij}$: a ratio of power allocated to the i-th user's signal that is transmitted through an antenna j with respect to the total transmission power PT hmn: channel gain between the m-th antenna of the transmitter and the n-th user $P_{ij}$: transmission power allocated to the j-th stream of the i-th user $SNR_{ij}$ or $SINR_{ij}$: SNR or SINR required for the j-th stream of the i-th user By using the method described above, it is possible to perform user multiplexing through power division multiplexing when three antennas or more are used, and it is also possible to perform power division multiplexing when four users or more are multiplexed.

Second, a code division user multiplexing method will be described with reference to FIG. 4, below.

Figure 4:
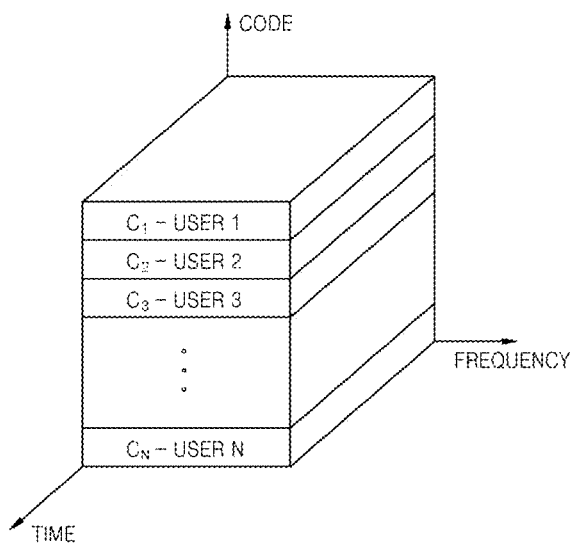
FIG. 4 is a view for explaining the concept of a code division multiplexing method according to an embodiment of the present invention.

The code division user multiplexing method is, as shown in FIG. 4, a method of allocating unique user combining codes C1, C2, . . . , CN to a plurality of signals to multiplex the plurality of signals through code division among users. Generally, by using unique user combining codes orthogonal to each other or having low correlation with each other, multiplexing transmission through code division among users is possible.

Referring to FIG. 4, by allocating unique user combining codes C1, C2, . . . , CN to N users, respectively, in such a manner to allocate the user combining code C1 to a user 1, the user combining code C2 to a user 2, and the user combining code C3 to a user 3, a plurality of signals are multiplexed and transmitted through code division among users.

Third, a spatial division multiplexing method will be described with reference to FIGS. 5, 6, and 7, below.

The spatial division multiplexing method is a method of assigning unique user combining weight vectors for spatially separating a plurality of independent signals to the signals and transmitting the signals.

Figure 5:
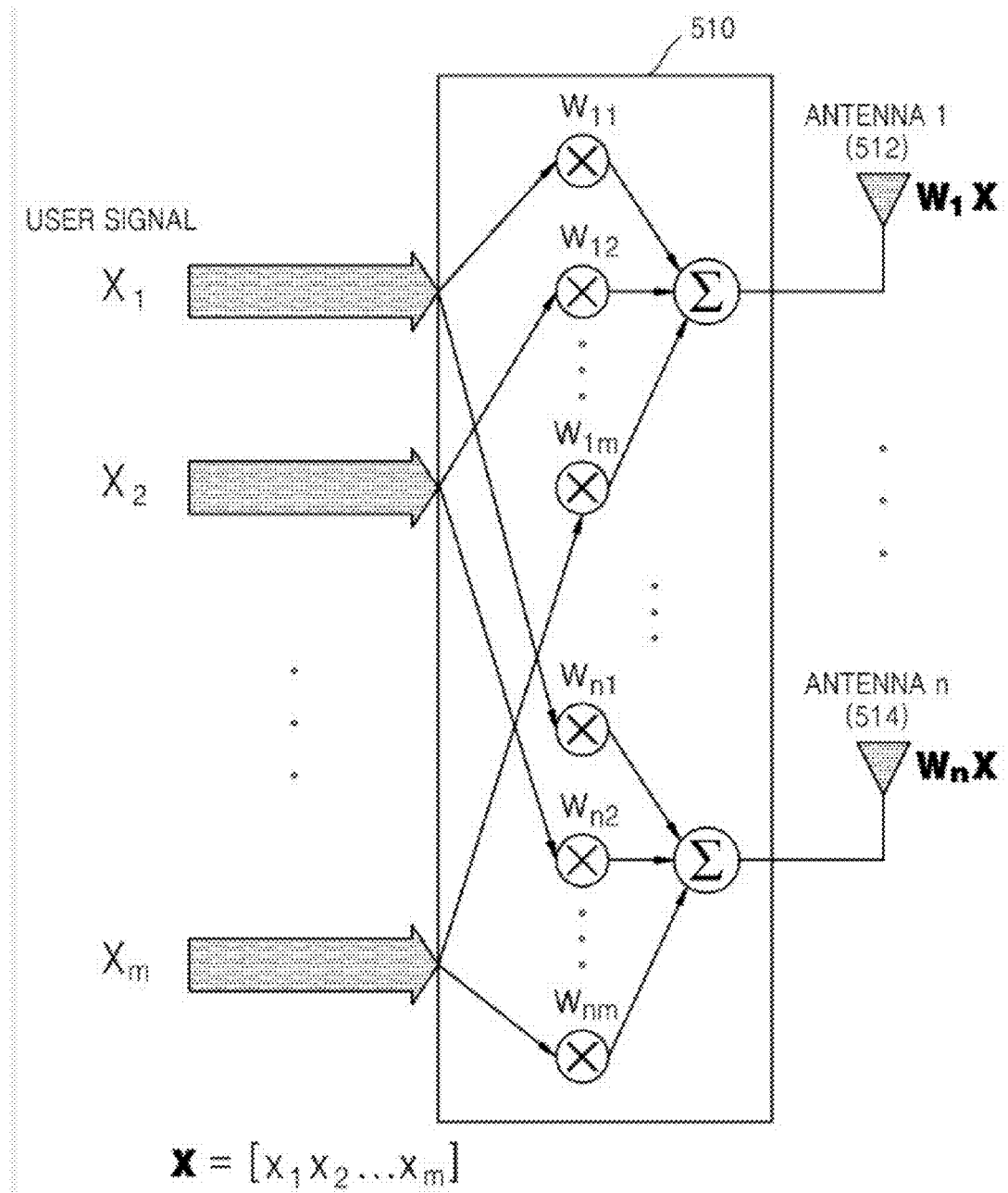
FIG. 5 is a view for explaining the concept of a spatial division user multiplexing method according to an embodiment of the present invention.

FIG. 5 is a view for explaining an example of multiplexing a plurality of independent signals using a spatial division user multiplexing method and transmitting the signals. In the current example, various spatial division multiplexing methods can be used according to a weight vector wi. The spatial division multiplexing method for user multiplexing includes pre-coding, DPC, beamforming, spatial multiplexing, antenna selection, antenna group division, transmit diversity, etc.

Referring to FIG. 5, when m user signals x1, x2, . . . , xm are transmitted by the spatial division multiplexing method, unique user combining weights w11, w12, . . . , w1m, . . . , wn1, wn2, . . . , wnm are allocated to the respective user signals x1, x2, . . . , xm, and user multiplexing 510 is performed so that the resultant signals are transmitted through individual antennas, wherein wij represents a weight vector allocated to the j-th signal xj that is transmitted through the i-th antenna, and wi represents a weight vector allocated to m user signals that are transmitted through the i-th antenna.

Also, by transmitting different user signals through respective beam spaces using an antenna, such as a switched parasitic antenna (SPA) and an electronically steerable passive array radiator (ESPAR) antenna, capable of forming a plurality of beam spaces, at least two user signals can be combined using a single antenna by a spatial division multiplexing method. Meanwhile, the spatial division multiplexing method includes pre-coding, DPC, beamforming, spatial multiplexing, antenna selection, etc.

The pre-coding is a method of assigning weight vectors to a plurality of user signals, respectively, in order to spatially separate the user signals using channel state information, and combining the plurality of user signals, in order to simultaneously transmit the user signals using at least one antenna.

A multiple user MIMO pre-coding method includes Zero-Forcing (ZF), Minimum Mean Square Error (MMSE), Block Diagonalization (BD), Successive MMSE (SMMSE), Per-User SMMSE (PU-SMMSE), Successive Optimization Tomlinson Harashima Pre-coding (SO-THP), etc. Meanwhile, details for the pre-coding have been disclosed in the following document.

BD: [Q. H. Spencer, A. L. Swindlehurst, and M. Haardt, "Zero-forcing methods for downlink spatial multiplexing in multi-user MIMO channels," IEEE Trans. Signal Processing, vol. 52, pp. 461-471, February 2004.]

SMMSE: [V. Stankovic and M Haardt, "Multi-user MIMO downlink precoding for users with multiple antennas," in Proc. 12th Wireless World Research Forum (WWRF), Toronto, ON, Canada, November 2004.]

PU-SMMSE: [M. Lee and S. K. Oh, "A per-user successive MMSE precoding technique in multiuser MIMO systems," in Proc. IEEE VTC2007-Spring, Dublin, Ireland, April 2007.]

SO-THP: [V. Stankovic and M. Haardt, "Successive optimization Tomlinson-Harashima precoding (SO THP) for multi-user MIMO system," in Proc. IFFF ICAAAP205, Philadelphia, Pa., March 2005.]

The DPC is a method of assigning weight vectors to a plurality of user signals, respectively, in consideration of channel state information and interference among signals, and combining the plurality of user signals, in order to simultaneously transmit the user signals using at least one antenna.

Details for the DPC have been disclosed in the following document.

[M. H. M. Costa, "Writing on dirty paper," IEEE Trans. Inform. Theory, vol. 29, no. 3, pp. 439-441, May 1983.]

The beamforming method is a method of assigning weight vectors to a plurality of user signals, respectively, such that each user signal is transmitted in a specific direction, and combining the plurality of signals, in order to simultaneously transmit the user signals using at least one antenna.

The spatial multiplexing method is a method of assigning weight vectors to a plurality of user signals, respectively, such that different user signals are respectively transmitted through a plurality of spaces formed through a single antenna, and combining at least two user signals, in order to simultaneously transmit the user signals using at least one antenna.

Figure 6:
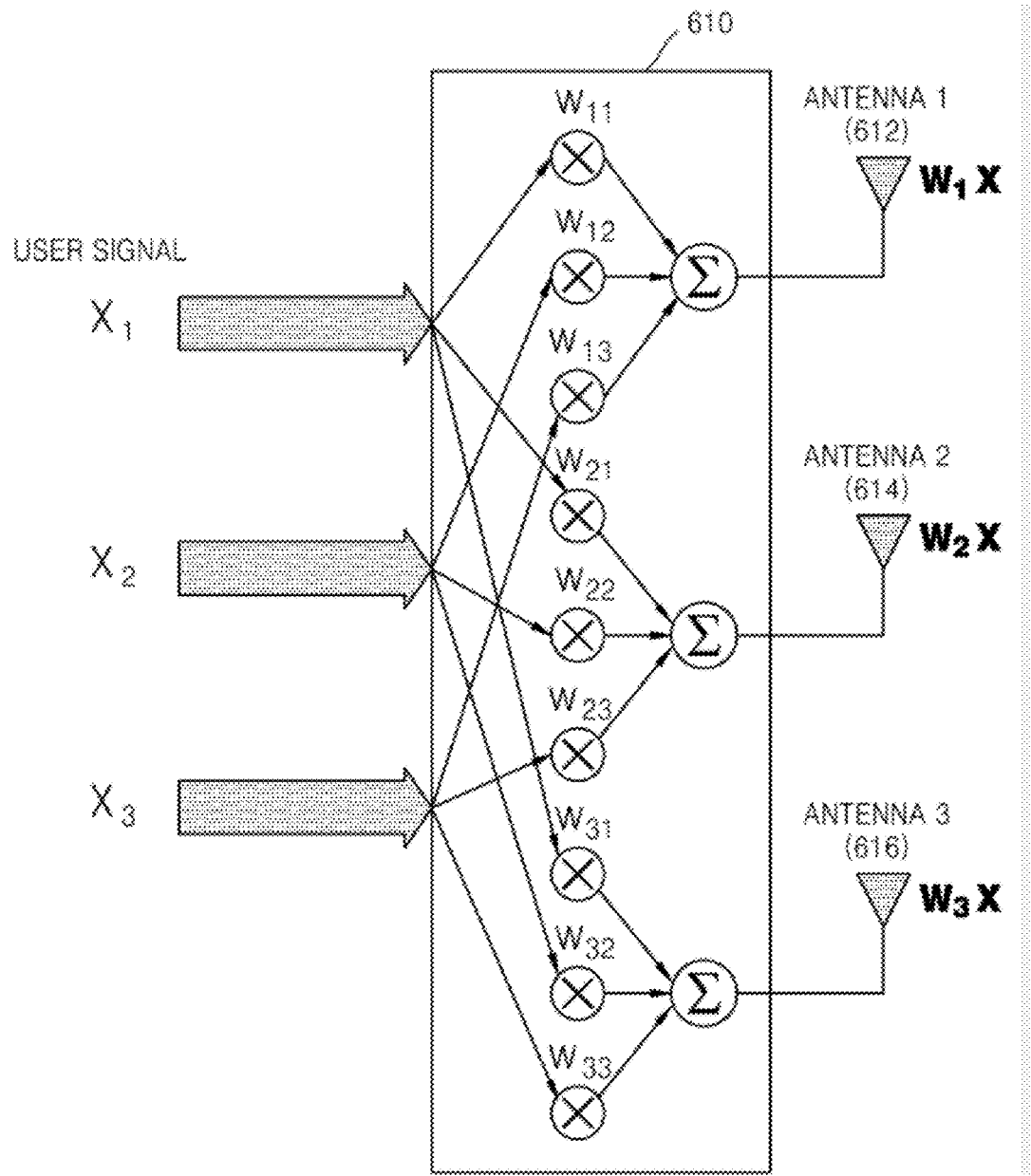
FIG. 6 is a view showing an example of a spatial multiplexing method according to an embodiment of the present invention.

FIG. 6 is a view showing an example of a spatial multiplexing method according to an embodiment of the present invention.

Referring to FIG. 6, when user signals of three users are subject to spatial division user multiplexing by the spatial multiplexing method and transmitted using three antennas 612, 614, and 616, the user signals are combined with a weight vector written by equation 3, below, and independently transmitted through the individual antennas.

$$W = \begin{bmatrix} w_{11} & w_{12} & w_{13} \\ w_{21} & w_{22} & w_{23} \\ w_{31} & w_{32} & w_{33} \end{bmatrix} = \begin{bmatrix} 0 & 1 & 0 \\ 1 & 0 & 0 \\ 0 & 0 & 1 \end{bmatrix} \quad \text{Equation (3)}$$

In the above equation 3, a weight wij is a weight allocated to the j-th signal that is transmitted through the i-th antenna.

When spatial division multiplexing through the spatial multiplexing method is performed using the equation 3, user signals x1, x2, and x3 that are transmitted through three antennas 612, 614, and 616 can be expressed as equation 4, below. That is, by transmitting the second user signal x2 through the first antenna 612, the first user signal x1 through the second antenna 614, and the third user signal x3 through the third antenna 616, the user signals x1, x2, and x3 of three users are simultaneously transmitted using the spatial multiplexing method.

$$Wx = \begin{bmatrix} w_{11} & w_{12} & w_{13} \\ w_{21} & w_{22} & w_{23} \\ w_{31} & w_{32} & w_{33} \end{bmatrix} \begin{bmatrix} x_1 \\ x_2 \\ x_3 \end{bmatrix} = \begin{bmatrix} 0 & 1 & 0 \\ 1 & 0 & 0 \\ 0 & 0 & 1 \end{bmatrix} \begin{bmatrix} x_1 \\ x_2 \\ x_3 \end{bmatrix} = \begin{bmatrix} x_2 \\ x_1 \\ x_3 \end{bmatrix} \quad \text{Equation (4)}$$

When a SPA or an ESPAR antenna is used, by transmitting a first user signal through a first beam space and transmitting a second user signal through a second beam space, two user signals are simultaneously transmitted through a spatial multiplexing method using the SPA or the ESPAR antenna.

Also, when a plurality of user signals are simultaneously transmitted using at least one antenna, a transmit diversity method of assigning weight vectors such that the same user signal is transmitted through a plurality of spaces formed through the at least one antenna is used to combine the plurality of user signals.

The antenna selection is a method of assigning weight vectors to a plurality of user signals, respectively, such that each user signal is selectively allocated at least one antenna, and combining the plurality of user signals in order to simultaneously transmit the user signals using a plurality of antennas.

Figure 7:
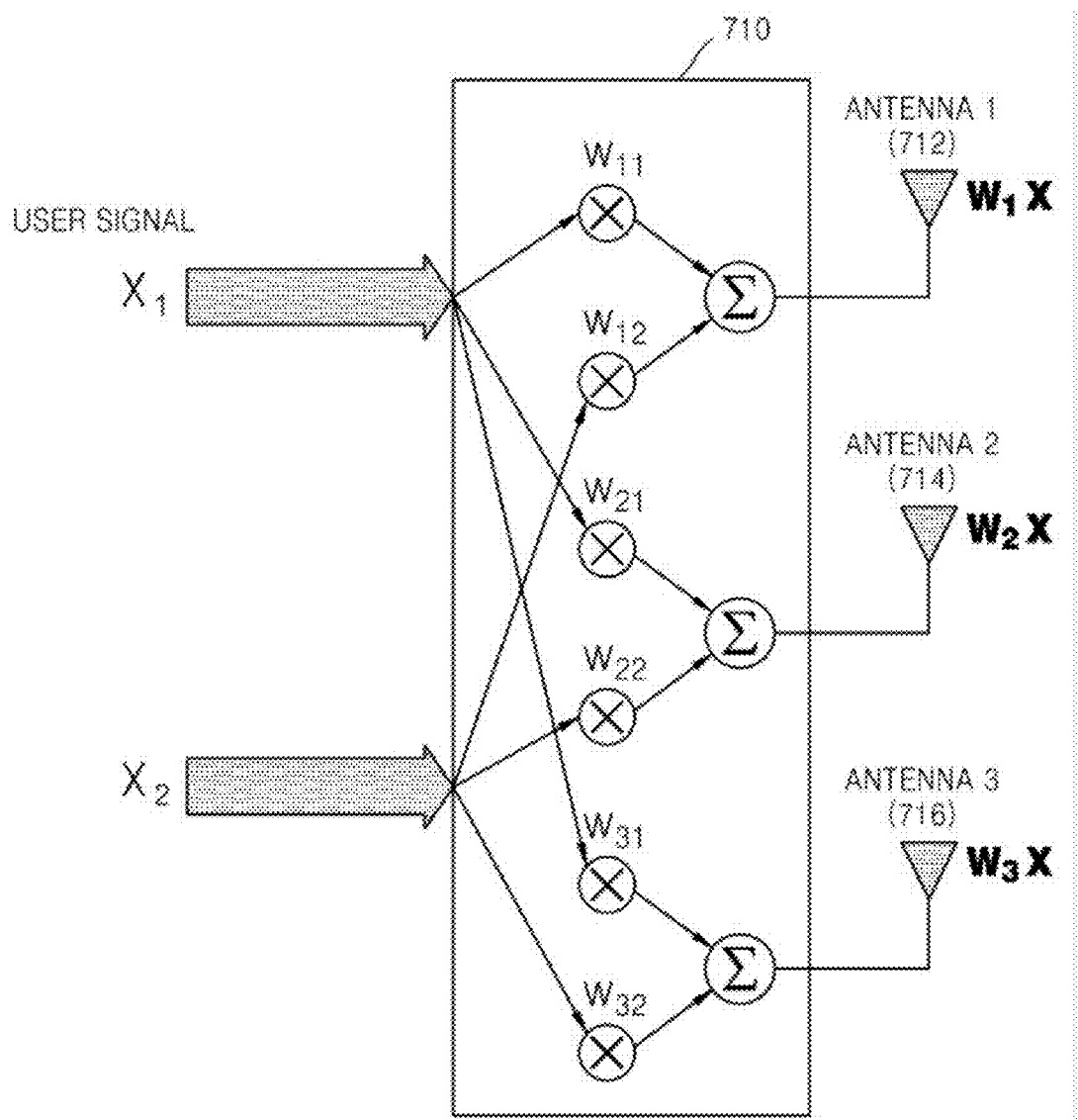
FIG. 7 is a view showing an example of an antenna selection method according to an embodiment of the present invention.

FIG. 7 is a view showing an example of an antenna selecting method according to an embodiment of the present invention;

Referring to FIG. 7, when user signals of two users are subject to spatial division user multiplexing by the antenna selection method and transmitted using three antennas 712, 714, and 716, the user signals are combined (710) with weight vectors written by equation 5, below, so that each user signal is allocated at least one antenna and transmitted.

$$W = \begin{bmatrix} w_{11} & w_{12} \\ w_{21} & w_{22} \\ w_{31} & w_{32} \end{bmatrix} = \begin{bmatrix} 1 & 0 \\ 0 & 1 \\ 1 & 0 \end{bmatrix} \quad \text{Equation (5)}$$

In the above equation 5, a weight wij is a weight allocated to the j-th user signal that is transmitted through the i-th antenna.

When spatial division multiplexing through the antenna selection method is performed using the equation 5, user signals x1 and x2 that are transmitted through three antennas 712, 714, and 716 can be expressed as equation 6, below. That is, by transmitting the first user signal x1 through the first and third antennas 712 and 716, and transmitting the second user signal x2 through the second antenna 714, the user signals x1 and x2 of two users are simultaneously transmitted using the antenna selection method.

$$Wx = \begin{bmatrix} w_{11} & w_{12} \\ w_{21} & w_{22} \\ w_{31} & w_{32} \end{bmatrix} \begin{bmatrix} x_1 \\ x_2 \end{bmatrix} = \begin{bmatrix} 1 & 0 \\ 0 & 1 \\ 1 & 0 \end{bmatrix} \begin{bmatrix} x_1 \\ x_2 \end{bmatrix} = \begin{bmatrix} x_1 \\ x_2 \\ x_1 \end{bmatrix} \quad \text{Equation (6)}$$

The antenna group division is a method of allocating mutually exclusive antenna groups to a plurality of user signals, respectively, and combining at least two user signals in order to simultaneously transmit the user signals using a plurality of antennas.

Figure 8:
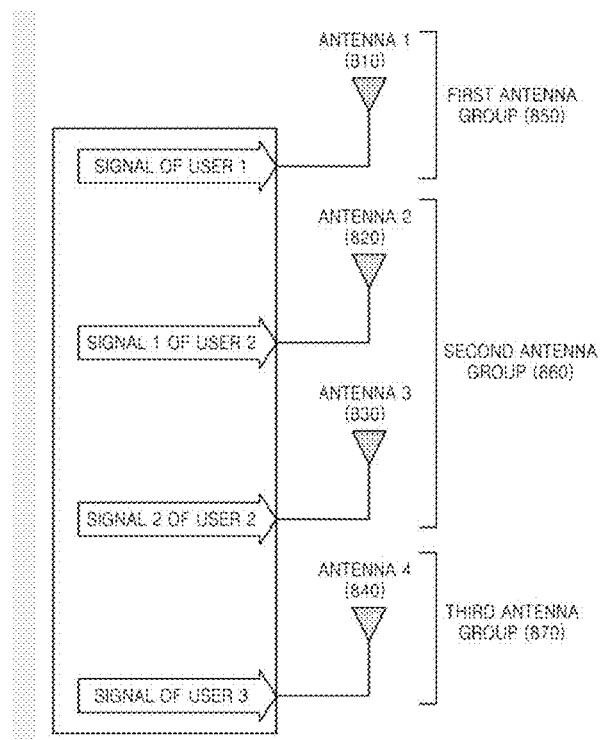
FIG. 8 is a view for explaining the concept of a spatial division multiplexing method among user multiplexing methods according to embodiments of the present invention.

FIG. 8 is a view for explaining the concept of the spatial division multiplexing method among the user multiplexing methods according to the embodiments of the present invention.

Referring to FIG. 8, a signal of a user 1 is transmitted through an antenna 1, signals of a user group 2 are transmitted through an antenna 2 820 and an antenna 3 830, and a signal of a user 3 is transmitted through an antenna 4 840. In this way, by transmitting respective user signals through mutually exclusive antenna groups 850, 860, and 870, a plurality of user signals can be multiplexed and transmitted.

Meanwhile, by transmitting different users' signals through individual beam spaces using a SPA or an ESPAR antenna, a plurality of user signals can be combined using a single antenna by the spatial multiplexing method. Also, it is obvious to one of ordinary skill in the art that a plurality of SPAs or ESPAR antennas can be used to perform spatial division user multiplexing, such as pre-coding, DPC, beamforming, spatial multiplexing, transmit diversity, antenna selection, and antenna group division.

The SPA or the ESPAR antenna is an antenna capable of forming a directional beam using an RF front-end, and generally includes an active element located at the center and a plurality of passive elements surrounding the active element. The active element is connected to a radio transceiver and configured to control the passive elements and decide the direction of a beam.

The SPA decides the direction of a beam by opening or shorting a plurality of passive elements using pin diodes. Also, the ESPAR antenna controls a radiation pattern to form a beam and a null in a specific direction by applying a variable reactor to control the imaginary part of the input impedance of each passive element.

Details for the SPA and the ESPAR antenna have been disclosed in the following document.

SPA: [T. Svantesson and M. Wennstrom. "High-Resolution Direction Finding Using a Switched Parasitic Antenna". In Proc. IEEE SSP 2001, Singapore, August 2001.]

ESPAR: [H. Kawakami, T. Ohira, "Electrically Steerable Passive Array Radiator (ESPAR) Antennas," IEEE Antennas and Propagation Magazine, vol. 47, no. 2, April 2005.]

D. Group Multiplexing Methods

Group multiplexing methods according to embodiments of the present invention can be defined as follows. That is, in order to combine a plurality of independent user signals and simultaneously transmit the plurality of independent user signals to a plurality of user groups each consisting of at least one user using at least one antenna group, according to embodiments of the present invention, the following group multiplexing methods are used. A user group signal is a signal obtained by multiplexing a plurality of independent user signals through user multiplexing or by multiplexing a plurality of independent user group signals through group multiplexing. Power division group multiplexing method: by differentially allocating powers to individual user groups, a plurality of user group signals are multiplexed and transmitted through power division among user groups.

Code division group multiplexing method: by allocating unique group combining codes to individual user groups, a plurality of user group signals are multiplexed and transmitted through code division among user groups.

Spatial division group multiplexing method: by assigning unique group combining weight vectors to individual user groups, a plurality of user group signals are multiplexed and transmitted through spatial division among user groups.

The power division group multiplexing method is a method of overlapping a plurality of independent user group signals through differential allocation of power to the independent user group signals, and transmitting the overlapping user signal through a radio source. In the power division group multiplexing method, user group signals are transmitted through multiple layers by adjusting coupling coefficients through division of the transmission power according to a channel state.

Figure 9:
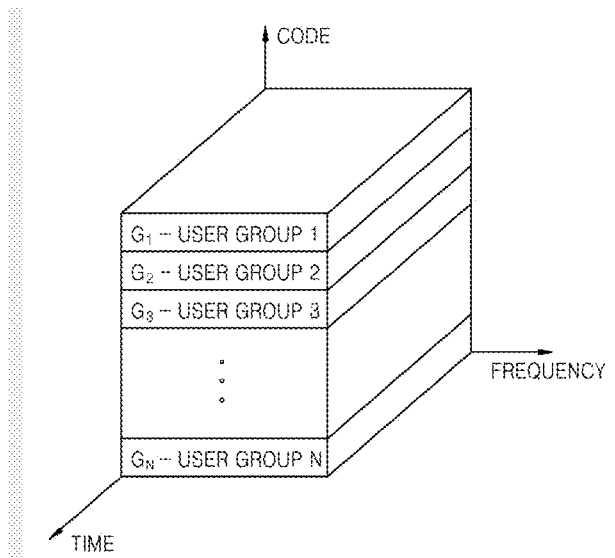
FIG. 9 is a view for explaining the concept of a code division multiplexing method among group multiplexing methods according to embodiments of the present invention.

The code division group multiplexing method is, as shown in FIG. 9, a method of multiplexing a plurality of user group signals through code division among user groups by allocating unique group combining codes to the user group signals. Generally, by using unique group combining codes orthogonal to each other or having low correlations with each other, multiplexing transmission through code division among user groups is possible.

FIG. 9 is a view for explaining the concept of the code division multiplexing method among the group multiplexing methods according to the embodiments of the present invention.

Referring to FIG. 9, by allocating unique group combining codes G1, G2, . . . , GN to N user groups in such a manner to allocate the group combining code G1 to a user group 1, the group combining code G2 to a user group 2, and the group combining code G3 to a user group 3, a plurality of signals are multiplexed and transmitted through code division among user groups.

The spatial division group multiplexing method is a method of assigning unique group combining weight vectors to a plurality of user group signals and transmitting the resultant user group signals.

Figure 10:
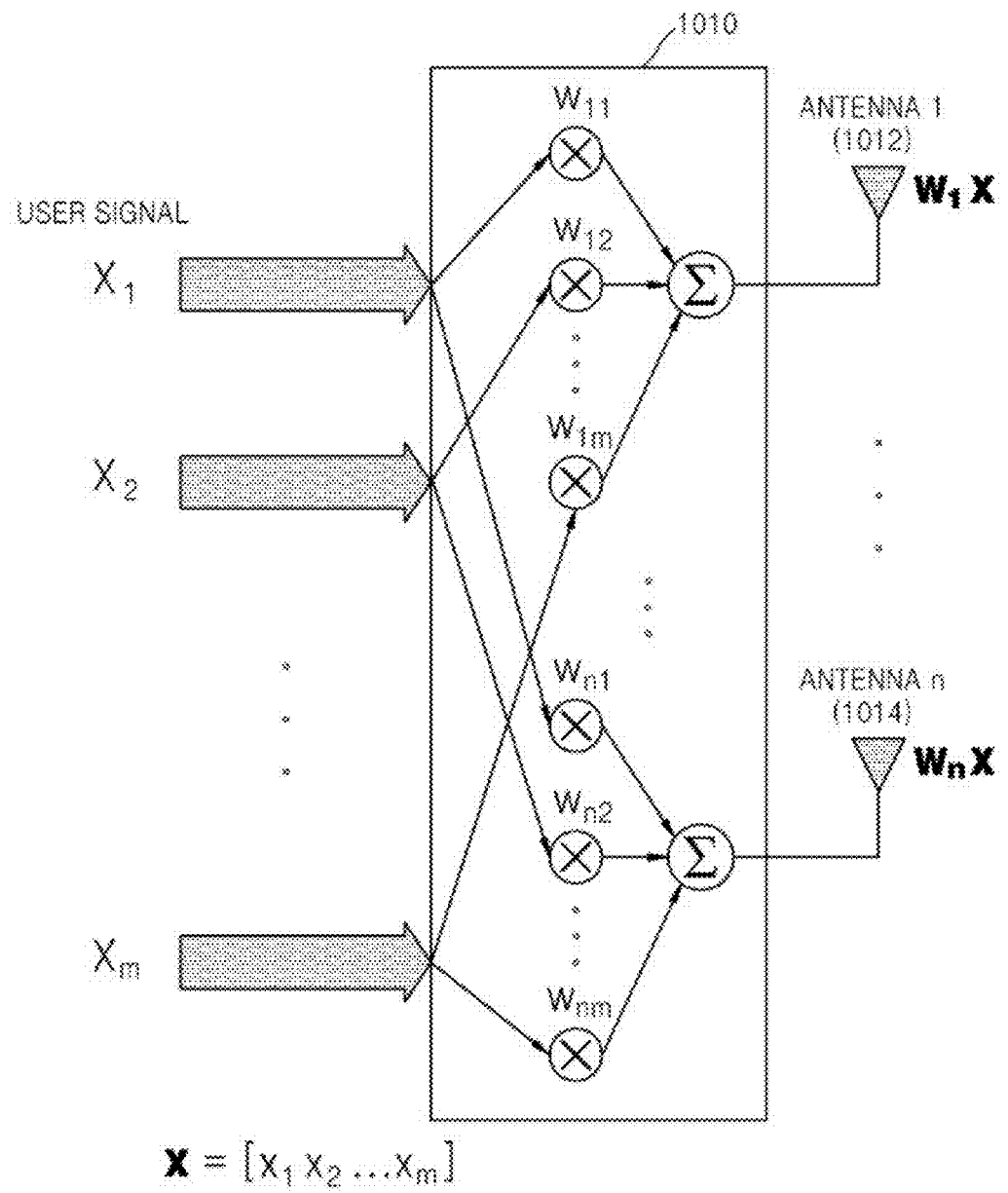
FIG. 10 is a view for explaining the concept of a spatial division multiplexing method among the group multiplexing methods according to the embodiments of the present invention.

FIG. 10 is a view for explaining an example of multiplexing a plurality of independent user group signals using a spatial division multiplexing method and transmitting the resultant signals. In the current example, various spatial division multiplexing methods can be used according to a weight vector wi. The spatial division multiplexing method for group multiplexing includes pre-coding, beamforming, spatial multiplexing, antenna selection, antenna group division, etc.

Referring to FIG. 10, m user group signals x1, x2, . . . , xm are transmitted by the spatial division multiplexing method through group multiplexing 1010 of allocating unique group combining weights w11, w12, . . . , w1$m$, wn1, wn2, . . . , wnm to the individual user group signals x1, x2, . . . , xm, wherein wij represents a weight vector allocated to the j-th user group signal xj that is transmitted through the i-th antenna, and wi represents a weight vector allocated to m user group signals that are transmitted through the i-th antenna.

Meanwhile, when a plurality of user group signals are simultaneously transmitted using at least one antenna, a multiple user MIMO pre-coding method of assigning weight vectors to the individual user group signals to spatially separate user signals using channel state information and combining the user group signals can be used.

In order to use a pre-coding method for group multiplexing, a plurality of user groups are configured such that users configuring each user group have similar channel state information. Also, when the pre-coding method is applied, weight vectors are assigned to individual user group signals so that at least one user configuring each user group can receive the corresponding signal.

Figure 11:
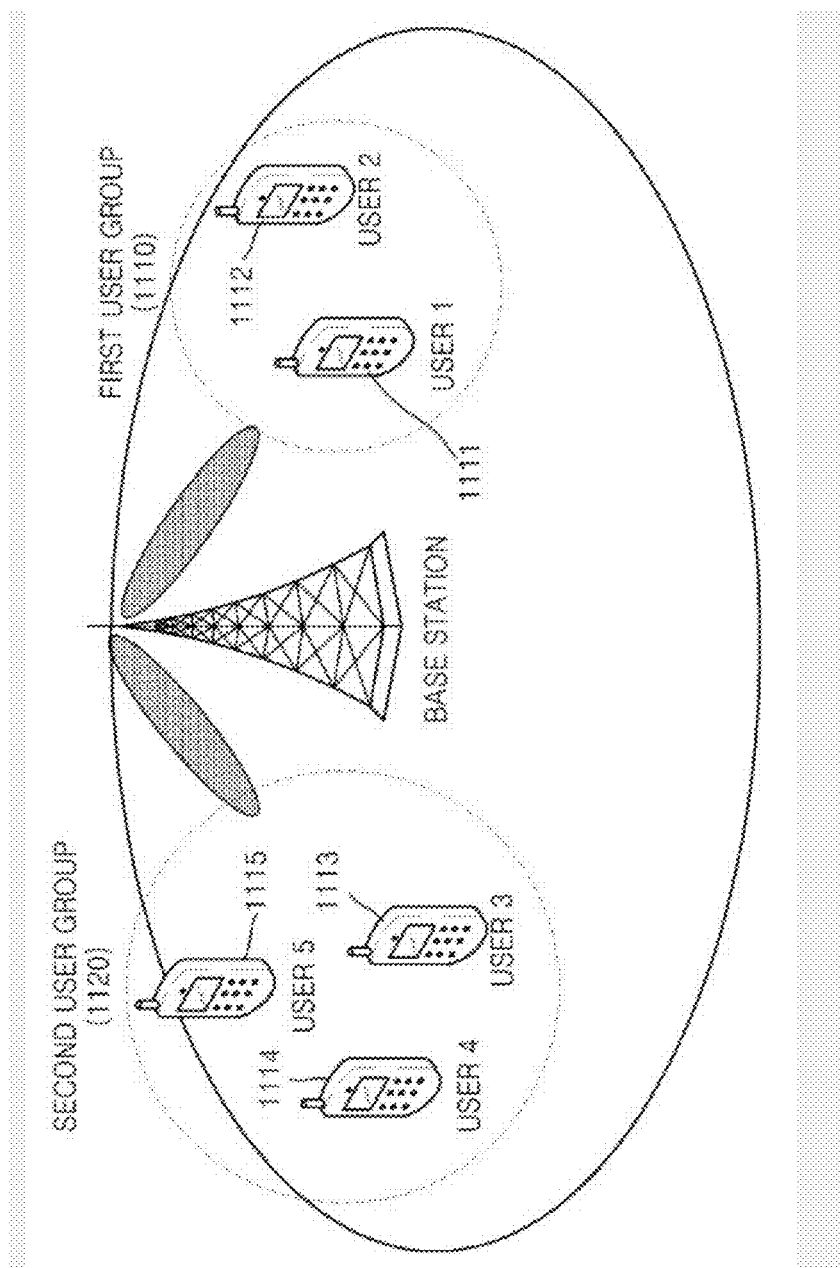
FIG. 11 is a view for explaining an example of a user group configuring method for spatial division multiplexing using pre-coding among the group multiplexing methods according to the embodiments of the present invention.

FIG. 11 is a view for explaining an example of a user group configuring method for spatial division multiplexing using pre-coding among the group multiplexing methods according to the embodiments of the present invention.

Referring to FIG. 11, a user 1 1111 and a user 2 1112 having similar channel state information are configured as a first user group 1110, and a user 3 1113, a user 4 1114, and a user 5 1115 are configured as a second user group 1120. Also, a pre-coding method of assigning unique group combining weight vectors to the individual user groups 1110 and 1120 is used to combine two user group signals.

Also, when a plurality of user group signals are simultaneously transmitted using at least one antenna, the beamforming method of assigning weight vectors to the individual user group signals such that each user group signal is transmitted in a specific direction, and combining the user group signals can be used.

Meanwhile, when a plurality of user group signals are simultaneously transmitted using at least one antenna, the spatial multiplexing method of assigning weight vectors to the individual user group signals such that different user group signals are transmitted through the respective antennas can be used to combine the plurality of user group signals.

If it is assumed that three user group signals are transmitted using three antennas by a spatial division group multiplexing method, the user group signals are combined with weight vectors expressed by equation 7, below, using the spatial division multiplexing method, and thereby independently transmitted through the individual antennas.

$$W = \begin{bmatrix} w_{11} & w_{12} & w_{13} \\ w_{21} & w_{22} & w_{23} \\ w_{31} & w_{32} & w_{33} \end{bmatrix} = \begin{bmatrix} 0 & 1 & 0 \\ 1 & 0 & 0 \\ 0 & 0 & 1 \end{bmatrix} \quad \text{Equation (7)}$$

Here, a weight wij is a group combining weight allocated to the j-th signal that is transmitted through the i-th antenna.

When spatial division multiplexing is performed through antenna selection using the equation 7, signals that are transmitted through three antennas can be defined by equation 8, below.

$$Wx = \begin{bmatrix} w_{11} & w_{12} & w_{13} \\ w_{21} & w_{22} & w_{23} \\ w_{31} & w_{32} & w_{33} \end{bmatrix}\begin{bmatrix} x_1 \\ x_2 \\ x_3 \end{bmatrix} = \begin{bmatrix} 0 & 1 & 0 \\ 1 & 0 & 0 \\ 0 & 0 & 1 \end{bmatrix}\begin{bmatrix} x_1 \\ x_2 \\ x_3 \end{bmatrix} = \begin{bmatrix} x_2 \\ x_1 \\ x_3 \end{bmatrix} \quad \text{Equation (8)}$$

According to the equation 8, by transmitting a second user group signal x2 through the first antenna, a first user group signal x1 through the second antenna, and a third user group signal x3 through the third antenna, the three user group signals x1, x2, and x3 are simultaneously transmitted using the spatial multiplexing method.

Also, when a SPA or an ESPAR antenna is used, by transmitting a first user group signal through a first beam space and transmitting a second user group signal through a second beam space, the two user group signals are simultaneously transmitted through the spatial multiplexing method using the SPA or the ESPAR antenna.

Then, when a plurality of user group signals are simultaneously transmitted by an antenna selection method using a plurality of antennas, weight vectors are assigned to the individual user group signals such that each user group signal is allocated at least one antenna. Then, the plurality of user group signals are combined using the assigned weight vectors.

For example, when the antenna selection method is used to transmit two user group signals using three antennas by a spatial division group multiplexing method, the individual user group signals are combined with weight vectors expressed by equation 9, below, and thereby each user group signal is allocated at least one antenna and transmitted.

$$W = \begin{bmatrix} w_{11} & w_{12} \\ w_{21} & w_{22} \\ w_{31} & w_{32} \end{bmatrix} = \begin{bmatrix} 1 & 0 \\ 0 & 1 \\ 1 & 0 \end{bmatrix} \quad \text{Equation (9)}$$

Here, a weight wij is a group combining weight allocated to the j-th signal that is transmitted through the i-th antenna.

When spatial division multiplexing is performed through the antenna selection method using the equation 9, signals that are transmitted through three antennas can be defined by equation 10, below.

$$Wx = \begin{bmatrix} w_{11} & w_{12} \\ w_{21} & w_{22} \\ w_{31} & w_{32} \end{bmatrix}\begin{bmatrix} x_1 \\ x_2 \end{bmatrix} = \begin{bmatrix} 1 & 0 \\ 0 & 1 \\ 1 & 0 \end{bmatrix}\begin{bmatrix} x_1 \\ x_2 \end{bmatrix} = \begin{bmatrix} x_1 \\ x_2 \\ x_1 \end{bmatrix} \quad \text{Equation (10)}$$

According to the equation 10, by transmitting a first user group signal x1 through first and third antennas and transmitting a second user group signal x2 through a second antenna, the two user group signals are simultaneously transmitted using the antenna selection method.

Then, according to the antenna group division method, when a plurality of user group signals are simultaneously transmitted using a plurality of antennas, mutually exclusive antenna groups are allocated to the individual user group signals to combine the plurality of user group signals.

Figure 12:
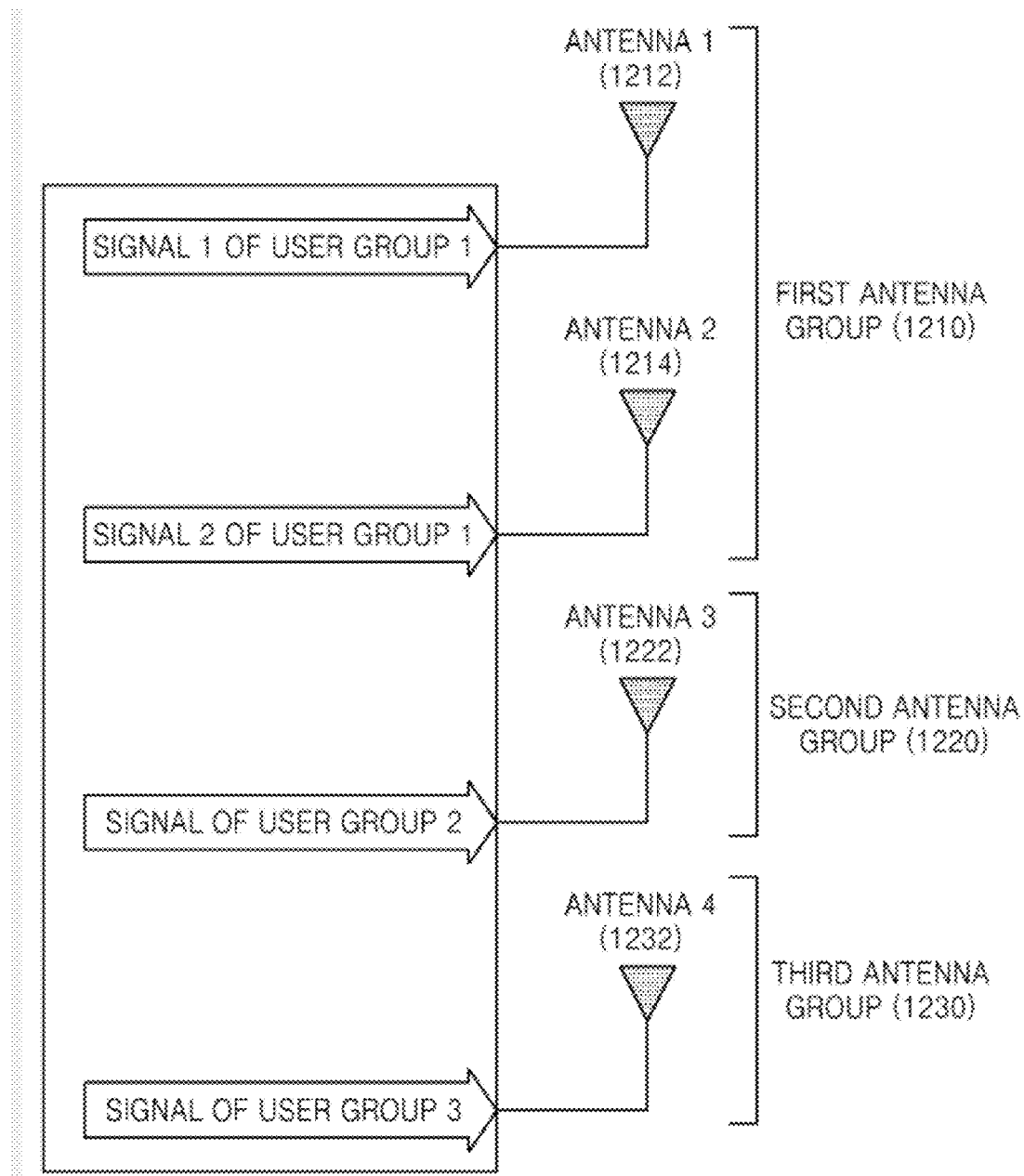
FIG. 12 is a view for explaining the concept of an antenna group division multiplexing method among the group multiplexing methods according to the embodiments of the present invention.

FIG. 12 is a view for explaining an example of a group multiplexing method based on antenna group division, according to an embodiment of the present invention.

Referring to FIG. 12, signals of a user group 1 are transmitted through an antenna 1 1212 and an antennas 2 1214 configuring a first antenna group 1210, a signal of a user group 2 is transmitted through an antenna 3 configuring a second antenna group 1220, and a signal of a user group 3 is transmitted through an antenna 4 1232 configuring a third antenna group 1230. In this way, by transmitting user group signals through mutually exclusive antenna groups, a plurality of user group signals are multiplexed and transmitted.

Finally, when a SPA is used, signals of different user groups are transmitted through individual beam spaces using a SPA and an ESPAR antenna. Thereby, at least two user group signals can be combined using a single antenna by the space multiplexing method. Also, it is obvious to one of ordinary skill in the art that at least two SPAs or ESPAR antennas are used to perform spatial division group multiplexing, such as pre-coding, beamforming, spatial multiplexing, antenna selection, and antenna group division.

E. Multiple Antenna Transmission Methods

According to embodiments of the present invention, when a plurality of user signals are simultaneously transmitted using a plurality of antennas, the following multiple antenna transmission methods can be applied to at least one user configuring each user group. Hereinafter, a spatial multiplexing method, a STC method, and a transmit diversity transmission method will be described. However, the above-mentioned multiple antenna transmission methods are only exemplary, and other various multiple antenna transmission methods can be used although they are not mentioned in this specification.

The spatial multiplexing method is a multiplexing method of multiplexing a plurality of independent signals through spatial division and transmitting the resultant signals so that receiving terminals can identify the independent signals and receive them.

Figure 13:
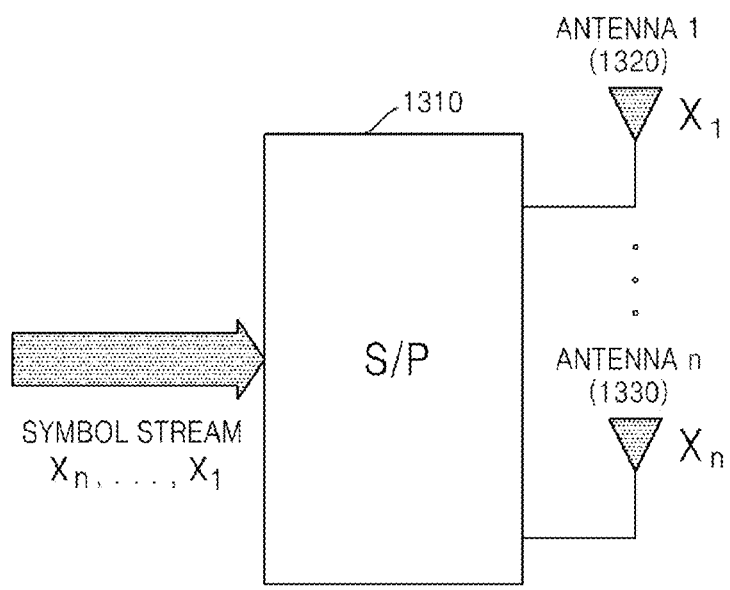
FIG. 13 is a view for explaining spatial multiplexing using n antennas in a multiple antenna system, according to an embodiment of the present invention.

FIG. 13 is a view for explaining a spatial multiplexing method of simultaneously transmitting n independent streams using n antennas. As another example, a spatial multiplexing method 1310 using at least two antennas can be used to transmit signals while obtaining multiplexing gain, and also it is possible to transmit a plurality of signals through at least one antenna by assigning unique weight vectors to individual signals.

The STC method is a transmission method of transmitting the same signal through a plurality of independent wireless paths temporally and spatially differentiated by combining a plurality of antennas with a channel coding method, thereby obtaining diversity gain.

Figure 14:
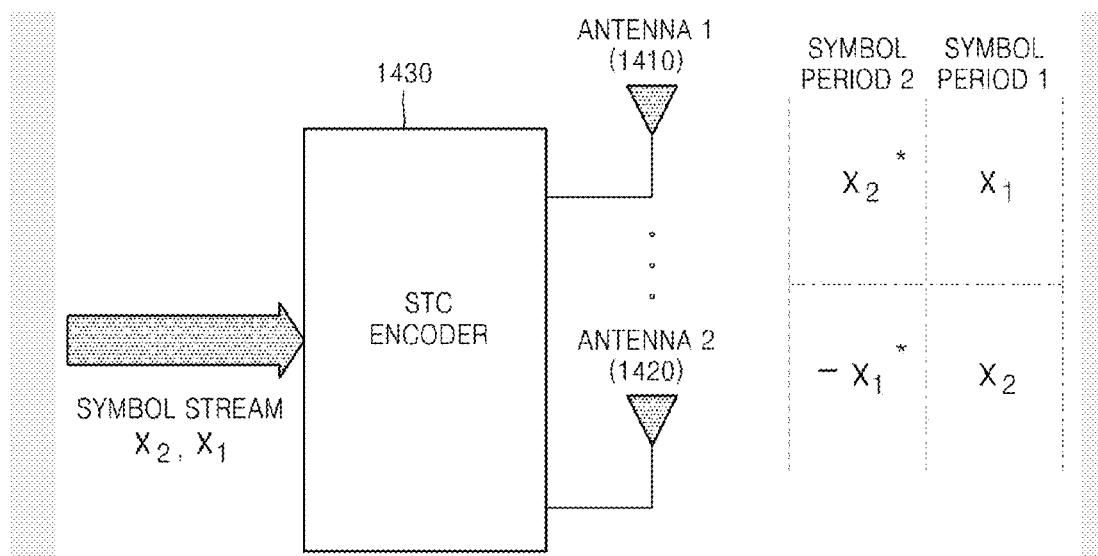
FIG. 14 is a view for explaining an Alamouti transmission method using two antennas in a multiple antenna system, according to an embodiment of the present invention.

FIG. 14 is a view for explaining an Alamouti coding transmission method which is an embodiment of a STC method 1430 using two antennas 1410 and 1420. As another example, a spatial multiplexing method 1430 using a plurality of antennas is used to transmit signals while obtaining diversity, and also it is possible to transmit a plurality of signals through at least one antenna by assigning unique weight vectors to individual signals. The STC method 1430 includes Space-time trellis codes (STTC), Space-time block codes (STBC), Linear dispersion codes (LDC), etc.

The transmit diversity transmission method is a transmission method of obtaining transmit diversity by transmitting the same signal through a plurality of transmission antennas.

Figure 15:
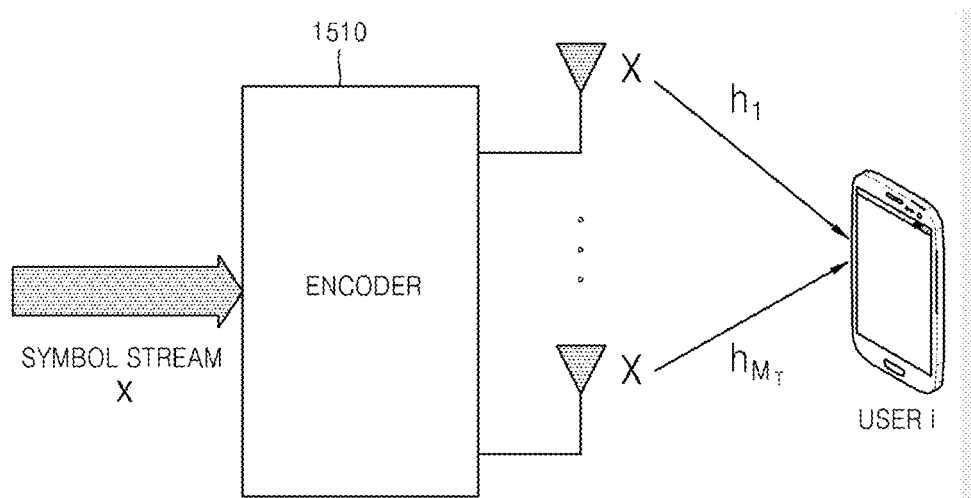
FIG. 15 is a view for explaining the concept of a transmit diversity transmission method in a multiple antenna system, according to an embodiment of the present invention.

FIG. 15 is a view for explaining a transmit diversity transmission method in which a transmitting terminal 1510 transmits the same stream x to a user i using a plurality of antennas through independent channels. Also, a plurality of signals can be transmitted through at least one antenna by assigning unique weight vectors to individual signals.

F. Example of Combining a User Multiplexing Method and a Group Multiplexing Method In multiplexing using at least one of the user multiplexing methods described above, user signals of users configuring each user group are combined by a user multiplexing method so that each user can receive the corresponding user signal, in order to simultaneously transmit a plurality of signals to a plurality of user groups consisting of at least one user.

Also, user group signals are combined by a group multiplexing method so that each user group can receive the corresponding group signal, thereby performing multiple user transmission.

Accordingly, user signals are combined by at least one user multiplexing method for each user group consisting of at least two users so that signals for individual users can be distinguished. Also, user group signals can be combined through group multiplexing such that at least two user groups are configured as an upper user group.

First, when a plurality of user groups use the same user multiplexing method to simultaneously transmit a plurality of signals to a plurality of user groups, the user multiplexing method will be described.

Table 1 shows combinations of multiplexing methods that can be used when a plurality of user groups use the same user multiplexing method. That is, Table 1 shows combinations of multiplexing methods that can be used when at least two user groups use the same user multiplexing method.

are multiplexed through differential power allocation to individual user group signals.

Second, in the case of a combination of a power division user multiplexing method and a code division group multiplexing method, a plurality of user signals are multiplexed through differential power allocation to user signals belonging to each user group, and a plurality of user group signals are multiplexed by allocating unique group combining codes to individual user group signals.

Third, in the case of a combination of a power division user multiplexing method and a spatial division group multiplexing method, a plurality of user signals are multiplexed through differential power allocation to user signals belonging to each user group, and a plurality of user group signals are multiplexed by assigning unique group combining weight vectors to individual user group signals.

Fourth, in the case of a combination of a code division user multiplexing method and a power division group multiplexing method, a plurality of user signals are multiplexed by allocating unique user combining codes to user signals belonging to each user group, and a plurality of user group signals are multiplexed through differential power allocation to individual user group signals.

Fifth, in the case of a combination of a code division user multiplexing method and a code division group multiplexing method, a plurality of user signals are multiplexed by allocating unique user combining codes to user signals belonging to each user group, and a plurality of user group signals are multiplexed by allocating unique group combining codes to individual user group signals.

Sixth, in the case of a combination of a code division user multiplexing method and a spatial division group multiplexing method, a plurality of user signals are multiplexed by allocating unique user combining codes to user signals belonging to each user group, and a plurality of user group signals are multiplexed by assigning unique group combining weight vectors to individual user group signals.

Seventh, in the case of a combination of a spatial division user multiplexing method and a power division group mul-

TABLE 1

| GROUP | USER MULTIPLEXING METHOD | | |
| --- | --- | --- | --- |
| MULTIPLEXING METHOD | POWER DIVISION USER MULTIPLEXING | CODE DIVISION USER MULTIPLEXING | SPATIAL DIVISION USER MULTIPLEXING |
| POWER DIVISION GROUP MULTIPLEXING | Power Division User Multiplexing-Power Division Group Multiplexing | Code Division User Multiplexing-Power Division Group Multiplexing | Spatial Division User Multiplexing-Power Division Group Multiplexing |
| CODE DIVISION GROUP MULTIPLEXING | Power Division User Multiplexing-Code Division Group Multiplexing | Code Division User Multiplexing-Code Division Group Multiplexing | Spatial Division User Multiplexing-Code Division Group Multiplexing |
| SPATIAL DIVISION GROUP MULTIPLEXING | Power Division User Multiplexing-Spatial Division Group Multiplexing | Code Division User Multiplexing-Spatial Division Group Multiplexing | Spatial Division User Multiplexing-Spatial Division Group Multiplexing |

As shown in Table 1, 9 combinations of user multiplexing methods and group multiplexing methods can be used.

Operations of individual cases of simultaneously transmitting a plurality of signals to a plurality of user groups consisting of at least one user for the 9 combinations of the multiplexing methods as shown in Table 1 will be described below.

First, in the case of a combination of a power division user multiplexing method and a power division group multiplexing method, a plurality of user signals are multiplexed through differential power allocation to user signals belonging to each user group, and a plurality of user group signals tiplexing method, a plurality of user signals are multiplexed by assigning unique user combining weight vectors to user signals belonging to each user group, and a plurality of user group signals are multiplexed through differential power allocation to individual user group signals.

Eighth, in the case of a combination of a spatial division user multiplexing method and a code division group multiplexing method, a plurality of user signals are multiplexed by assigning unique user combining weight vectors to user signals belonging to each user group, and a plurality of user group signals are multiplexed by allocating unique group combining codes to individual user group signals.

Ninth, in the case of a combination of a spatial division user multiplexing method and a spatial division group multiplexing method, a plurality of user signals are multiplexed by assigning unique user combining weight vectors to user signals belonging to each user group, and a plurality of user group signals are multiplexed by assigning unique group combining weight vectors to individual user group signals.

Thereafter, the case where a plurality of user groups use two or more same user multiplexing methods to simultaneously transmit a plurality of signals to at least two user groups each consisting of at least one user will be described.

First, in the case of a combination of a code division user multiplexing method, a power division user multiplexing method, and a power division group multiplexing method, a plurality of user signals are multiplexing by allocating unique user combining codes to user signals belonging to each user group and differentially allocating powers to the resultant user signals, and a plurality of user group signals are multiplexed through differential power allocation to individual user group signals.

Second, in the case of a combination of a code division user multiplexing method, a power division user multiplexing method, and a code division group multiplexing method, a plurality of user signals are multiplexed by allocating unique user combining codes to user signals belonging to each user group and differentially allocating powers to the resultant user signals, and a plurality of user group signals are multiplexed by allocating unique group combining codes to individual user group signals.

Third, in the case of a combination of a code division user multiplexing method, a power division user multiplexing method, and a spatial division group multiplexing method, a plurality of user signals are multiplexed by allocating unique user combining codes to user signals belonging to each user group and differentially allocating powers to the resultant user signals, and a plurality of user group signals are multiplexed by assigning unique group combining weight vectors to individual user group signals.

Fourth, in the case of a combination of a code division user multiplexing method, a spatial division user multiplexing method, and a power division group multiplexing method, a plurality of user signals are multiplexed by allocating unique user combining codes to user signals belonging to each user group and assigning unique user combining weight vectors to the resultant user signals, and a plurality of user group signals are multiplexed through differential power allocation to individual user group signals.

Fifth, in the case of a combination of a code division user multiplexing method, a spatial division user multiplexing method, and a code division group multiplexing method, a plurality of user signals are multiplexed by allocating unique user combining codes to user signals belonging to each user group and assigning unique user combining weight vectors to the resultant user signals, and a plurality of user group signals are multiplexed by allocating unique group combining codes to individual user group signals.

Sixth, in the case of a combination of a code division user multiplexing method, a spatial division user multiplexing method, and a spatial division group multiplexing method, a plurality of user signals are multiplexed by allocating unique user combining codes to user signals belonging to each user group and assigning unique user combining weight vectors to the resultant user signals, and a plurality of user group signals are multiplexed by assigning unique group combining weight vectors to individual user group signals.

Seventh, in the case of a combination of a spatial division user multiplexing method, a power division user multiplexing method, and a power division group multiplexing method, a plurality of user signals are multiplexed by assigning unique user combining weight vectors to user signals belonging to each user group and differentially allocating powers to the resultant user signals, and a plurality of user group signals are multiplexed through differential power allocation to individual user group signals.

Eighth, in the case of a combination of a spatial division user multiplexing method, a power division user multiplexing method, and a code division group multiplexing method, a plurality of user signals are multiplexed by assigning unique user combining weight vectors to user signals belonging to each user group and differentially allocating powers to the resultant user signals, and a plurality of user group signals are multiplexed by allocating unique group combining codes to individual user group signals.

Ninth, in the case of a combination of a spatial division user multiplexing method, a power division user multiplexing method, and a spatial division group multiplexing method, a plurality of user signals are multiplexed by assigning unique user combining weight vectors to user signals belonging to each user group and differentially allocating powers to the resultant user signals, and a plurality of user group signals are multiplexed by assigning unique group combining weight vectors to individual user group signals.

Meanwhile, it is obvious to one of ordinary skill in the art that each user group can multiplex signals of users configuring user groups using three user multiplexing methods or more. Also, it is possible to combine at least two user group signals using two group multiplexing methods.

Finally, the case where a plurality of user groups using the same user multiplexing method are configured into an upper user group using a group multiplexing method will be described. In this case, it is assumed that a plurality of signals are simultaneously transmitted to a plurality of user groups each consisting of at least one user.

First, in the case of a combination of a power division user multiplexing method, a power division group multiplexing method, and a power division group multiplexing method, a plurality of user signals are multiplexed through differential power allocation to user signals belonging to each user group, and a plurality of user group signals are multiplexed through differential power allocation to individual user group signals. Also, a plurality of upper user group signals are multiplexed through differential power allocation to upper user group signals including at least two signals subject to power division group multiplexing.

Second, in the case of a combination of a power division user multiplexing method, a power division group multiplexing method, and a code division group multiplexing method, a plurality of user signals are multiplexed through differential power allocation to user signals belonging to each user group, and a plurality of user group signals are multiplexed through differential power allocation to individual user group signals. Also, a plurality of upper user group signals are multiplexed by allocating unique group combining codes to upper user group signals including at least two signals subject to power division group multiplexing.

Third, in the case of a combination of a power division user multiplexing method, a power division group multiplexing method, and a spatial division group multiplexing method, a plurality of user signals are multiplexed through differential power allocation to user signals belonging to each user group, and a plurality of user group signals are multiplexed through differential power allocation to individual user group signals. Also, a plurality of upper user group signals are multiplexed by assigning unique group combining weight vectors to upper user group signals including at least two signals subject to power division group multiplexing.

Fourth, in the case of a combination of a power division user multiplexing method, a code division group multiplexing method, and a power division group multiplexing method, a plurality of user signals are multiplexed through differential power allocation to user signals belonging to each user group, and a plurality of user group signals are multiplexed by allocating unique group combining codes to individual user group signals. Also, a plurality of upper user group signals are multiplexed through differential power allocation to upper user group signals including at least two signals subject to code division group multiplexing.

Fifth, in the case of a combination of a power division user multiplexing method, a code division group multiplexing method, and a power division group multiplexing method, a plurality of user signals are multiplexed through differential power allocation to user signals belonging to each user group, and a plurality of user group signals are multiplexed by allocating unique group combining codes to individual user group signals. Also, a plurality of upper user group signals are multiplexed by allocating different unique group combining codes to upper user group signals including at least two signals subject to code division group multiplexing.

Sixth, in the case of a combination of a power division user multiplexing method, a code division group multiplexing method, and a spatial division group multiplexing method, a plurality of user signals are multiplexed through differential power allocation to user signals belonging to each user group, and a plurality of user group signals are multiplexed by allocating unique group combining codes to individual user group signals. Also, a plurality of upper user group signals are multiplexed by assigning different unique group combining weight vectors to upper user group signals including at least two signals subject to code division group multiplexing.

Seventh, in the case of a combination of a power division user multiplexing method, a spatial division group multiplexing method, and a power division group multiplexing method, a plurality of user signals are multiplexed through differential power allocation to user signals belonging to each user group, and a plurality of user group signals are multiplexed by assigning unique group combining weight vectors to individual user group signals. Also, a plurality of upper user group signals are multiplexed through differential power allocation to upper user group signals including at least two signals subject to spatial division group multiplexing.

Eighth, in the case of a combination of a power division user multiplexing method, a spatial division group multiplexing method, and a code division group multiplexing method, a plurality of user signals are multiplexed through differential power allocation to user signals belonging to each user group, and a plurality of user group signals are multiplexed by assigning unique group combining weight vectors to individual user group signals. Also, a plurality of upper user group signals are multiplexed by allocating unique group combining codes to upper user group signals including at least two signals subject to spatial division group multiplexing.

Ninth, in the case of a combination of a power division user multiplexing method, a spatial division group multiplexing method, and a spatial division group multiplexing method, a plurality of user signals are multiplexed through differential power allocation to user signals belonging to each user group, and a plurality of user group signals are multiplexed by assigning unique group combining weight vectors to individual user group signals. Also, a plurality of upper user group signals are multiplexed by assigning different unique group combining weight vectors to upper user group signals including at least two signals subject to spatial division group multiplexing.

Tenth, in the case of a combination of a code division user multiplexing method, a power division group multiplexing method, and a power division group multiplexing method, a plurality of user signals are multiplexed by allocating unique user combining codes to user signals belonging to each user group, and a plurality of user group signals are multiplexed through differential power allocation to individual user group signals. Also, a plurality of upper user group signals are multiplexed through differential power allocation to upper user group signals including at least two signals subject to power division group multiplexing.

Eleventh, in the case of a combination of a code division user multiplexing method, a power division group multiplexing method, and a code division group multiplexing method, a plurality of user signals are multiplexed by allocating unique user combining codes to user signals belonging to each user group, and a plurality of user group signals are multiplexed through differential power allocation to individual user group signals. Also, a plurality of upper user group signals are multiplexed by allocating unique group combining codes to upper user group signals including at least two signals subject to power division group multiplexing.

Twelfth, in the case of a combination of a code division user multiplexing method, a power division group multiplexing method, and a spatial division group multiplexing method, a plurality of user signals are multiplexed by allocating unique user combining codes to user signals belonging to each user group, and a plurality of user group signals are multiplexed through differential power allocation to individual user group signals. Also, a plurality of upper user group signals are multiplexed by assigning unique group combining weight vectors to upper user group signals including at least two signals subject to power division group multiplexing.

Thirteenth, in the case of a combination of a code division user multiplexing method, a code division group multiplexing method, and a power division group multiplexing method, a plurality of user signals are multiplexed by allocating unique user combining codes to user signals belonging to each user group, and a plurality of user group signals are multiplexed by allocating unique group combining codes to individual user group signals. Also, a plurality of upper user group signals are multiplexed through differential power allocation to upper user group signals including at least two signals subject to code division group multiplexing.

Fourteenth, in the case of a combination of a code division user multiplexing method, a code division group multiplexing method, and a code division group multiplexing method, a plurality of user signals are multiplexed by allocating unique user combining codes to user signals belonging to each user group, and a plurality of user group signals are multiplexed by allocating unique group combining codes to individual user group signals. Also, a plurality of upper user group signals are multiplexed by allocating different unique group combining codes to upper user group signals including at least two signals subject to code division group multiplexing.

Fifteenth, in the case of a combination of a code division user multiplexing method, a code division group multiplexing method, and a spatial division group multiplexing method, a plurality of user signals are multiplexed by allocating unique user combining codes to user signals belonging to each user group, and a plurality of user group signals are multiplexed by allocating unique group combining codes to individual user group signals. Also, a plurality of upper user group signals are multiplexed by assigning different unique group combining weight vectors to upper user group signals including at least two signals subject to code division group multiplexing.

Sixteenth, in the case of a combination of a code division user multiplexing method, a spatial division group multiplexing method, and a power division group multiplexing method, a plurality of user signals are multiplexed by allocating unique user combining codes to user signals belonging to each user group, and a plurality of user group signals are multiplexed by assigning unique group combining weight vectors to individual user group signals. Also, a plurality of upper user group signals are multiplexed through differential power allocation to upper user group signals including at least two signals subject to spatial division group multiplexing.

Seventeenth, in the case of a combination of a code division user multiplexing method, a spatial division group multiplexing method, and a code division group multiplexing method, a plurality of user signals are multiplexed by allocating unique user combining codes to code signals belonging to each user group, and a plurality of user group signals are multiplexed by assigning unique group combining weight vectors to individual user group signals. Also, a plurality of upper user group signals are multiplexed by allocating unique group combining codes to upper user group signals including at least two signals subject to spatial division group multiplexing.

Eighteenth, in the case of a combination of a code division user multiplexing method, a spatial division group multiplexing method, and a spatial division group multiplexing method, a plurality of user signals are multiplexed by allocating unique user combining codes to user signals belonging to each user group, and a plurality of user group signals are multiplexed by assigning unique group combining weight vectors to individual user group signals. Also, a plurality of upper user group signals are multiplexed by assigning different unique group combining weight vectors to upper user group signals including at least two signals subject to spatial division group multiplexing.

Nineteenth, in the case of a combination of a spatial division user multiplexing method, a power division group multiplexing method, and a power division group multiplexing method, a plurality of user signals are multiplexed by assigning unique user combining weight vectors to user signals belonging to each user group, and a plurality of user group signals are multiplexed through differential power allocation to individual user group signals. Also, a plurality of upper user group signals are multiplexed through differential power allocation to upper user group signals including at least two signals subject to power division group multiplexing.

Twentieth, in the case of a combination of a spatial division user multiplexing method, a power division group multiplexing method, and a code division group multiplexing method, a plurality of user signals are multiplexed by assigning unique user combining weight vectors to user signals belonging to each user group, and a plurality of user group signals are multiplexed through differential power allocation to individual user group signals. Also, a plurality of upper user group signals are multiplexed by allocating unique group combining codes to upper user group signals including at least two signals subject to power division group multiplexing.

Twentyfirst, in the case of a combination of a spatial division user multiplexing method, a power division group multiplexing method, and a spatial division group multiplexing method, a plurality of user signals are multiplexed by assigning unique user combining weight vectors to user signals belonging to each user group, and a plurality of user group signals are multiplexed through differential power allocation to individual user group signals. Also, a plurality of upper user group signals are multiplexed by assigning unique group combining weight vectors to upper user group signals including at least two signals subject to power division group multiplexing.

Twentysecond, in the case of a combination of a spatial division user multiplexing method, a code division group multiplexing method, and a power division group multiplexing method, a plurality of user signals are multiplexed by assigning unique user combining weight vectors to user signals belonging to each user group, and a plurality of user group signals are multiplexed by allocating unique group combining codes to individual user group signals. Also, a plurality of upper user group signals are multiplexed through differential power allocation to upper user group signals including at least two signals subject to code division group multiplexing.

Twentythird, in the case of a combination of a spatial division user multiplexing method, a code division group multiplexing method, and a code division group multiplexing method, a plurality of user signals are multiplexed by assigning unique user combining weight vectors to user signals belonging to each user group, and a plurality of user group signals are multiplexed by allocating unique group combining codes to individual user group signals. Also, a plurality of upper user group signals are multiplexed by allocating different unique group combining codes to upper user group signals including at least two signals subject to code division group multiplexing.

Twentyfourth, in the case of a combination of a spatial division user multiplexing method, a code division group multiplexing method, and a spatial division group multiplexing method, a plurality of user signals are multiplexed by assigning unique user combining weight vectors to user signals belonging to each user group, and a plurality of user group signals are multiplexed by allocating unique group combining codes to individual user group signals. Also, a plurality of upper user group signals are multiplexed by assigning different unique group combining weight vectors to upper user group signals including at least two signals subject to code division group multiplexing.

Twentyfifth, in the case of a combination of a spatial division user multiplexing method, a spatial division group multiplexing method, and a power division group multiplexing method, a plurality of user signals are multiplexed by assigning unique user combining weight vectors to user signals belonging to each user group, and a plurality of user group signals are multiplexed by assigning unique group combining weight vectors to individual user group signals. Also, a plurality of upper user group signals are multiplexed through differential power allocation to upper user group signals including at least two signals subject to spatial division group multiplexing.

Twentysixth, in the case of a combination of a spatial division user multiplexing method, a spatial division group multiplexing method, and a code division group multiplexing method, a plurality of user signals are multiplexed by assigning unique user combining weight vectors to user signals belonging to each user group, and a plurality of user group signals are multiplexed by assigning unique group combining weight vectors to individual user group signals. Also, a plurality of upper user group signals are multiplexed by allocating unique group combing codes to upper user group signals including at least two signals subject to spatial division group multiplexing.

Twentyseventh, in the case of a combination of a spatial division user multiplexing method, a spatial division group multiplexing method, and a spatial division group multiplexing method, a plurality of user signals are multiplexed by assigning unique user combining weight vectors to user signals belonging to each user group, and a plurality of user group signals are multiplexed by assigning unique group combining weight vectors to individual user group signals. Also, a plurality of upper user group signals are multiplexed by assigning different unique group combing weight vectors to upper user group signals including at least two signals subject to spatial division group multiplexing.

Meanwhile, it is obvious to one of ordinary skill in the art that group multiplexing can be performed such that higher-level user groups than the upper user groups are configured using three-level or higher-level group multiplexing.

Also, in a communication system using a multiple user transmission method according to an embodiment of the present invention, a communication apparatus includes a base station, a femto-cell base station, a relay, a femto-cell base station for relay transmission, a terminal for relay transmission, and a terminal.

Then, a method of using a multi-dimensional resource, which is a multiplexing method that is used when a plurality of user groups use user multiplexing methods independently in order to simultaneously transmit a plurality of signals to a plurality of user groups, will be described below.

That is, by independently allocating a multi-dimensional resource to a plurality of user groups through use of a multi-dimensional resource in which at least two methods of power division, code division, and spatial division are combined, signals are simultaneously transmitted to the plurality of user groups through user multiplexing and/or group multiplexing.

First, methods of multiplexing a plurality of user groups by assigning a least one antenna group to the user groups will be described below.

Hereinafter, methods in which at least one antenna group is assigned to multiplex a plurality of user groups, according to embodiments of the present invention, will be described. For convenience of description, in the following embodiments, it is assumed that an antenna group is assigned to two user groups, however, the embodiments can be applied in the same manner to the cases where three or more user groups exist and where three or more antenna groups are allocated.

The following Table 2 lists multiplexing methods for simultaneously transmitting a plurality of signals to two user groups when each user group is independently subject to user multiplexing. That is, Table 2 shows multiplexing methods when two user groups are independently subject to user multiplexing.

TABLE 2

| Group Multiplexing Method | User Multiplexing Method of First User Group | User Multiplexing Method of Second User Group |
|---|---|---|
| Power Division Group Multiplexing | Power Division User Multiplexing | Power Division User Multiplexing |
| | Power Division User Multiplexing | Code Division User Multiplexing |
| | Power Division User Multiplexing | Spatial Division User Multiplexing |
| | Code Division User Multiplexing | Code Division User Multiplexing |
| | Code Division User Multiplexing | Spatial Division User Multiplexing |
| | Spatial Division User Multiplexing | Spatial Division User Multiplexing |
| Code Division Group Multiplexing | Power Division User Multiplexing | Power Division User Multiplexing |
| | Power Division User Multiplexing | Code Division User Multiplexing |
| | Power Division User Multiplexing | Spatial Division User Multiplexing |
| | Code Division User Multiplexing | Code Division User Multiplexing |
| | Code Division User Multiplexing | Spatial Division User Multiplexing |
| | Spatial Division User Multiplexing | Spatial Division User Multiplexing |
| Spatial Division Group Multiplexing | Power Division User Multiplexing | Power Division User Multiplexing |
| | Power Division User Multiplexing | Code Division User Multiplexing |
| | Power Division User Multiplexing | Spatial Division User Multiplexing |
| | Code Division User Multiplexing | Code Division User Multiplexing |
| | Code Division User Multiplexing | Spatial Division User Multiplexing |
| | Spatial Division User Multiplexing | Spatial Division User Multiplexing |

Table 2 shows all combinations of multiplexing methods in which one of power division group multiplexing, code division group multiplexing, and spatial division group multiplexing is used as a group multiplexing method and one of power division user multiplexing, code division user multiplexing, and spatial division user multiplexing is used as a user multiplexing method for each of two user groups.

Hereinafter, each of the multiplexing methods listed in Table 2 will be described.

First, the case where the same antenna group is assigned to two user groups, the two user groups are group-multiplexed by power division group multiplexing, and each user group is user-multiplexed by power division user multiplexing will be described.

Figure 16:
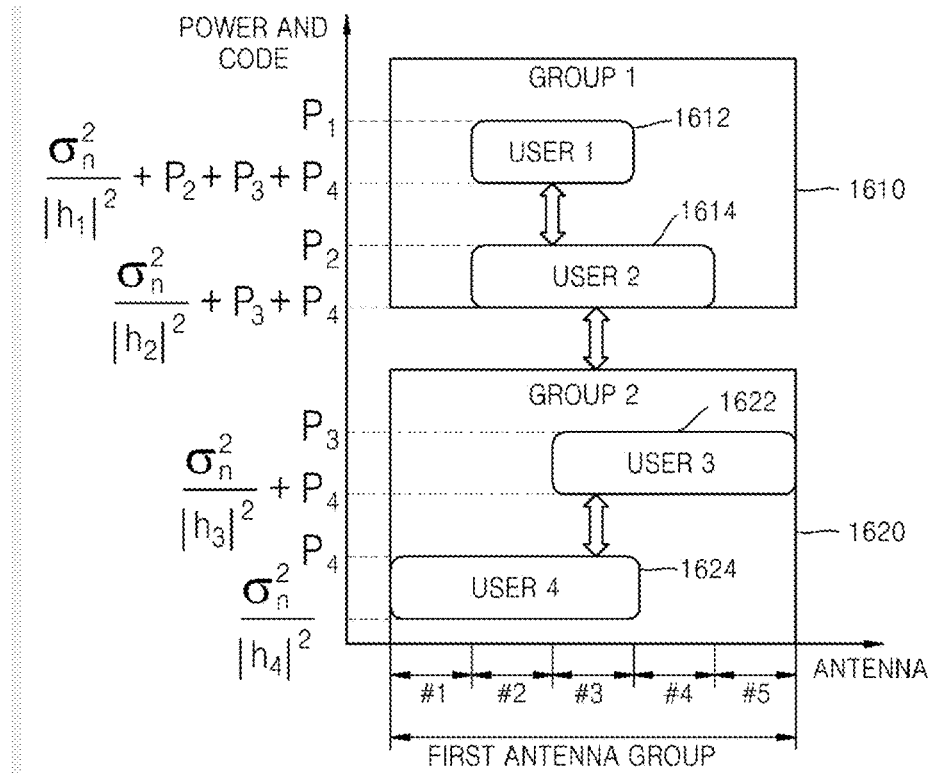
FIG. 16 is a view for explaining an example of multiplexing two user groups through power division multiplexing, and multiplexing individual user signals through power division multiplexing, according to an embodiment of the present invention.

FIG. 16 is a view for explaining resource allocation in the case of using a power division multiplexing method as a group multiplexing method, and using a power division multiplexing method as a user multiplexing method for each of two user groups, according to an embodiment of the present invention.

Referring to FIG. 16, by assigning an antenna group (that is, a first antenna group) consisting of 5 antennas to a first user group 1610 and a second user group 1620, and differentially allocating powers to the first user group 1610 and the second user group 1620, group multiplexing through power division is performed. Also, by differentially allocating powers to a first user 1612 and a second user 1614 belonging to the first user group 1610, user multiplexing through power division is preformed, and also, by differentially allocating powers to a third user 1622 and a fourth user 1624 belonging to the second user group 1620, user multiplexing through power division is performed.

The second and third antennas of the first antenna group are allocated to the first user 1612 belonging to the first user group 1610, and the second, third, and fourth antennas of the first antenna group are allocated to the second user 1614. The third, fourth, and fifth antennas of the first antenna group are allocated to the third user 1622 belonging to the second user group 1620, and the first, second, and third antennas of the first antenna group are allocated to the fourth user 1624. In this way, antennas in an antenna group assigned to a user group can be independently allocated to users belonging to the corresponding user group.

Also, for power division multiplexing, transmission power P4 is allocated to the fourth user 1624 in consideration of effective noise $$\frac{\sigma_n^2}{|h_4|^2}$$

of the fourth user 1624 so that SNR4 is ensured for the fourth user 1624, and transmission power P3 is allocated to the third user 1622 in consideration of effective noise $$\frac{\sigma_n^2}{|h_3|^2}$$

of the third user 1622 and the transmission power P4 of the fourth user 1624 that is interference to the third user 1622 so that SNR3 is ensured for the third user 1622. Also, transmission power P2 is allocated to the second user 1614 in consideration of effective noise $$\frac{\sigma_n^2}{|h_4|^2}$$

of the second user 1614 and the transmission power P3 and P4 of the third and fourth users 1622 and 1624 that are interference to the second user 1614 so that SNR2 is ensured for the second user 1614, and transmission power P1 is allocated to the first user 1612 in consideration of effective noise $$\frac{\sigma_n^2}{|h_1|^2}$$

of the first user 1612 and the transmission power P2, P3, and P4 of the second, third, and fourth users 1614, 1622, and 1624 that is interference to the first user 1612 so that SNR1 is ensured for the first user 1612.

Second, the case where the same antenna group is assigned to two user groups of first and second user groups, the two user groups are multiplexed through power division multiplexing, the first user group is user-multiplexed through power division multiplexing, and the second user group is user-multiplexed through code division multiplexing will be described below.

Figure 17:
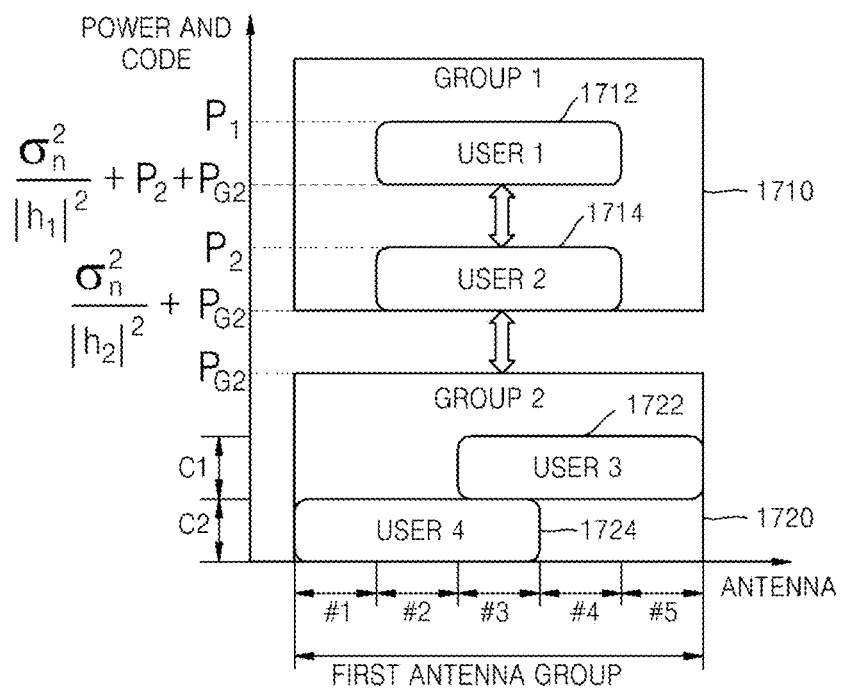
FIG. 17 is a view for explaining an example of multiplexing two user groups through power division multiplexing, multiplexing user signals in the first user group by a power division multiplexing method, and multiplexing user signals in the second user group by a code division multiplexing method, according to an embodiment of the present invention.

FIG. 17 is a view for explaining resource allocation in the case of using a power division multiplexing method as a group multiplexing method and using a power division multiplexing method and a code division multiplexing method, respectively, as user multiplexing methods for two user groups.

Referring to FIG. 17, by assigning an antenna group (a first antenna group) consisting of 5 antennas to a first user group 1710 and a second user group 1720, and differentially allocating powers to the first user group 1710 and the second user group 1720, group multiplexing through power division is performed. By differentially allocating powers to a first user 1712 and a second user 1714 belonging to the first user group 1710, user multiplexing through power division is performed, and by allocating unique user combining codes C1 and C2 respectively to a third user 1722 and a fourth user 1724 belonging to the second user group 1720, user multiplexing through code division is performed.

Also, the second, third, and fourth antennas of the first antenna group are allocated to the first user 1712 belonging to the first user group 1710, and the second, third, and fourth antennas are allocated to the second user 1714. The third, fourth, and fifth antennas of the first antenna group are allocated to the third user 1722 belonging to the second user group 1720, and the first, second, and third antennas are allocated to the fourth user 1724. In this way, each user group can allocate antennas to users independently in an antenna group allocated to the corresponding user group.

Third, the case where the same antenna group is assigned to two user groups of first and second user groups, the two user groups are multiplexed through power division multiplexing, the first user group is user-multiplexed through power division multiplexing, and the second user group is user-multiplexed through spatial division multiplexing will be described below.

Figure 18:
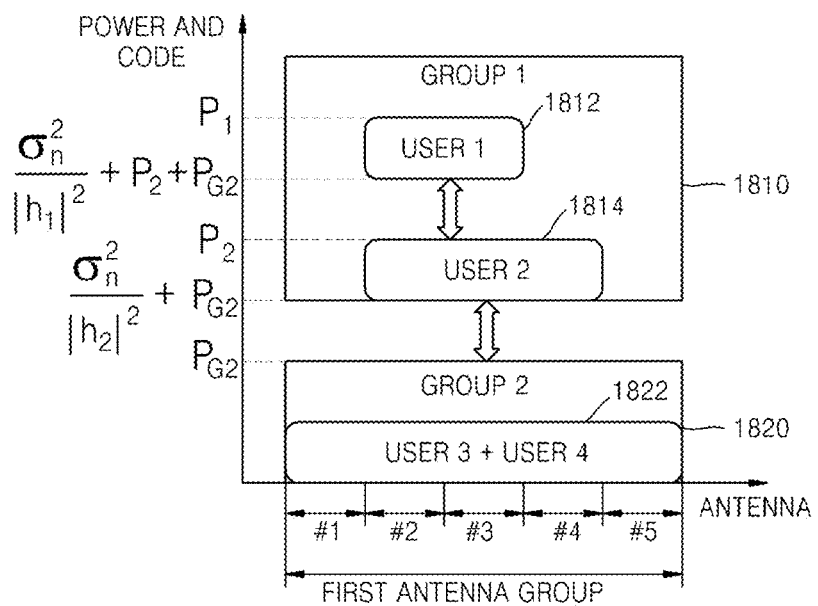
FIG. 18 is a view for explaining an example of multiplexing two user groups through power division multiplexing, multiplexing user signals in the first user group by a power division multiplexing method, and multiplexing user signals in the second user group by a spatial division multiplexing method, according to an embodiment of the present invention.

FIG. 18 is a view for explaining resource allocation in the case of using a power division multiplexing method as a group multiplexing method and using a power division multiplexing method and a spatial division multiplexing method, respectively, as user multiplexing methods for two user groups.

Referring to FIG. 18, by assigning an antenna group (a first antenna group) consisting of 5 antennas to a first user group 1810 and a second user group 1820, and differentially allocating powers to the first user group 1810 and the second user group 1820, group multiplexing through power division is performed. By differentially allocating powers to a first user 1812 and a second user 1814 belonging to the first user group 1810, user multiplexing through power division is performed, and by assigning unique user combining weight vectors respectively to a third user and a fourth user 1822 belonging to the second user group 1820, user multiplexing through spatial division is performed.

Also, the second and third antennas of the first antenna group are allocated to the first user 1812 belonging to the first user group 1810, and the second, third, and fourth antennas of the first antenna group are allocated to the second user 1814. The first, second, third, fourth, and fifth antennas of the first antenna group are allocated to the third and fourth users 1822 belonging to the second user group 1820. In this way, each user group can allocate antennas to users independently in an antenna group allocated to the corresponding user group.

Fourth, the case where the same antenna group is assigned to two user groups, the two user groups are multiplexed through power division multiplexing, and each first user group is user-multiplexed through code division multiplexing will be described below.

Figure 19:
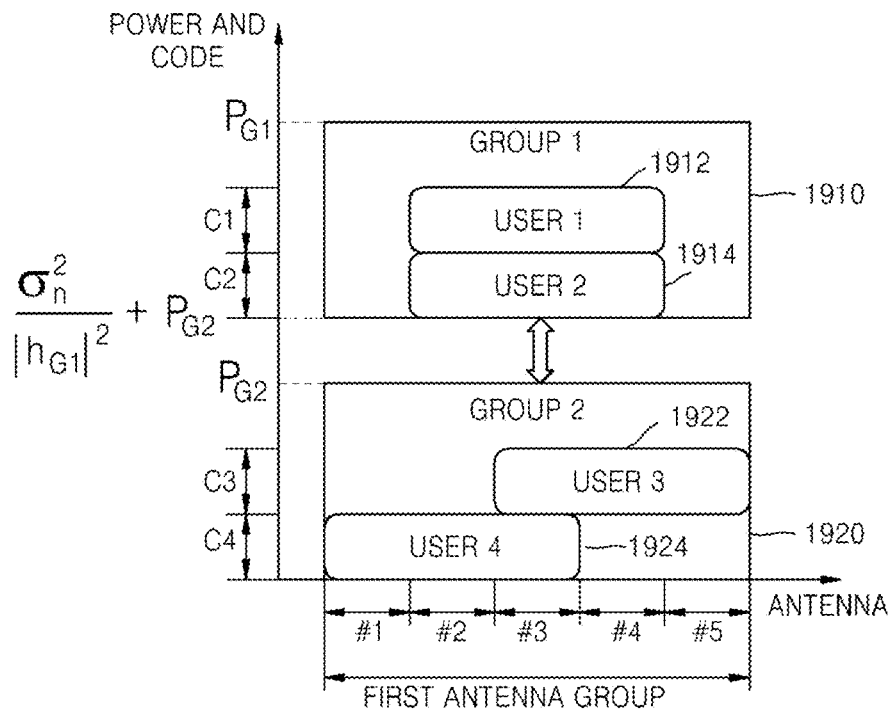
FIG. 19 is a view for explaining an example of multiplexing two user groups through power division multiplexing, and multiplexing user signals for each user group by a code division multiplexing method, according to an embodiment of the present invention.

FIG. 19 is a view for explaining resource allocation in the case of using a power division multiplexing method as a group multiplexing method and using a code division multiplexing method as a user multiplexing method for two user groups.

Referring to FIG. 19, by assigning an antenna group (a first antenna group) consisting of 5 antennas to a first user group 1910 and a second user group 1920, and differentially allocating powers to the first user group 1910 and the second user group 1920, group multiplexing through power division is performed. By allocating unique user combining codes C1 and C2 respectively to a first user 1912 and a second user 1914 belonging to the first user group 1910, user multiplexing through code division is performed, and by allocating unique user combining codes C3 and C4 respectively to a third user 1922 and a fourth user 1924 belonging to the second user group 1920, user multiplexing through code division is performed.

Also, the second, third, and fourth antennas of the first antenna group are allocated to the first user 1912 belonging to the first user group 1910, and the second, third, and fourth antennas are allocated to the second user 1914. The third, fourth, and fifth antennas of the first antenna group are allocated to the third user 1922 belonging to the second user group 1920, and the first, second, and third antennas are allocated to the fourth user 1924. In this way, each user group can allocate antennas to users independently in an antenna group allocated to the corresponding user group.

Fifth, the case where the same antenna group is assigned to two user groups of first and second user groups, the two user groups are multiplexed through power division multiplexing, the first user group is user-multiplexed through code division multiplexing, and the second user group is user-multiplexed by spatial division multiplexing will be described below.

Figure 20:
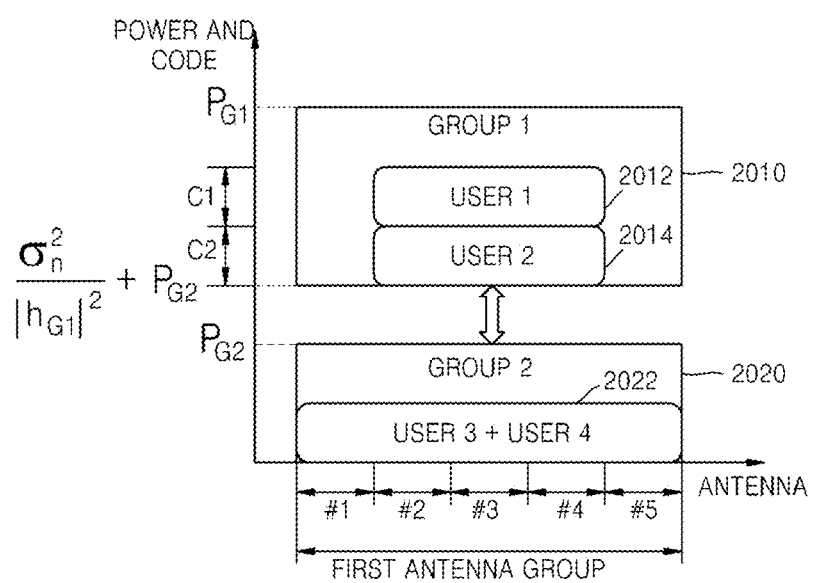
FIG. 20 is a view for explaining resource allocation when a power division multiplexing method is used as a group multiplexing method, and a code division multiplexing method and a spatial division multiplexing method are used as user multiplexing methods for two user groups, respectively, according to an embodiment of the present invention.

FIG. 20 is a view for explaining resource allocation in the case of using a power division multiplexing method as a group multiplexing method and using a code division multiplexing method and a spatial division multiplexing method respectively as user multiplexing methods for two user groups.

Referring to FIG. 20, by assigning an antenna group (a first antenna group) consisting of 5 antennas to a first user group 2010 and a second user group 2020, and differentially allocating powers to the first user group 2010 and the second user group 2020, group multiplexing through power division is performed. By allocating unique user combining codes C1 and C2 respectively to a first user 2012 and a second user 2014 belonging to the first user group 2010, user multiplexing through code division is performed, and by assigning unique user combining weight vectors respectively to third and fourth users 2022 belonging to the second user group 2020, user multiplexing through spatial division is performed.

Also, the second, third, and fourth antennas of the first antenna group are allocated to the first user 2012 belonging to the first user group 2010, and the second, third, and fourth antennas are allocated to the second user 2014. The first, second, third, fourth, and fifth antennas of the first antenna group are allocated to the third and fourth users 2022 belonging to the second user group 1920. In this way, each user group can allocate antennas to users independently in an antenna group allocated to the corresponding user group.

Sixth, the case where the same antenna group is assigned to two user groups, the two user groups are multiplexed through power division multiplexing, and each user group is user-multiplexed through spatial division multiplexing will be described below.

Figure 21:
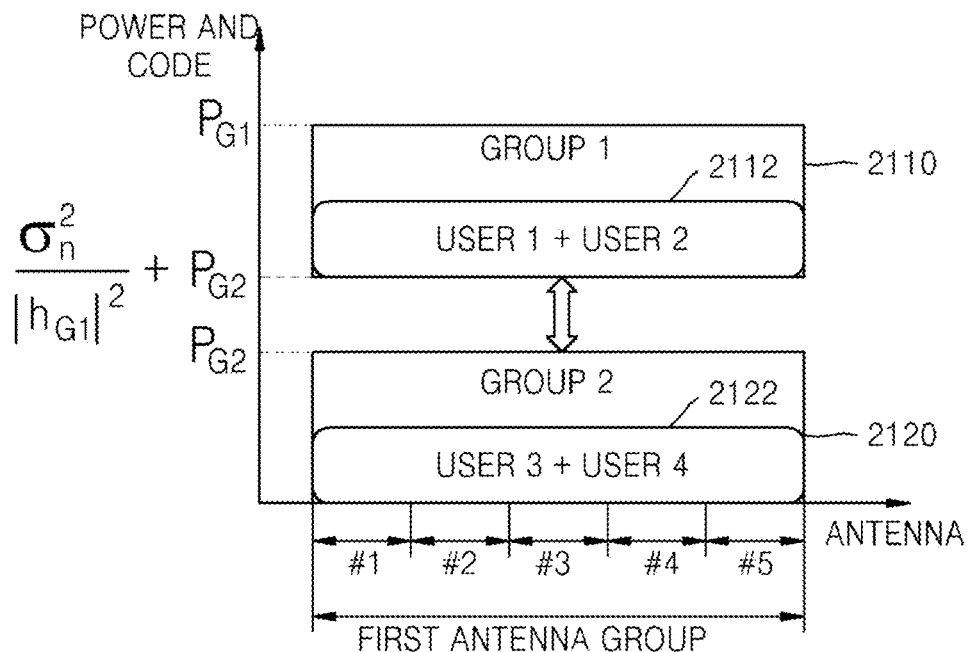
FIG. 21 is a view for explaining resource allocation when a power division multiplexing method is used as a group multiplexing method, and a spatial division multiplexing method is used as a user multiplexing method for two user groups, according to an embodiment of the present invention.

FIG. 21 is a view for explaining resource allocation in the case of using a power division multiplexing method as a group multiplexing method and using a spatial division multiplexing method as a user multiplexing method for two user groups.

Referring to FIG. 21, by assigning an antenna group (a first antenna group) consisting of 5 antennas to a first user group 2110 and a second user group 2120, and differentially allocating powers to the first user group 2110 and the second user group 2120, group multiplexing through power division is performed. By assigning unique user combining weight vectors respectively to first and second users belonging to the first user group 2110, user multiplexing through spatial division is performed (2112), and by assigning unique user combining weight vectors respectively to third and fourth users belonging to the second user group 2120, user multiplexing through spatial division is performed (2122).

Also, the first, second, third, fourth, and fifth antennas are allocated to the first and second users belonging to the first user group 2110. The first, second, third, fourth, and fifth antennas of the first antenna group are allocated to the third and fourth users belonging to the second user group 2120. In this way, each user group can allocate antennas to users independently in an antenna group allocated to the corresponding user group.

Seventh, the case where the same antenna group is assigned to two user groups, the two user groups are multiplexed through code division multiplexing, and each user group is user-multiplexed through power division multiplexing will be described below.

Figure 22:
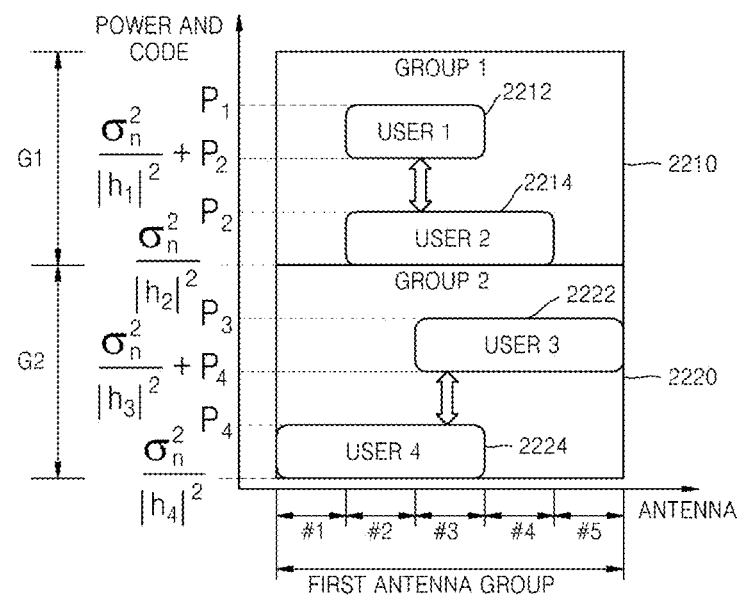
FIG. 22 is a view for explaining resource allocation when a code division multiplexing method is used as a group multiplexing method, and a power division multiplexing method is used as a user multiplexing method for two user groups, according to an embodiment of the present invention.

FIG. 22 is a view for explaining resource allocation in the case of using a code division multiplexing method as a group multiplexing method and using a power division multiplexing method as a user multiplexing method for two user groups.

Referring to FIG. 22, by assigning an antenna group (a first antenna group) consisting of 5 antennas to a first user group 2210 and a second user group 2220, and allocating unique group combining codes G1 and G2 respectively to the first user group 2210 and the second user group 2220, group multiplexing through code division is performed. By differentially allocating powers to a first user 2212 and a second user 2214 belonging to the first user group 2210, user multiplexing through power division is performed, and by differentially allocating powers to a third user 2222 and a fourth user 2224 belonging to the second user group 2220, user multiplexing through power division is performed.

Also, the second and third antennas of the first antenna group are allocated to the first user 2212 belonging to the first user group 2210, and the second, third, and fourth antennas are allocated to the second user 2214. The third, fourth, and fifth antennas are allocated to the third user 2222 belonging to the second user group 2220, and the first, second, and third antennas are allocated to the fourth user 2224. In this way, each user group can allocate antennas to users independently in an antenna group allocated to the corresponding user group.

Eighth, the case where the same antenna group is assigned to two user groups of first and second user groups, the two user groups are multiplexed through code division multiplexing, the first user group is user-multiplexed through power division multiplexing, and the second user group is user-multiplexed through code division multiplexing will be described below.

Figure 23:
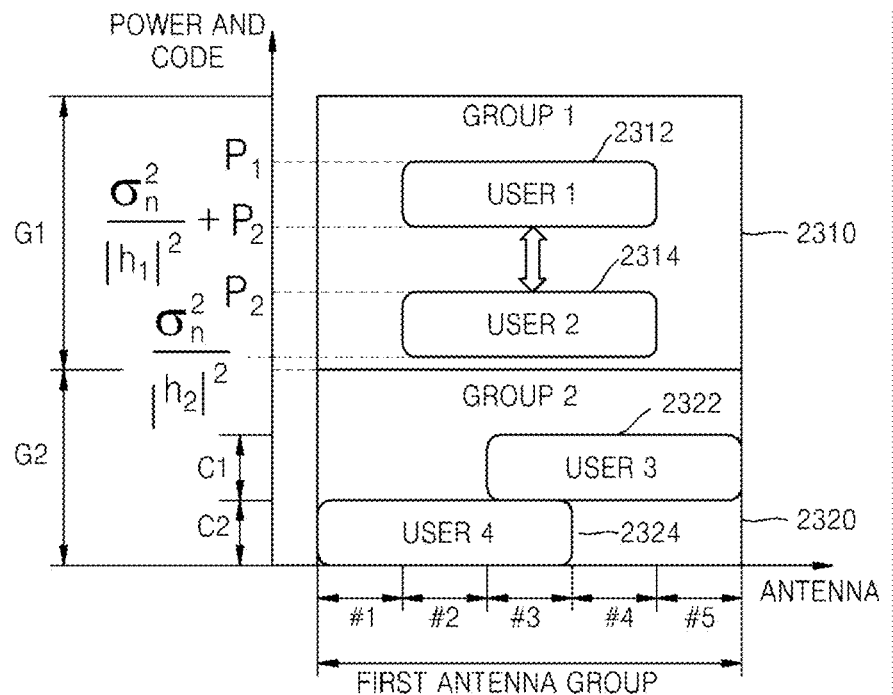
FIG. 23 is a view for explaining resource allocation when a code division multiplexing method is used as a group multiplexing method, and a power division multiplexing method and a code division multiplexing method are used as user multiplexing methods for two user groups, respectively, according to an embodiment of the present invention.

FIG. 23 is a view for explaining resource allocation in the case of using a code division multiplexing method as a group multiplexing method and using a power division multiplexing method and a code division multiplexing method respectively as user multiplexing methods for two user groups.

Referring to FIG. 23, by assigning an antenna group (a first antenna group) consisting of 5 antennas to a first user group 2310 and a second user group 2320, and allocating unique group combining codes G1 and G2 respectively to the first user group 2310 and the second user group 2320, group multiplexing through code division is performed. By differentially allocating powers to a first user 2312 and a second user 2314 belonging to the first user group 2310, user multiplexing through power division is performed, and by allocating unique user combining codes to a third user 2322 and a fourth user 2324 belonging to the second user group 2320, user multiplexing through code division is performed.

Also, the second, third, and fourth antennas of the first antenna group are allocated to the first user 2312 belonging to the first user group 2310, and the second, third, and fourth antennas are allocated to the second user 2314. The third, fourth, and fifth antennas of the first antenna group are allocated to the third user 2322 belonging to the second user group 2320, and the first, second, and third antennas are allocated to the fourth user 2324. In this way, each user group can allocate antennas to users independently in an antenna group allocated to the corresponding user group.

Ninth, the case where the same antenna group is assigned to two user groups of first and second user groups, the two user groups are multiplexed through code division multiplexing, the first user group is user-multiplexed through power division multiplexing, and the second user group is user-multiplexed through spatial division multiplexing will be described below.

Figure 24:
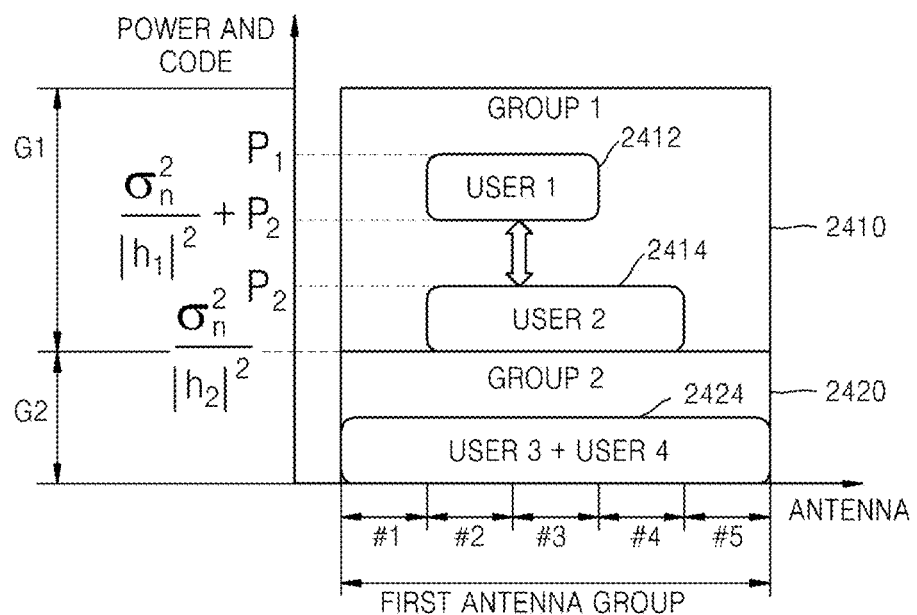
FIG. 24 is a view for explaining resource allocation when a code division multiplexing method is used as a group multiplexing method, and a power division multiplexing method and a spatial division multiplexing method are used as user multiplexing methods for two user groups, respectively, according to an embodiment of the present invention.

FIG. 24 is a view for explaining resource allocation in the case of using a code division multiplexing method as a group multiplexing method and using a power division multiplexing method and a spatial division multiplexing method respectively as user multiplexing methods for two user groups.

Referring to FIG. 24, by assigning an antenna group (a first antenna group) consisting of 5 antennas to a first user group 2410 and a second user group 2420, and allocating unique group combining codes G1 and G2 respectively to the first user group 2410 and the second user group 2420, group multiplexing through code division is performed. By differentially allocating powers to a first user 2412 and a second user 2414 belonging to the first user group 2410, user multiplexing through power division is performed, and by allocating unique user combining weigh vectors respectively to third and fourth users belonging to the second user group 2420, user multiplexing through spatial division is performed (2422).

Also, the second and third antennas of the first antenna group are allocated to the first user 2412 belonging to the first user group 2410, and the second, third, and fourth antennas are allocated to the second user 2414. The first, second, third, fourth, and fifth antennas of the first antenna group are allocated to the third and fourth users belonging to the second user group 2420. In this way, each user group can allocate antennas to users independently in an antenna group allocated to the corresponding user group.

Tenth, the case where the same antenna group is assigned to two user groups, the two user groups are multiplexed through code division multiplexing, and each user group is user-multiplexed through code division multiplexing will be described below.

Figure 25:
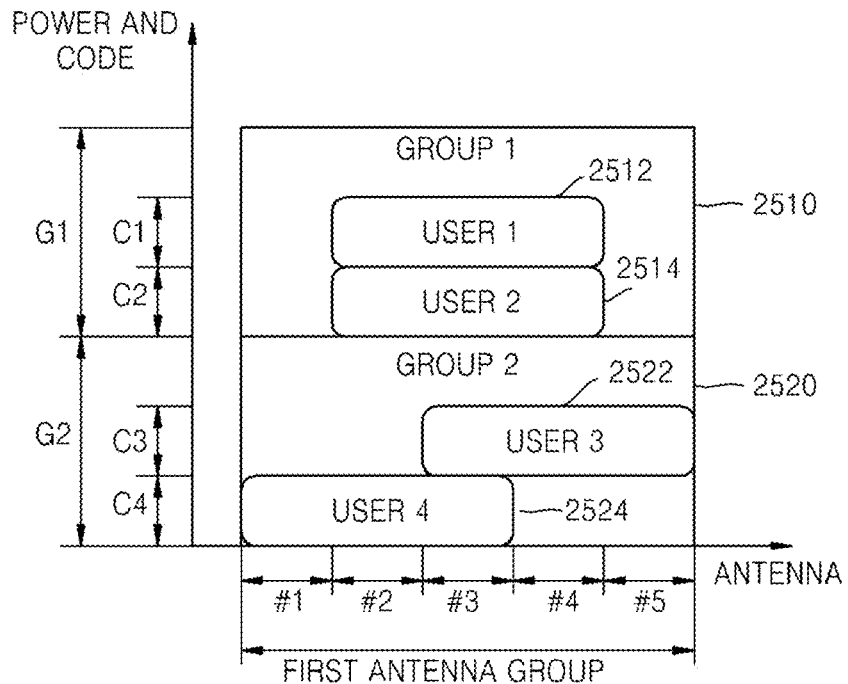
FIG. 25 is a view for explaining resource allocation when a code division multiplexing method is used as a group multiplexing method, and a code division multiplexing method is used as a user multiplexing method for two user groups, according to an embodiment of the present invention.

FIG. 25 is a view for explaining resource allocation in the case of using a code division multiplexing method as a group multiplexing method and using a code division multiplexing method as a user multiplexing method for two user groups.

Referring to FIG. 25, by assigning an antenna group (a first antenna group) consisting of 5 antennas to a first user group 2510 and a second user group 2520, and allocating unique group combining codes G1 and G2 respectively to the first user group 2510 and the second user group 2520, group multiplexing through code division is performed. By allocating unique codes C1 and C2 respectively to a first user 2512 and a second user 2514 belonging to the first user group 2510, user multiplexing through power division is performed, and by allocating unique codes C3 and C4 respectively to a third user 2522 and a fourth user 2524 belonging to the second user group 2520, user multiplexing through code division is performed.

Also, the second, third, and fourth antennas of the first antenna group are allocated to the first user 2512 belonging to the first user group 2510, and the second, third, and fourth antennas are allocated to the second user 2514. The third, fourth, and fifth antennas of the first antenna group are allocated to the third user 2522 belonging to the second user group 2520, and the first, second, and third antennas are allocated to the fourth user 2524. In this way, each user group can allocate antennas to users independently in an antenna group allocated to the corresponding user group.

Eleventh, the case where the same antenna group is assigned to two user groups of first and second user groups, the two user groups are multiplexed through code division multiplexing, the first user group is user-multiplexed through code division multiplexing, and the second user group is user-multiplexed through spatial division multiplexing will be described below.

Figure 26:
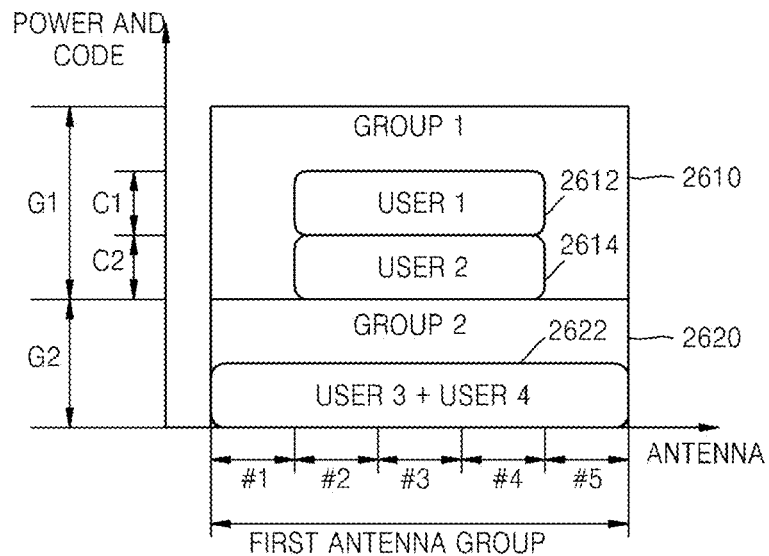
FIG. 26 is a view for explaining resource allocation when a code division multiplexing method is used as a group multiplexing method, and a code division multiplexing method and a spatial division multiplexing method are used as user multiplexing methods for two user groups, respectively, according to an embodiment of the present invention.

FIG. 26 is a view for explaining resource allocation in the case of using a code division multiplexing method as a group multiplexing method and using a code division multiplexing method and a spatial division multiplexing method respectively as user multiplexing methods for two user groups.

Referring to FIG. 26, by assigning an antenna group consisting of 5 antennas to a first user group 2610 and a second user group 2620, and allocating unique group combining codes G1 and G2 respectively to the first user group 2610 and the second user group 2620, group multiplexing through code division is performed. By allocating unique codes C1 and C2 respectively to a first user 2612 and a second user 2614 belonging to the first user group 2610, user multiplexing through code division is performed, and by assigning unique user combining weight vectors respectively to third and fourth users belonging to the second user group 2620, user multiplexing through spatial division is performed.

Also, the second, third, and fourth antennas of the first antenna group are allocated to the first user 2612 belonging to the first user group 2610, and the second, third, and fourth antennas are allocated to the second user 2614. The first, second, third, fourth, and fifth antennas of the first antenna group are allocated to the third and fourth users belonging to the second user group 2620. In this way, each user group can allocate antennas to users independently in an antenna group allocated to the corresponding user group.

Twelfth, the case where the same antenna group is assigned to two user groups, the two user groups are multiplexed through code division multiplexing, and each user group is user-multiplexed through spatial division multiplexing will be described below.

Figure 27:
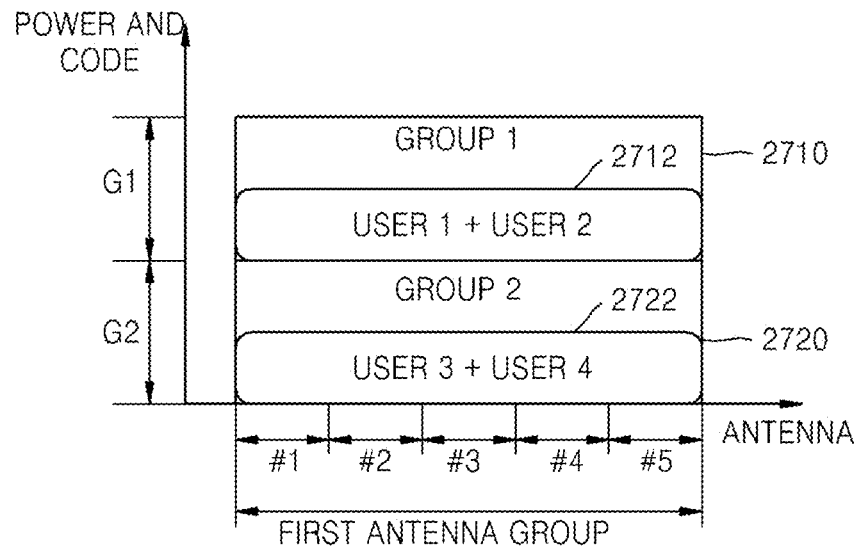
FIG. 27 is a view for explaining resource allocation when a code division multiplexing method is used as a group multiplexing method, and a spatial division multiplexing method is used as a user multiplexing method for two user groups, according to an embodiment of the present invention.

FIG. 27 is a view for explaining resource allocation in the case of using a code division multiplexing method as a group multiplexing method and using a spatial division multiplexing method as a user multiplexing method for two user groups.

Referring to FIG. 27, by assigning an antenna group consisting of 5 antennas to a first user group 2710 and a second user group 2720, and allocating unique group combining codes G1 and G2 respectively to the first user group 2710 and the second user group 2720, group multiplexing through code division is performed. By assigning unique user combining weight vectors respectively to first and second users belonging to the first user group 2710, user multiplexing through spatial division is performed (2712), and by assigning unique user combining weight vectors respectively to third and fourth users belonging to the second user group 2720, user multiplexing through spatial division is performed (2722).

Also, the first, second, third, fourth, and fifth antennas of the first antenna group are allocated to the first and second users belonging to the first user group 2710. The first, second, third, fourth, and fifth antennas of the first antenna group are allocated to the third and fourth users belonging to the second user group 2720. In this way, each user group can allocate antennas to users independently in an antenna group allocated to the corresponding user group.

Thirteenth, the case where the same antenna group is assigned to two user groups, the two user groups are multiplexed through spatial division multiplexing, and each user group is user-multiplexed through power division multiplexing will be described below.

Figure 28:
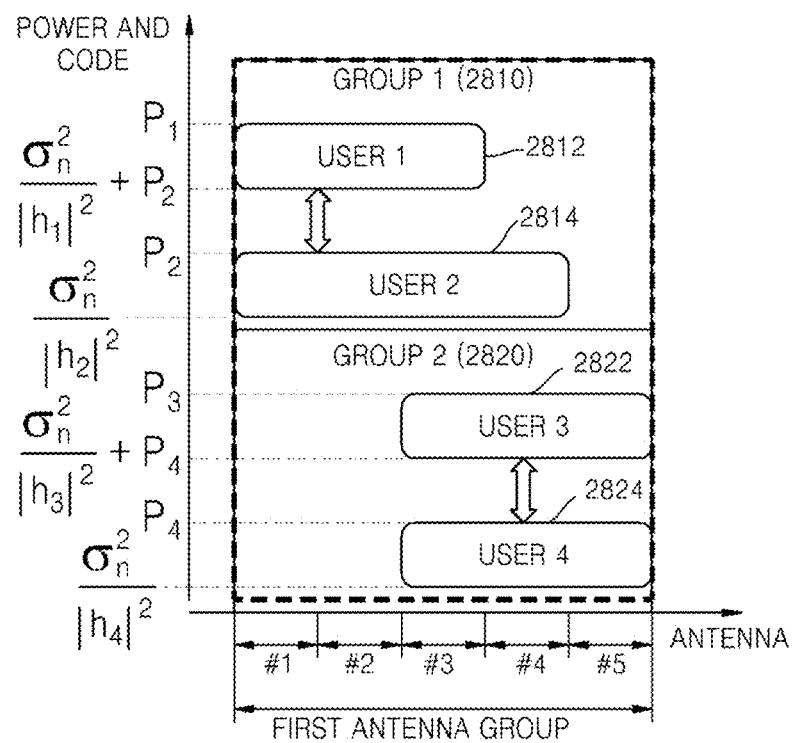
FIG. 28 is a view for explaining resource allocation when a spatial division multiplexing method is used as a group multiplexing method, and a power division multiplexing method is used as a user multiplexing method for two user groups, according to an embodiment of the present invention.

FIG. 28 is a view for explaining resource allocation in the case of using a spatial division multiplexing method as a group multiplexing method and using a power division multiplexing method as a user multiplexing method for two user groups.

Referring to FIG. 28, by assigning an antenna group consisting of 5 antennas to a first user group 2810 and a second user group 2820, and assigning unique group combining weight vectors respectively to the first user group 2810 and the second user group 2820, group multiplexing through spatial division is performed. By differentially allocating powers to a first user 2812 and a second user 2814 belonging to the first user group 2810, user multiplexing through power division is performed, and by differentially allocating powers to a third user 2822 and a fourth user 2824 belonging to the second user group 2820, user multiplexing through power division is performed.

Also, the first and second antennas of the first antenna group are allocated to the first user 2812 belonging to the first user group 2810, and the first, second, and third antennas are allocated to the second user 2814. The third, fourth, and fifth antennas of the first antenna group are allocated to the third user 2822 belonging to the second user group 2820, and the third, fourth, and fifth antennas are allocated to the fourth user 2824. In this way, each user group can allocate antennas to users independently in an antenna group allocated to the corresponding user group.

Fourteenth, the case where the same antenna group is assigned to two user groups of first and second user groups, the two user groups are multiplexed by using mutually exclusive antennas for the first user group and the second user group when antenna group division is used to combine signals of the two user groups through spatial division multiplexing, and each user group is user-multiplexed through power division multiplexing will be described below.

Figure 29:
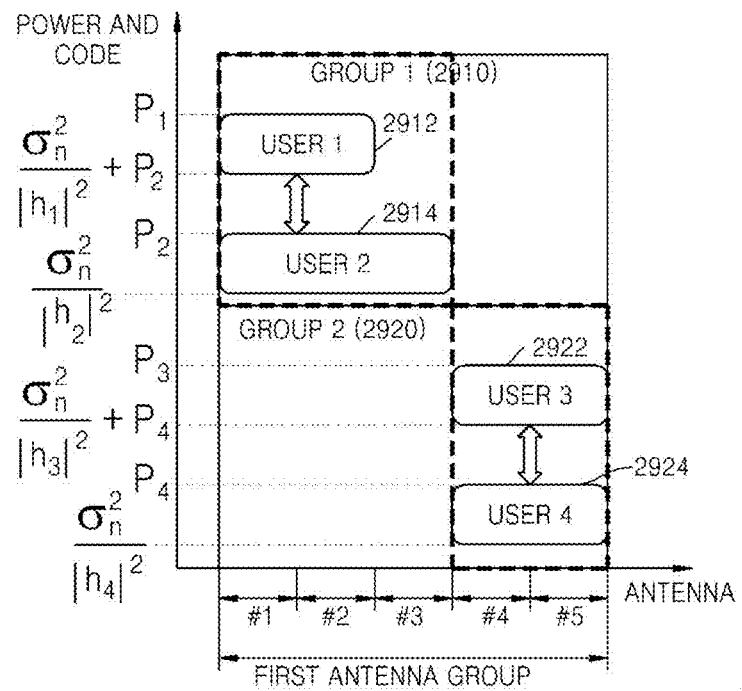
FIG. 29 is a view for explaining resource allocation when an antenna group division multiplexing method is used as a group multiplexing method, and a power division multiplexing method is used as a user multiplexing method for two user groups, according to an embodiment of the present invention.

FIG. 29 is a view for explaining resource allocation in the case of using an antenna group division multiplexing method as a group multiplexing method and using a power division multiplexing method as a user multiplexing method for two user groups.

Referring to FIG. 29, by assigning an antenna group consisting of 5 antennas to a first user group 2910 and a second user group 2920, and allowing the first user group 2910 and the second user group 2920 to use different antennas, group multiplexing through antenna group division is performed. By differentially allocating powers to a first user 2912 and a second user 2914 belonging to the first user group 2910, user multiplexing through power division is performed, and by differentially allocating powers to a third user 2922 and a fourth user 2924 belonging to the second user group 2920, user multiplexing through power division is performed.

Also, the first and second antennas of the first antenna group are allocated to the first user 2912 belonging to the first user group 2910, and the first, second, and third antennas are allocated to the second user 2914. The fourth and fifth antennas of the first antenna group are allocated to the third user 2922 belonging to the second user group 2920, and the fourth and fifth antennas are allocated to the fourth user 2924. In this way, each user group can allocate antennas to users independently in an antenna group allocated to the corresponding user group.

Fifteenth, the case where the same antenna group is assigned to two user groups of first and second user groups, the two user groups are multiplexed through spatial division multiplexing, the first user group is user-multiplexed through power division multiplexing, and the second user group is user-multiplexed through code division multiplexing will be described.

Figure 30:
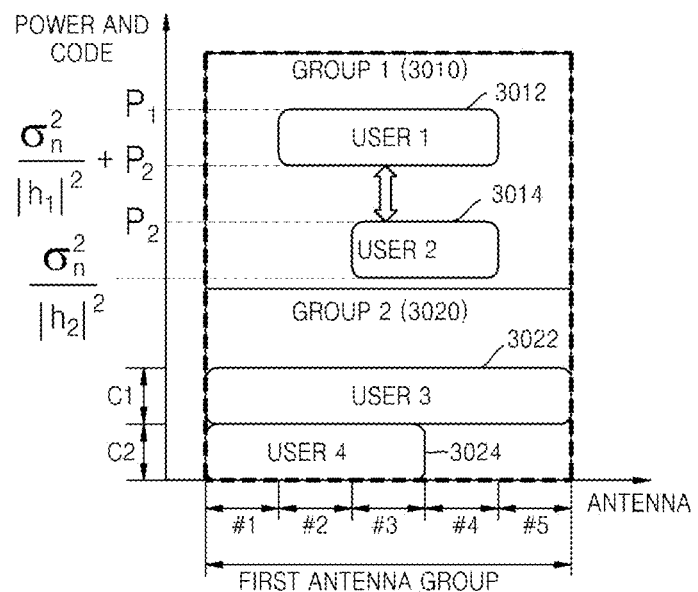
FIG. 30 is a view for explaining resource allocation when a spatial division multiplexing method is used as a group multiplexing method, and a power division multiplexing method and a code division multiplexing method are used as user multiplexing methods for two user groups, respectively, according to an embodiment of the present invention.

FIG. 30 is a view for explaining resource allocation in the case of using a spatial division multiplexing method as a group multiplexing method and using a power division multiplexing method and a code division multiplexing method respectively as user multiplexing methods for two user groups.

Referring to FIG. 30, by assigning an antenna group consisting of 5 antennas to a first user group 3010 and a second user group 3020, and assigning unique group combining weight vectors to the first user group 3010 and the second user group 3020, group multiplexing through spatial division is performed. By differentially allocating powers to a first user 3012 and a second user 3014 belonging to the first user group 3010, user multiplexing through power division is performed, and by allocating unique user combining codes C1 and C2 to a third user 3022 and a fourth user 3024 belonging to the second user group 3020, user multiplexing through code division is performed.

Also, the second, third, and fourth antennas of the first antenna group are allocated to the first user 3012 belonging to the first user group 3010, and the third and fourth antennas are allocated to the second user 3014. The first, second, third, fourth, and fifth antennas of the first antenna group are allocated to the third user 3022 belonging to the second user group 3020, and the first, second, and third antennas are allocated to the fourth user 3024. In this way, each user group can allocate antennas to users independently in an antenna group allocated to the corresponding user group.

Sixteenth, the case where the same antenna group is assigned to two user groups of first and second user groups, the two user groups are multiplexed by using mutually exclusive antennas for the first user group and the second user group when antenna group division is used to combine signals of the two user groups through spatial division multiplexing, the first user group is user-multiplexed through power division multiplexing, and the second user group is user-multiplexed through code division multiplexing will be described below.

Figure 31:
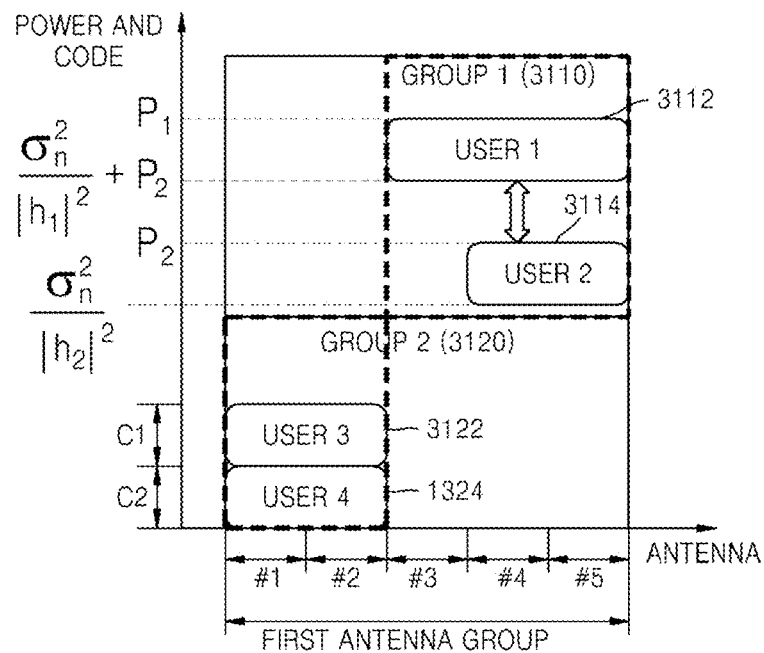
FIG. 31 is a view for explaining resource allocation when an antenna group division multiplexing method is used as a group multiplexing method, and a power division multiplexing method and a spatial division multiplexing method are used as user multiplexing methods for two user groups, respectively, according to an embodiment of the present invention.

FIG. 31 is a view for explaining resource allocation in the case of using an antenna group division multiplexing method as a group multiplexing method and using a power division multiplexing method and a code division multiplexing method respectively as user multiplexing methods for two user groups.

Referring to FIG. 31, by assigning an antenna group consisting of 5 antennas to a first user group 3110 and a second user group 3120, and allowing the first user group 3110 and the second user group 3120 to use different antennas, group multiplexing through antenna group division is performed. By differentially allocating powers to a first user 3112 and a second user 3114 belonging to the first user group 3110, user multiplexing through power division is performed, and by allocating unique user combining codes C1 and C2 to a third user 3122 and a fourth user 3124 belonging to the second user group 3120, user multiplexing through code division is performed.

Also, the third, fourth, and fifth antennas of the first antenna group are allocated to the first user 3112 belonging to the first user group 3110, and the fourth and fifth antennas are allocated to the second user 3114. The first and second antennas of the first antenna group are allocated to the third user 3122 belonging to the second user group 3120, and the first and second antennas are allocated to the fourth user 3124. In this way, each user group can allocate antennas to users independently in an antenna group allocated to the corresponding user group.

Seventeenth, the case where the same antenna group is assigned to two user groups of first and second user groups, the two user groups are multiplexed through spatial division multiplexing, the first user group is user-multiplexed through power division multiplexing, and the second user group is user-multiplexed through spatial division multiplexing will be described.

Figure 32:
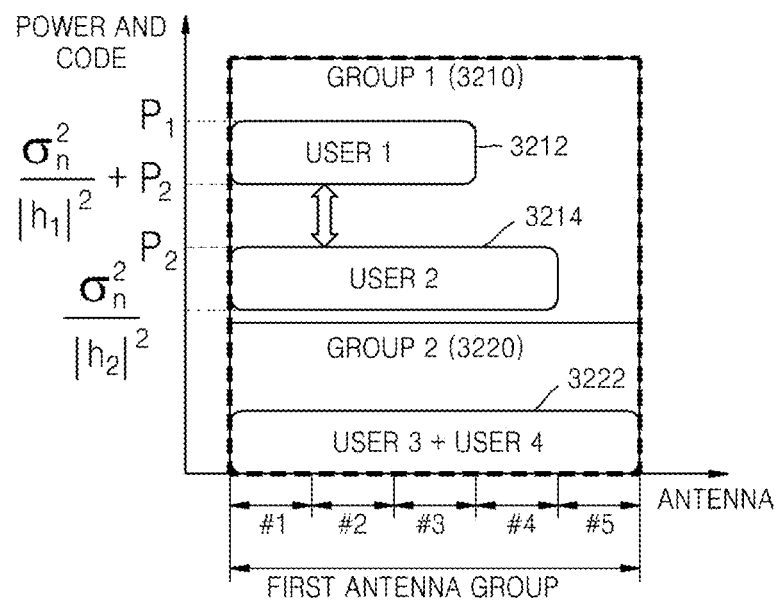
FIG. 32 is a view for explaining resource allocation when a spatial division multiplexing method is used as a group multiplexing method, and a code division multiplexing method is used as a user multiplexing method for two user groups, according to an embodiment of the present invention.

FIG. 32 is a view for explaining resource allocation in the case of using a spatial division multiplexing method as a group multiplexing method and using a power division multiplexing method and a spatial division multiplexing method respectively as user multiplexing methods for two user groups.

Referring to FIG. 32, by assigning an antenna group consisting of 5 antennas to a first user group 3210 and a second user group 3220, and assigning unique group combining weight vectors to the first user group 3210 and the second user group 3220, group multiplexing through spatial division is performed. By differentially allocating powers to a first user 3212 and a second user 3214 belonging to the first user group 3210, user multiplexing through power division is performed, and by assigning unique user combining weight vectors to third and fourth users belonging to the second user group 3220, user multiplexing through code division is performed (3222).

Also, the first, second, and third antennas of the first antenna group are allocated to the first user 3212 belonging to the first user group 3210, and the first, second, third and fourth antennas are allocated to the second user 3214. The first, second, third, fourth, and fifth antennas of the first antenna group are allocated to the third user 3222 belonging to the second user group 3220, and the first, second, third, fourth, and fifth antennas are allocated to the fourth user 3224. In this way, each user group can allocate antennas to users independently in an antenna group allocated to the corresponding user group.

Eighteenth, the case where the same antenna group is assigned to two user groups of first and second user groups, the two user groups are multiplexed by using mutually exclusive antennas for the first user group and the second user group when antenna group division is used to combine signals of the two user groups through spatial division multiplexing, the first user group is user-multiplexed through power division multiplexing, and the second user group is user-multiplexed through spatial division multiplexing will be described below.

Figure 33:
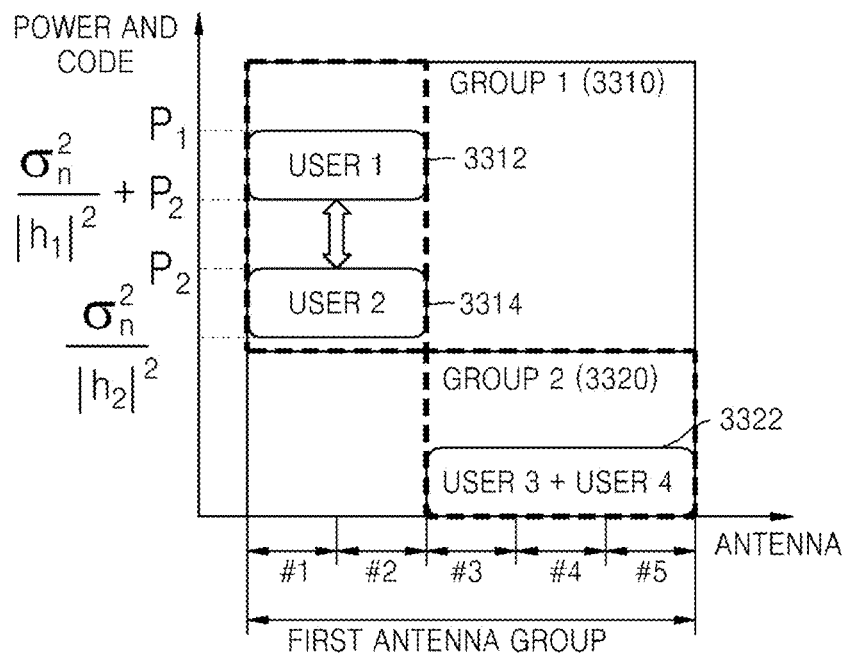
FIG. 33 is a view for explaining resource allocation when an antenna group division multiplexing method is used as a group multiplexing method, and a spatial division multiplexing method is used as a user multiplexing method for two user groups, according to an embodiment of the present invention.

FIG. 33 is a view for explaining resource allocation in the case of using an antenna group division multiplexing method as a group multiplexing method and using a power division multiplexing method and a spatial division multiplexing method respectively as user multiplexing methods for two user groups.

Referring to FIG. 33, by assigning an antenna group consisting of 5 antennas to a first user group 3310 and a second user group 3320, and allowing the first user group 3310 and the second user group 3320 to use different antennas, group multiplexing through antenna group division is performed. By differentially allocating powers to a first user 3312 and a second user 3314 belonging to the first user group 3310, user multiplexing through power division is performed, and by assigning unique user combining weight vectors to a third user and a fourth user belonging to the second user group 3320, user multiplexing through spatial division is performed (3322).

Also, the first and second antennas of the first antenna group are allocated to the first user 3312 belonging to the first user group 3110, and the first and second antennas are allocated to the second user 3314. The third, fourth, and fifth antennas of the first antenna group are allocated to the third user belonging to the second user group 3320, and the third, fourth, and fifth antennas are allocated to the fourth user. In this way, each user group can allocate antennas to users independently in an antenna group allocated to the corresponding user group.

Nineteenth, the case where the same antenna group is assigned to two user groups, the two user groups are multiplexed through spatial division multiplexing, and each user group is user-multiplexed through code division multiplexing will be described below.

Figure 34:
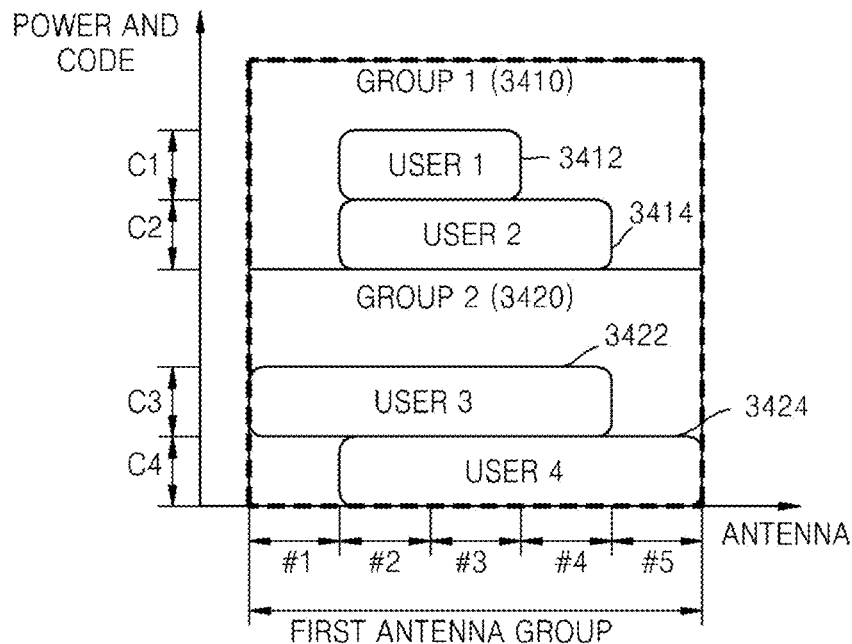
FIG. 34 is a view for explaining resource allocation when a spatial division multiplexing method is used as a group multiplexing method, and a code division multiplexing method is used as a user multiplexing method for two user groups, according to an embodiment of the present invention.

FIG. 34 is a view for explaining resource allocation in the case of using a spatial division multiplexing method as a group multiplexing method and using a code division multiplexing method as a user multiplexing method for two user groups.

Referring to FIG. 34, by assigning an antenna group consisting of 5 antennas to a first user group 3410 and a second user group 3420, and assigning unique group combining weight vectors respectively to the first user group 3410 and the second user group 3420, group multiplexing through spatial division is performed. By allocating unique user combining codes C1 and C2 to a first user 3412 and a second user 3414 belonging to the first user group 3410, user multiplexing through code division is performed, and by allocating unique user combining codes C3 and C4 to a third user 3422 and a fourth user 3424 belonging to the second user group 3420, user multiplexing through code division is performed.

Also, the second and third antennas of the first antenna group are allocated to the first user 3412 belonging to the first user group 3410, and the second, third, and fourth antennas are allocated to the second user 3414. The first, second, third, and fourth antennas of the first antenna group are allocated to the third user 3422 belonging to the second user group 3420, and the second, third, fourth, and fifth antennas are allocated to the fourth user 3424. In this way, each user group can allocate antennas to users independently in an antenna group allocated to the corresponding user group.

Twentieth, the case where the same antenna group is assigned to two user groups of first and second user groups, the two user groups are multiplexed through spatial division multiplexing, the first user group is user-multiplexed through code division multiplexing, and the second user group is user-multiplexed through spatial division multiplexing will be described.

Figure 35:
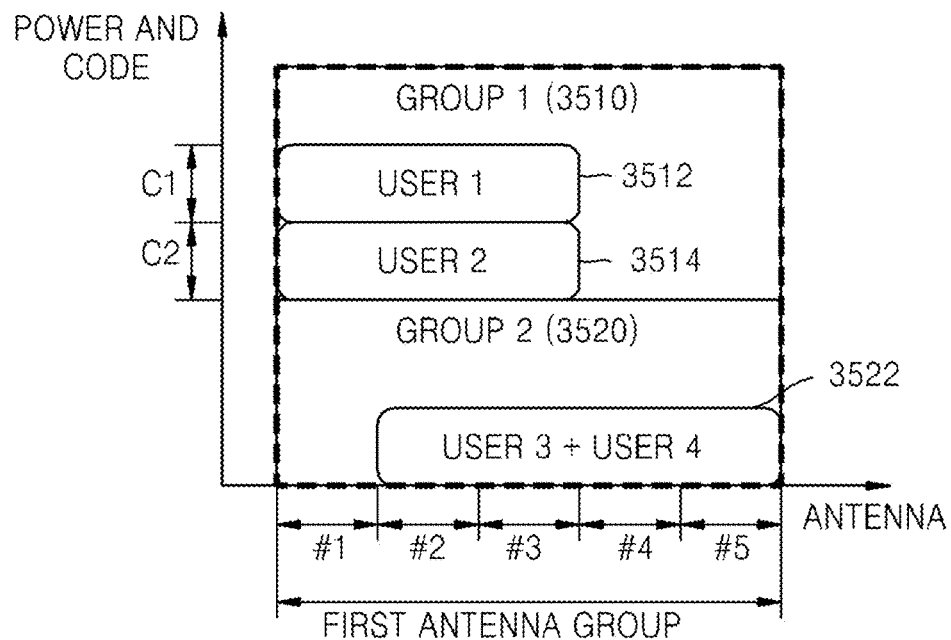
FIG. 35 is a view for explaining resource allocation when a spatial division multiplexing method is used as a group multiplexing method, and a code division multiplexing method and a spatial division multiplexing method are used as user multiplexing methods for two user groups, respectively, according to an embodiment of the present invention.

FIG. 35 is a view for explaining resource allocation in the case of multiplexing two user groups of first and second user groups through spatial division multiplexing, multiplexing the first user group through code division multiplexing, and multiplexing the second user group through spatial division multiplexing.

Referring to FIG. 35, by assigning an antenna group consisting of 5 antennas to a first user group 3510 and a second user group 3520, and assigning unique group combining weight vectors to the first user group 3510 and the second user group 3520, group multiplexing through spatial division is performed. By allocating unique user combining codes C1 and C2 to a first user 3512 and a second user 3514 belonging to the first user group 3510, user multiplexing through code division is performed, and by assigning unique user combining weight vectors to a third user 3522 and a fourth user 3524 belonging to the second user group 3520, user multiplexing through spatial division is performed.

Also, the first, second, and third antennas of the first antenna group are allocated to the first user 3512 belonging to the first user group 3510, and the first, second, and third antennas are allocated to the second user 3514. The second, third, fourth, and fifth antennas of the first antenna group are allocated to the third user 3522 belonging to the second user group 3520, and the second, third, fourth, and fifth antennas are allocated to the fourth user 3524. In this way, each user group can allocate antennas to users independently in an antenna group allocated to the corresponding user group.

Twentyfirst, the case where the same antenna group is assigned to two user groups, the two user groups are multiplexed through spatial division multiplexing, and each user group is user-multiplexed through spatial division multiplexing will be described below.

Figure 36:
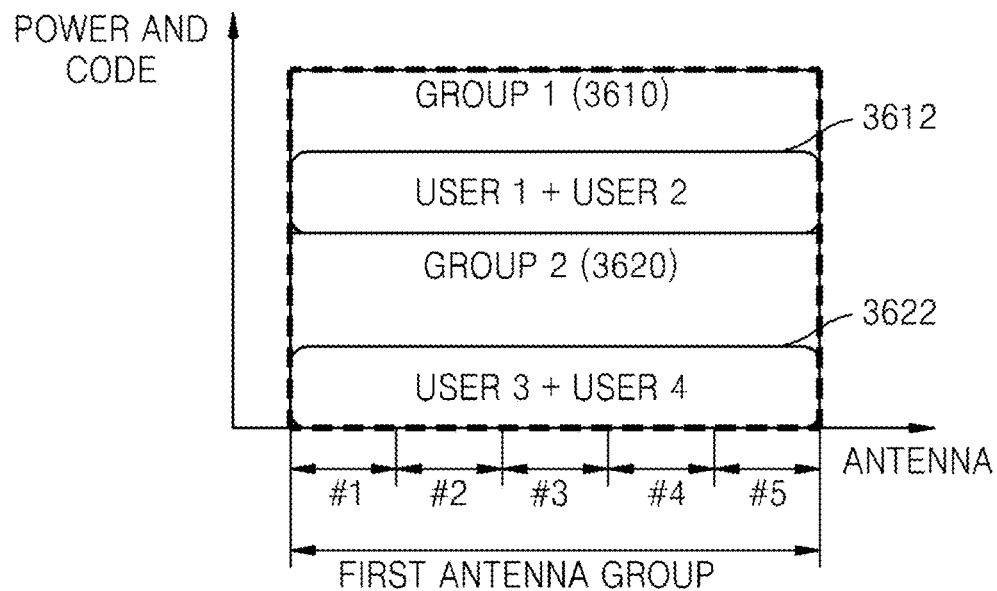
FIG. 36 is a view for explaining resource allocation when a spatial division multiplexing method is used as a group multiplexing method, and a spatial division multiplexing method is used as a user multiplexing method for two user groups, according to an embodiment of the present invention.

FIG. 36 is a view for explaining resource allocation in the case of multiplexing two user groups through spatial division multiplexing and multiplexing each user group through spatial division multiplexing.

Referring to FIG. 36, by assigning an antenna group consisting of 5 antennas to a first user group 3610 and a second user group 3620, and assigning unique group combining weight vectors respectively to the first user group 3610 and the second user group 3620, group multiplexing through spatial division is performed. By assigning unique user combining weight vectors to a first user and a second user belonging to the first user group 3610, user multiplexing through spatial division is performed (3612), and by assigning unique user combining weight vectors to a third user and a fourth user belonging to the second user group 3620, user multiplexing through spatial division is performed (3622).

Also, the first, second, third, fourth, and fifth antennas of the first antenna group are allocated to the first and second users belonging to the first user group 3610, and the first, second, third, fourth, and fifth antennas of the first antenna group are allocated to the third and fourth users belonging to the second user group. In this way, each user group can allocate antennas to users independently in an antenna group allocated to the corresponding user group.

Hereinafter, a multiplexing method for allocating a plurality of antenna groups to a plurality of user groups will be described.

That is, methods for multiplexing a plurality of user groups by allocating a plurality of antenna groups to the user groups, according to embodiments of the present invention, will be described below. For convenience of description, in the following embodiments, it is assumed that two antenna groups are allocated to two user groups, however, the embodiments can be applied in the same manner to the cases where three or more user groups exist and where three or more antenna groups are allocated.

First, the case where mutually exclusive antenna groups are respectively assigned to two user groups of first and second user groups, the two user groups are multiplexed through spatial division multiplexing, the first user group is user-multiplexed through code division multiplexing, and the second user group is user-multiplexed through spatial division multiplexing will be described.

Figure 37:
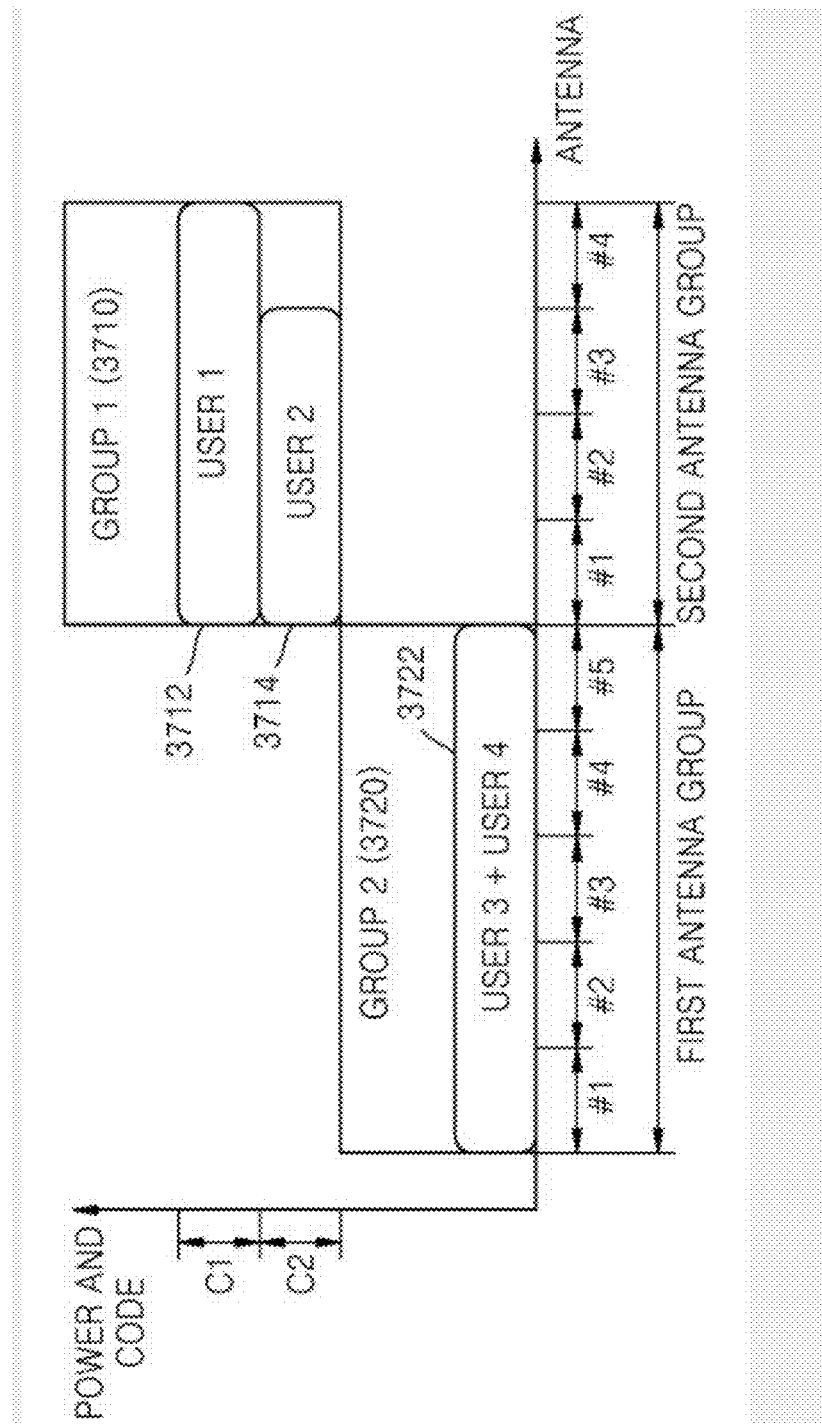
FIG. 37 is a view for explaining resource allocation when two user groups use different antenna groups, according to an embodiment of the present invention.

FIG. 37 is a view for explaining resource allocation in the case where two user groups use different antenna groups, according to an embodiment of the present invention.

Referring to FIG. 37, by assigning unique group combining weight vectors to first and second user groups 3710 and 3720, respectively, to assign a second antenna group consisting of 4 antennas to the first user group 3710 and assign a first antenna group consisting of 5 antennas to the second user group 3720 so that the first user group 3710 and the second user group 3720 use mutually exclusive, different antennas, group multiplexing through spatial division is performed. By allocating unique user combining codes C1 and C2 to a first user 3712 and a second user 3714 belonging to the first user group 3710, user multiplexing through code division is performed, and by assigning unique user combining weight vectors to a third user and a fourth user belonging to the second user group 3720, user multiplexing through spatial division is performed (3722). In this way, by allocating a unique group combining weight vector to each user group, group multiplexing through spatial division is performed, and by multiplexing each user group through at least one user multiplexing method among power division, code division, and spatial division, a plurality of signals are simultaneously transmitted.

Also, the first, second, third, and fourth antennas of the second antenna group are allocated to the first user 3712 belonging to the first user group 3710, and the first, second, and third antennas of the second antenna group are allocated to the second user 3714. The first, second, third, fourth, and fifth antennas are allocated to a third user and a fourth user belonging to the second user group 3720. In this way, each user group can allocate antennas to users independently in an antenna group allocated to the corresponding user group.

Second, the case where two same antenna groups are respectively assigned to two user groups of first and second user groups, the two user groups are multiplexed through power division multiplexing, the first user group is user-multiplexed through power division multiplexing, and the second user group is user-multiplexed through code division multiplexing will be described.

Figure 38:
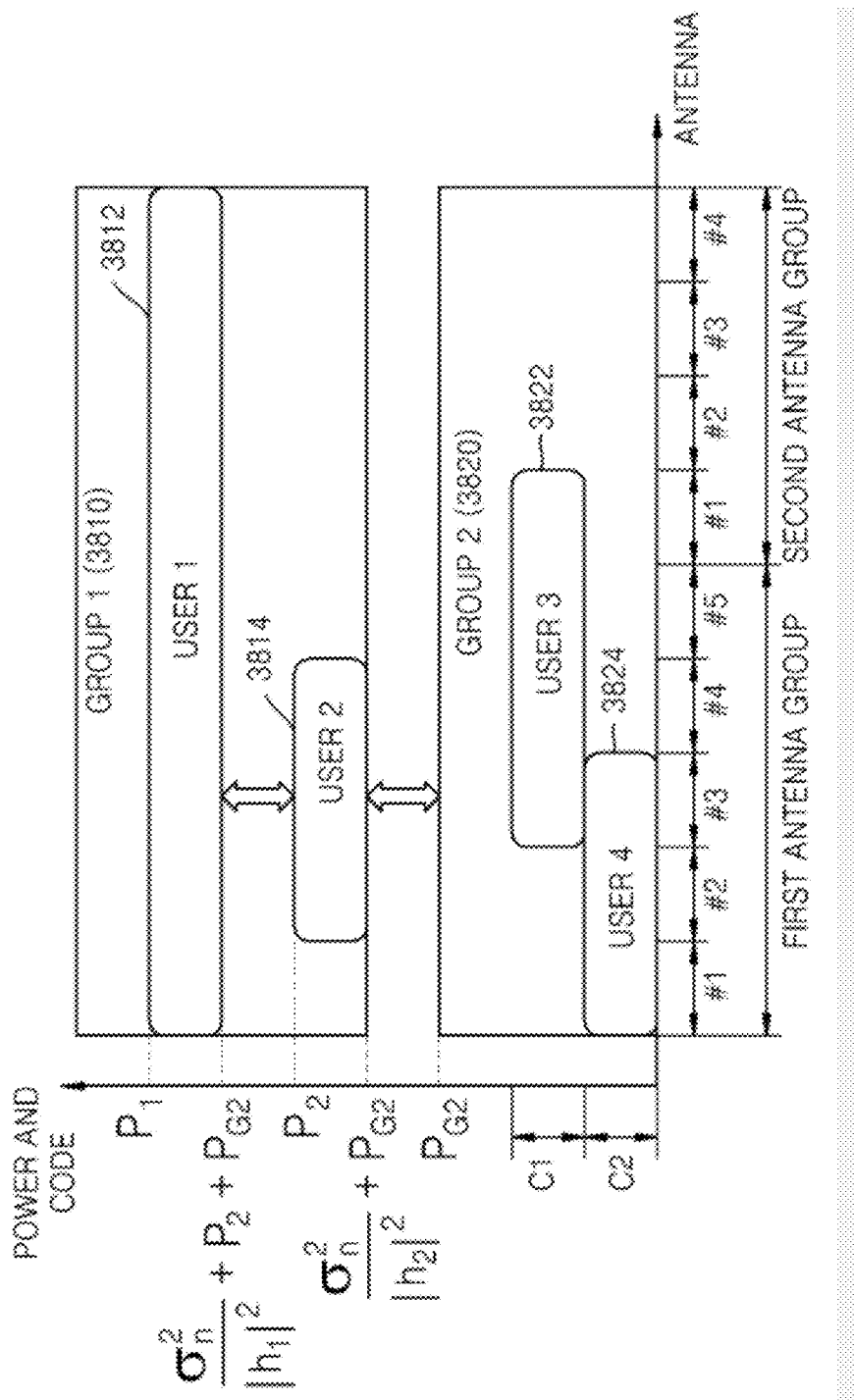
FIG. 38 is a view for explaining resource allocation when two user groups use two same antenna groups, according to an embodiment of the present invention.

FIG. 38 is a view for explaining resource allocation in the case where two user groups use two same antenna groups, according to an embodiment of the present invention.

Referring to FIG. 38, by assigning both a first antenna group consisting of 5 antennas and a second antenna group consisting of 4 antennas to a first user group 3810 and a second user group 3820, and differentially allocating powers to the first user group 3810 and the second user group 3820, group multiplexing through power division is performed. By differentially allocating powers to a first user 3812 and a second user 3814 belonging to the first user group 3810, user multiplexing through power division is performed, and by allocating unique user combining codes C1 and C2 to a third user 3822 and a fourth user 3824 belonging to the second user group 3820, user multiplexing through code division is performed. In this way, by allocating two or more same antenna groups to each user group, performing group multiplexing using at least one group multiplexing method among power division, code division, and spatial division, and performing user multiplexing on each user group using at least one user multiplexing method among power division, code division, and spatial division, a plurality of signals can be simultaneously transmitted.

Also, all antennas of the first and second antenna groups are allocated to the first user 3812 belonging to the first user group 3810, and the second, third, and fourth antennas of the first antenna group are allocated to the second user 3814 belonging to the first user group 3810. The third, fourth, and fifth antennas are allocated to a third user 3822 belonging to the second user group 3820, and the first, second, and third antennas of the first antenna group are allocated to the fourth user 3824 belonging to the second user group 3820. In this way, each user group can allocate antennas to users independently in an antenna group allocated to the corresponding user group.

Third, the case where two user groups of first and second user groups share a part of antenna groups, the two user groups are multiplexed through code division multiplexing, the first user group is user-multiplexed through power division multiplexing, and the second user group is user-multiplexed through spatial division multiplexing will be described.

Figure 39:
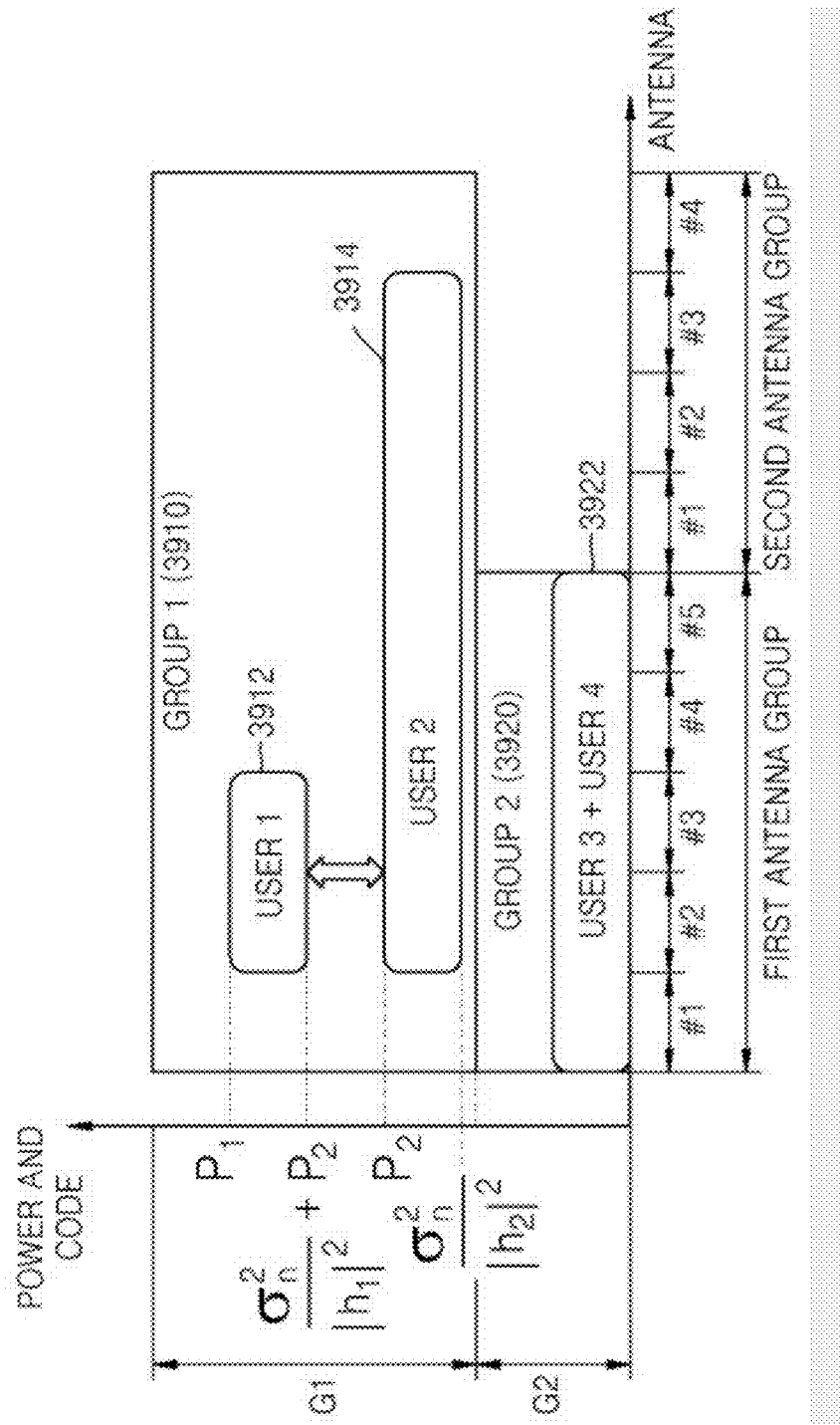
FIG. 39 is a view for explaining resource allocation when two user groups share a part of antenna groups, according to an embodiment of the present invention.

FIG. 39 is a view for explaining resource allocation in the case where two user groups share a part of antenna groups, according to an embodiment of the present invention.

Referring to FIG. 39, by allocating unique group combining codes G1 and G2 to a first user group 3910 and a second user group 3920, respectively, to assign a first antenna group consisting of 5 antennas and a second antenna group consisting of 4 antennas to the first user group 3910 and assign only the first antenna group to the second user group 3920, group multiplexing through code division is performed. By differentially allocating powers to a first user 3912 and a second user 3914 belonging to the first user group 3910, user multiplexing through power division is performed, and by allocating unique user combining weight vectors to a third user 3922 and a fourth user 3924 belonging to the second user group 3920, user multiplexing through spatial division is performed. In this way, by allocating antenna groups such that at least two user groups share a part of the antenna groups, performing group multiplexing using at least one group multiplexing method among power division, code division, and spatial division, and performing user multiplexing on each user group using at least one user multiplexing method among power division, code division, and spatial division, a plurality of signals can be simultaneously transmitted.

Also, the first and second antennas of the first antenna group are allocated to a first user 3912 belonging to the first user group 3910, and the second, third, fourth, and fifth antennas of the first antenna group and the first, second, and third antennas of the second antenna group are allocated to a second user 3914 belonging to the first user group 3910. All antennas of the first antenna group are allocated to a third user 3922 and a fourth user 3924 belonging to the second user group 3920. In this way, each user group can allocate antennas to users independently in an antenna group allocated to the corresponding user group.

Fourth, the case where different antenna groups sharing a part of antennas are allocated to two user groups of first and second user groups, the two user groups are multiplexed through code division multiplexing, the first user group is user-multiplexed through power division multiplexing, and the second user group is user-multiplexed through spatial division multiplexing will be described.

Figure 40:
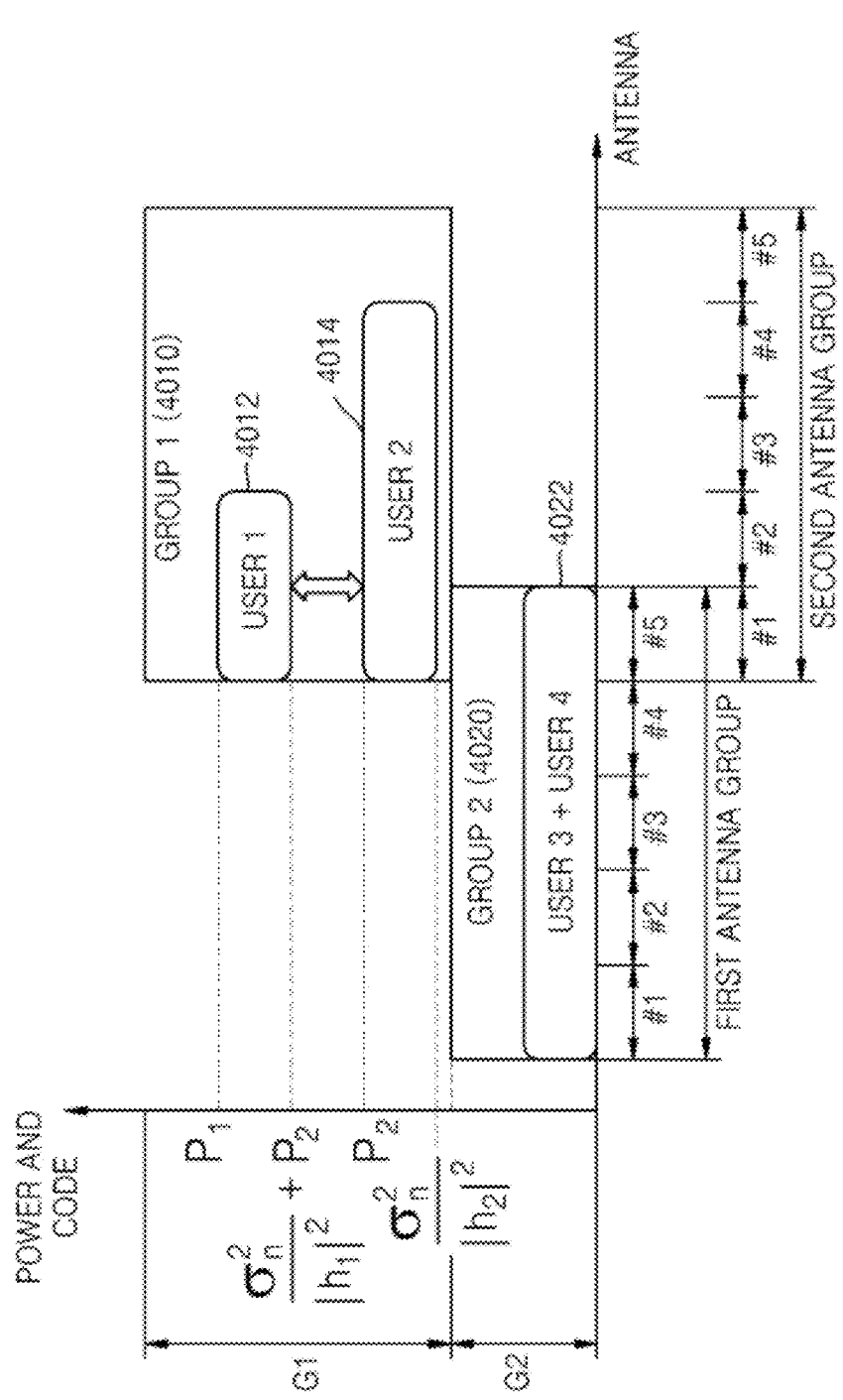
FIG. 40 is a view for explaining resource allocation when antenna groups share a part of antennas, according to an embodiment of the present invention.

FIG. 40 is a view for explaining resource allocation in the case where antenna groups share a part of antennas, according to an embodiment of the present invention.

Referring to FIG. 40, a second antenna group is assigned to a first user group 4010, and a first antenna group is assigned to a second user group 4020. However, since the first and second antenna groups share an antenna (the fifth antenna of the first antenna group=the first antenna of the second antenna group), by allocating unique group combining codes G1 and G2 to the first user group and the second user group, respectively, group multiplexing through code division is performed. By differentially allocating powers to a first user 4012 and a second user 4014 belonging to the first user group 4010, user multiplexing through power division is performed, and by assigning unique user combining weight vectors to a third user and a fourth user belonging to the second user group 4020, respectively, user multiplexing through spatial division is performed (4022). In this way, by allocating different antenna groups sharing a part of antennas to at least two user groups, performing group multiplexing using at least one group multiplexing method among power division, code division, and spatial division, and performing user multiplexing on each user group using at least one user multiplexing method among power division, code division, and spatial division, a plurality of signals can be simultaneously transmitted.

Also, the first and second antennas of the second antenna group are allocated to a first user 4012 belonging to the first user group 4010, and the first, second, third, and fourth antennas of the second antenna group are allocated to a second user 4014 belonging to the first user group 4010. All antennas of the first antenna group are allocated to a third user and a fourth user belonging to the second user group 4020. In this way, each user group can allocate antennas to users independently in an antenna group allocated to the corresponding user group.

Hereinafter, methods of assigning at least one antenna group to at least two upper user groups each consisting of at least two user groups will be described.

That is, methods for multiplexing a plurality of upper user groups each consisting of at least two user groups by assigning an antenna group to the upper user groups, according to embodiments of the present invention, will be described below. For convenience of description, in the following embodiments, it is assumed that one or two antenna groups are allocated to two user groups each consisting of two user groups, however, the embodiments can be applied in the same manner to the cases where three or more user groups configure an upper user group, where three or more upper user groups exist, and where three or more antenna groups are allocated to a plurality of upper user groups.

First, the case where the same antenna group is assigned to two upper user groups each consisting of two user groups, two upper user groups are group-multiplexed through code division multiplexing, two user groups in each upper user group are group-multiplexed through power division multiplexing, and two users in each user group is user-multiplexed through spatial division multiplexing will be described.

Figure 41:
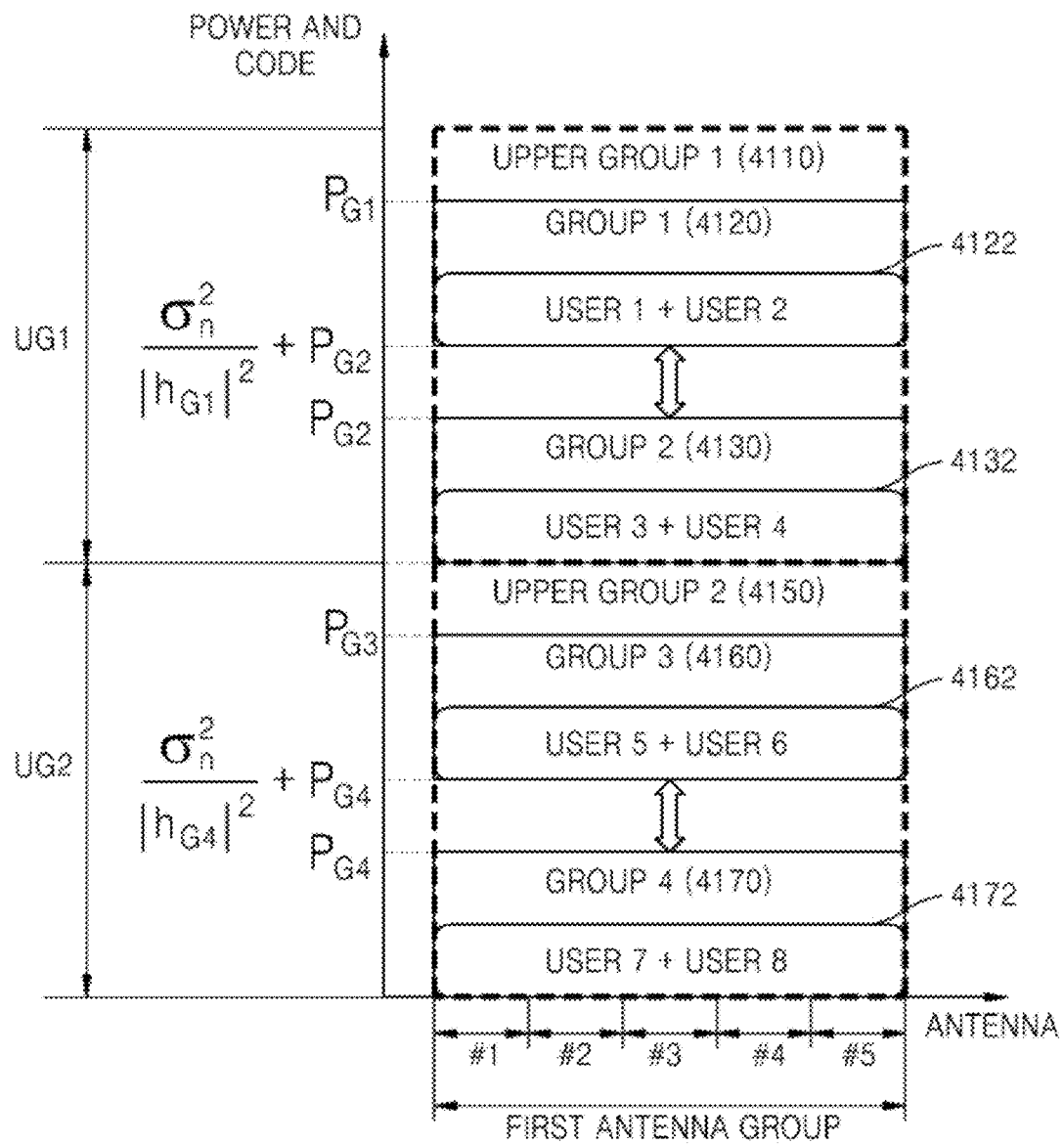
FIG. 41 is a view for explaining resource allocation in the case of multiplexing transmission to at least two upper user groups through the same antenna group, according to an embodiment of the present invention.

FIG. 41 is a view for explaining resource allocation in the case of performing multiplexing transmission on at least two upper user groups using the same antenna group, according to an embodiment of the present invention.

Referring to FIG. 41, by allocating unique group combining codes UG1 and UG2 to a first upper user group 4110 and a second upper user group 4150, respectively, to assign the same antenna group consisting of 5 antennas to the first upper user group 4110 and the second upper user group 4150, group multiplexing through code division is performed. Also, by differentially allocating powers to a first user group 4120 and a second user group 4130 belonging to the first upper user group 4110, group multiplexing through power division is performed, and by differentially allocating powers to a third user group 4160 and a fourth user group 4170 belonging to the second upper user group 4150, group multiplexing through power division is performed.

Also, by assigning unique user combining weight vectors to first and second users belonging to the first user group 4120, user multiplexing through spatial division is performed (4122), by assigning unique user combining weight vectors to third and fourth users belonging to the second user group 4130, user multiplexing through spatial division is performed (4132), by assigning unique user combining weight vectors to a fifth user and a sixth user belonging to the third user group 4160, user multiplexing through spatial division is performed (4162), and by assigning unique user combining weight vectors to a seventh user and an eighth user belonging to the fourth user group 4170, user multiplexing through spatial division is performed (4172).

In this way, by assigning at least one same antenna group to at least two upper user groups, each upper user group can combine signals of at least two user groups belonging to the corresponding upper user group using at least one group multiplexing method among power division, code division, and spatial division. Also, each user group can combine signals of at least two users belonging to the corresponding user group using at least one user multiplexing method among power division, code division, and spatial division. However, it is obvious to one of ordinary skill in the art that antenna groups can be allocated to at least two upper user groups such that the upper user groups share a part of the antenna groups, or that different antenna groups sharing a part of antennas can be allocated to at least two upper user groups.

Also, all antennas (the first, second, third, fourth, and fifth antennas) included in the first antenna group are allocated to the first user group 4120 and the second user group 4130 belonging to the first upper user group 4110. All the antennas included in the first antenna group are also allocated to the third user group 4160 and the fourth user group 4170 belonging to the second upper user group 4150.

In this way, each upper user group can allocate antennas to user groups independently in an antenna group assigned to the corresponding upper user group. Also, each user group can allocate antennas to users independently in an antenna group allocated to the corresponding user group.

Second, the case where one mutually, exclusive antenna group is assigned to each of two upper user groups of first and second upper user groups, each consisting of two user groups, the two upper user groups are multiplexed through spatial division multiplexing, the first upper user group is group-multiplexed through power division multiplexing, the second upper user group is group-multiplexed through code division multiplexing, the first user group is user-multiplexed through spatial division multiplexing, the second user group is user-multiplexed through code division multiplexing, the third user group is user-multiplexed through power division multiplexing, and the fourth user group is user-multiplexed through spatial division multiplexing will be described below.

Figure 42:
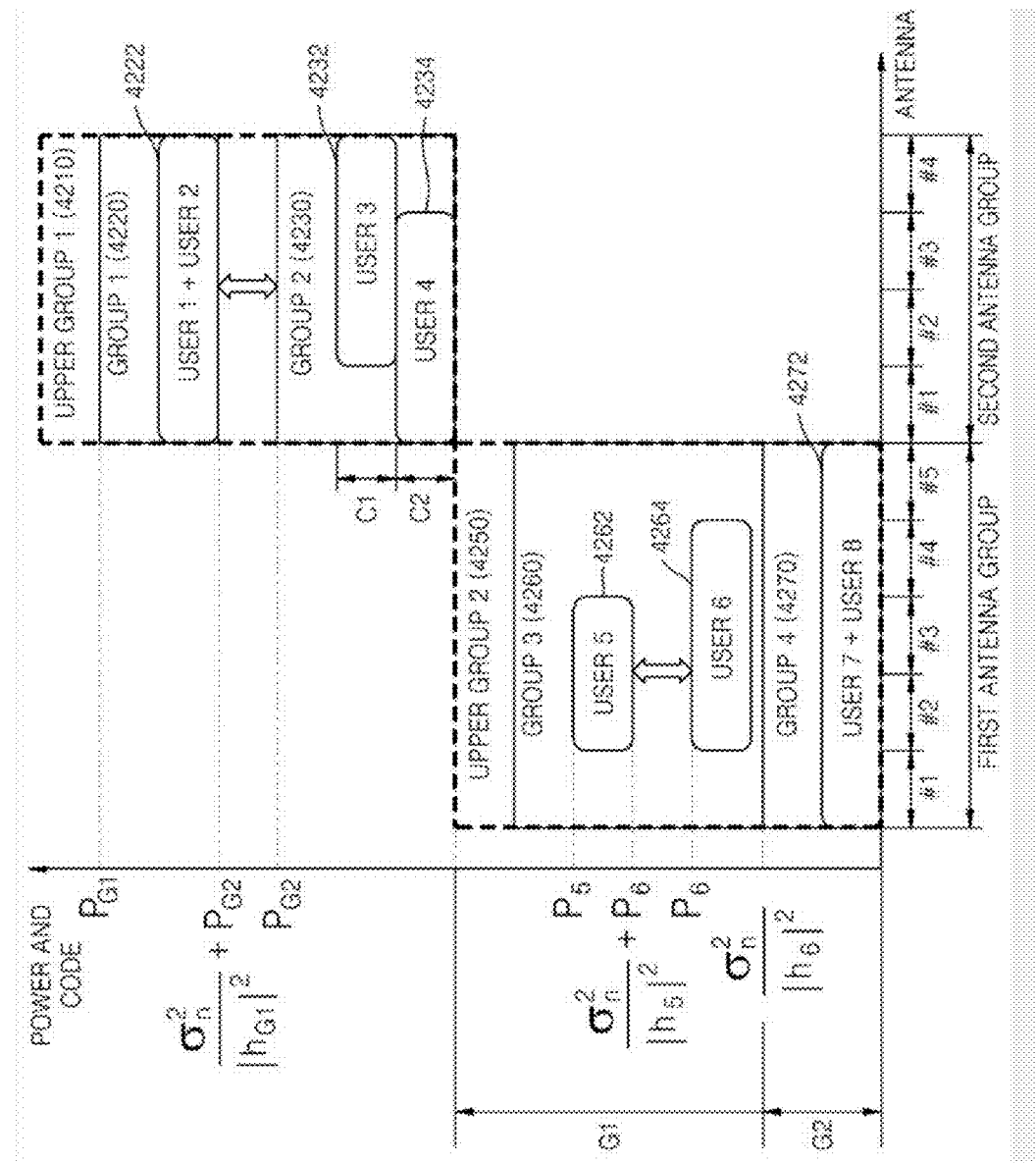
FIG. 42 is a view for explaining resource allocation in the case of multiplexing transmission to at least two upper user groups through mutually exclusive antenna groups, according to an embodiment of the present invention.

FIG. 42 is a view for explaining resource allocation in the case of performing multiplexing transmission on at least two upper user groups using mutually exclusive antenna groups, according to an embodiment of the present invention.

Referring to 42, by assigning unique group combining weight vectors to a first upper user group 4210 and a second upper user group 4250, respectively, to assign a second antenna group consisting of 4 antennas to the first upper user group 4210 and assign a first antenna group consisting of 5 antennas to the second upper user group 4250 so that the first and second upper user groups 4210 and 4250 use mutually exclusive antenna groups, group multiplexing through spatial division is performed. By differentially allocating powers to a first user group 4220 and a second user group 4230 belonging to the first upper user group 4210, group multiplexing through power division is performed, and by allocating unique group combining codes G1 and G2 to a third user group 4260 and a fourth user group 4270 belonging to the second upper user group 4250, group multiplexing through code division is performed.

By assigning unique user combining weight vectors to first and second users belonging to the first user group 4220, user multiplexing through spatial division is performed (4222), by allocating unique user combining codes C1 and C2 to a third user 4232 and a fourth user 4234 belonging to the second user group 4230, user multiplexing through code division is performed, by differentially allocating powers to a fifth user 4262 and a sixth user 4264 belonging to the third user group 4260, user multiplexing through power division is performed, and by assigning unique user combining weight vectors to a seventh user and a eighth user belonging to the fourth user group 4170, user multiplexing through spatial division is performed (4272).

In this way, by assigning unique group combining weight vectors to individual upper user groups, group multiplexing through spatial division is performed, and each upper user group can combine signals of at least two user groups belonging to the corresponding upper user group using at least one group multiplexing method among power division, code division, and antenna group division. Also, each user group can combine signals of at least two users belonging to the corresponding user group using at least one user multiplexing method among power division, code division, and spatial division.

Also, all antennas (the first, second, third, and fourth antennas) included in the second antenna group are allocated to the first user group 4220 and the second user group 4230 belonging to the first upper user group 4210. All antennas (the first, second, third, fourth, and fifth antennas) included in the first antenna group are allocated to the third user group 4260 and the fourth user group 4270 belonging to the second upper user group 4250.

In this way, each upper user group can allocate antennas to user groups independently in an antenna group allocated to the corresponding upper user group. Also, each user group can allocate antennas to users independently in an antenna group allocated to the corresponding user group.

G. Power Division Multiplexing Method Through Independent Use of Each Antenna

Hereinafter, an example in which each antenna is independently used when user multiplexing through power division multiplexing is performed will be described.

G-1. Independent Use of Transmission Factors

Hereinafter, examples of transmitting signals multiplexed by power division multiplexing using independently transmission factors for each antenna over user signals in a multiple antenna system, according to embodiments of the present invention, will be described.

FIGS. 43 through 46 are views for explaining examples of transmitting signals multiplexed by power division multiplexing using independently transmission factors for each antenna over user signals, according to embodiments of the present invention.

Figure 43:
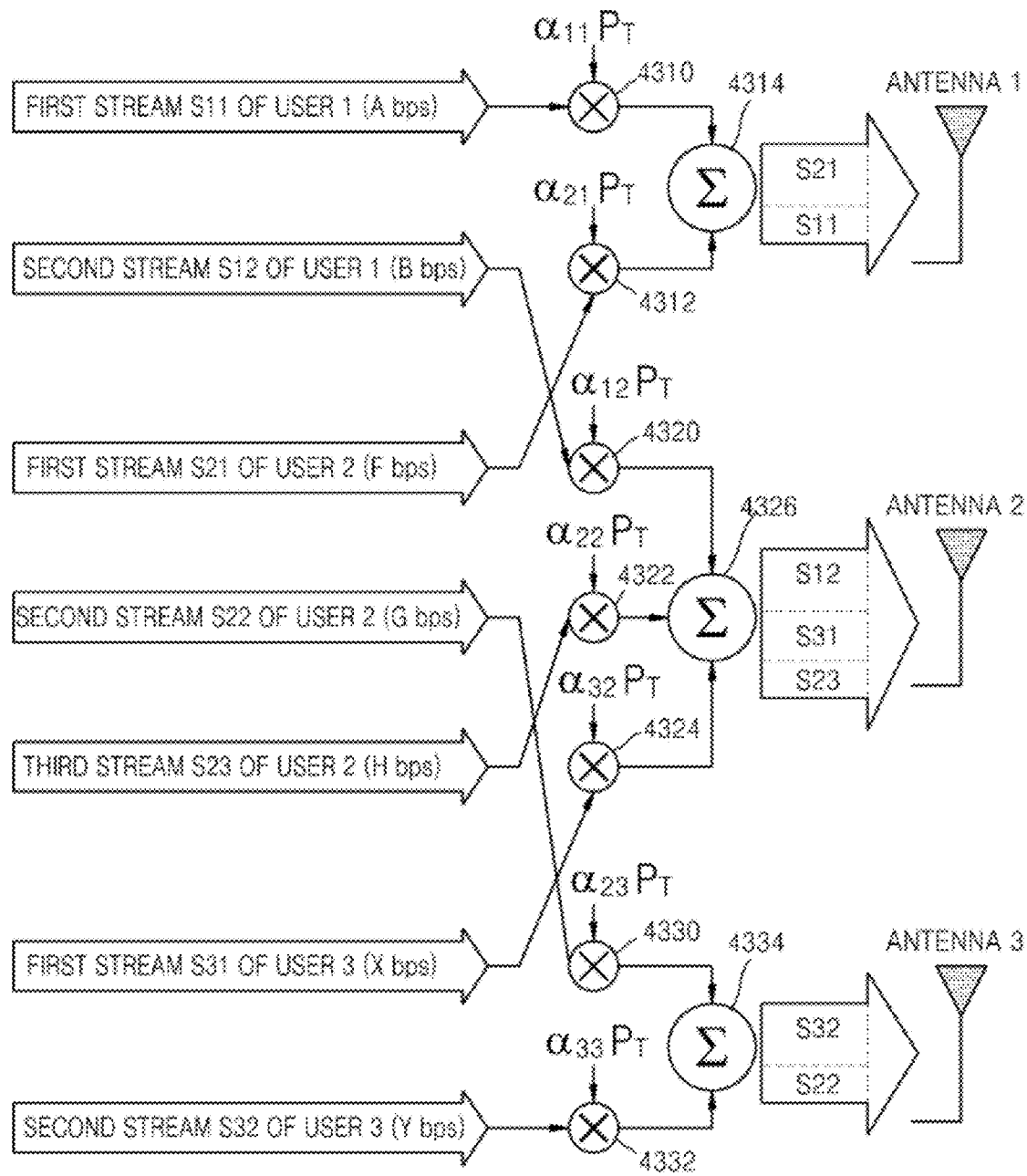
FIG. 43 is a view for explaining an example of transmitting signals multiplexed by a power division multiplexing method using different antennas independently for individual users, according to an embodiment of the present invention.

FIG. 43 is a view for explaining an example of transmitting signals multiplexed by a power division multiplexing method using antennas independently for individual users, according to an embodiment of the present invention. That is, the example shown in FIG. 43 relates to a method of independently using antenna selection for each user, the data rates of antennas allocated to each user, a data rate for each user, an antenna group allocated to each user, the number of antennas allocated to each user, the order in which antennas are used for each user, and user layer priorities of antennas allocated to each user.

First, in a method of independently using antenna selection for each user and the data rates of antennas allocated to each user, two data streams corresponding to a user 1 are transmitted at data rates A and B through antennas 1 and 2, respectively (4310 and 4320).

Also, three data streams corresponding to a user 2 are transmitted at data rates F, H, and G through antennas 1, 2, and 3 (4312, 4330, and 4322). Also, two data streams corresponding to a user 3 are transmitted at data rates X and Y through antennas 2 and 3 (4324 and 4332).

As such, antenna selection for each user and the data rates of antennas allocated to each user are independently used when multiplexing is performed by a power division multiplexing method using independently antennas among individual data streams corresponding to each user.

Second, in a method of independently using a data rate for each user, a data rate for each user corresponds to a sum of the data rates of antennas allocated to the user.

That is, a data rate corresponding to the user 1 is decided as A+B which is a sum of the data rates of the antennas 1 and 2, which are used to transmit data streams corresponding to the user 1. Also, a data rate corresponding to the user 2 is decided as F+H+G which is a sum of the data rates of the antennas 1, 2, and 3, which are used to transmit data streams corresponding to the user 2. Also, a data rate corresponding to the user 3 is decided as X+Y which is a sum of the data rates of the antennas 2 and 3, which are used to transmit data streams corresponding to the user 3.

As such, each user's data rate is independently used when multiplexing is performed by a power division multiplexing method using antennas independently for individual users.

Third, in a method of independently using an antenna group allocated to each user, an independent antenna group for transmitting two data streams corresponding to the user 1 consists of the antennas 1 and 2, and an independent antenna group for transmitting three data streams corresponding to the user 2 consists of the antennas 1, 2, and 3. Also, an independent antenna group for transmitting two data streams corresponding to the user 3 consists of the antennas 2 and 3.

As such, an antenna group allocated to each user is independently used when multiplexing is performed by a power division multiplexing method using antennas independently for individual users.

Fourth, in a method of independently using the number of antennas allocated to each user, two antennas are independently allocated to transmit two data streams corresponding to each of the users 1 and 3, and three antennas are independently allocated to transmit three data streams corresponding to the user 2.

As such, the number of antennas allocated to each user is independently used when multiplexing is performed by a power division multiplexing method using antennas independently for individual users.

Fifth, in a method of independently using the order in which antennas are used for each user, the first data stream S11 corresponding to the user 1 is transmitted through the antenna 1, and the second data stream S12 corresponding to the user 1 is transmitted through the antenna 2.

Also, the first data stream S21 corresponding to the user 2 is transmitted through the antenna 1, the second data stream S22 corresponding to the user 2 is transmitted through the antenna 3, and the third data stream S23 corresponding to the user 2 is transmitted through the antenna 2.

Also, the first data stream S31 corresponding to the user 3 is transmitted through the antenna 2, and the second data stream S32 corresponding to the user 3 is transmitted through the antenna 3.

As such, the order in which antennas are used for each user is independently used when multiplexing is performed by a power division multiplexing method using antennas independently for individual users.

Sixth, in a method of independently using user layer priorities of antennas for each user, data streams corresponding to the user 1 have user layer priorities of first priority and third priority for the antenna 1 and the antenna 2, respectively, data streams corresponding to the user 2 have user layer priorities of second priority, first priority, and first priority for the antenna 1, the antenna 2, and the antenna 3, respectively, and data streams corresponding to the user 3 have a user layer priority of second priority for the antenna 2 and the antenna 3, respectively.

As such, user layer priorities for individual antennas allocated to each user are independently used when multiplexing is performed by a power division multiplexing method using antennas independently for individual users.

Figure 44:
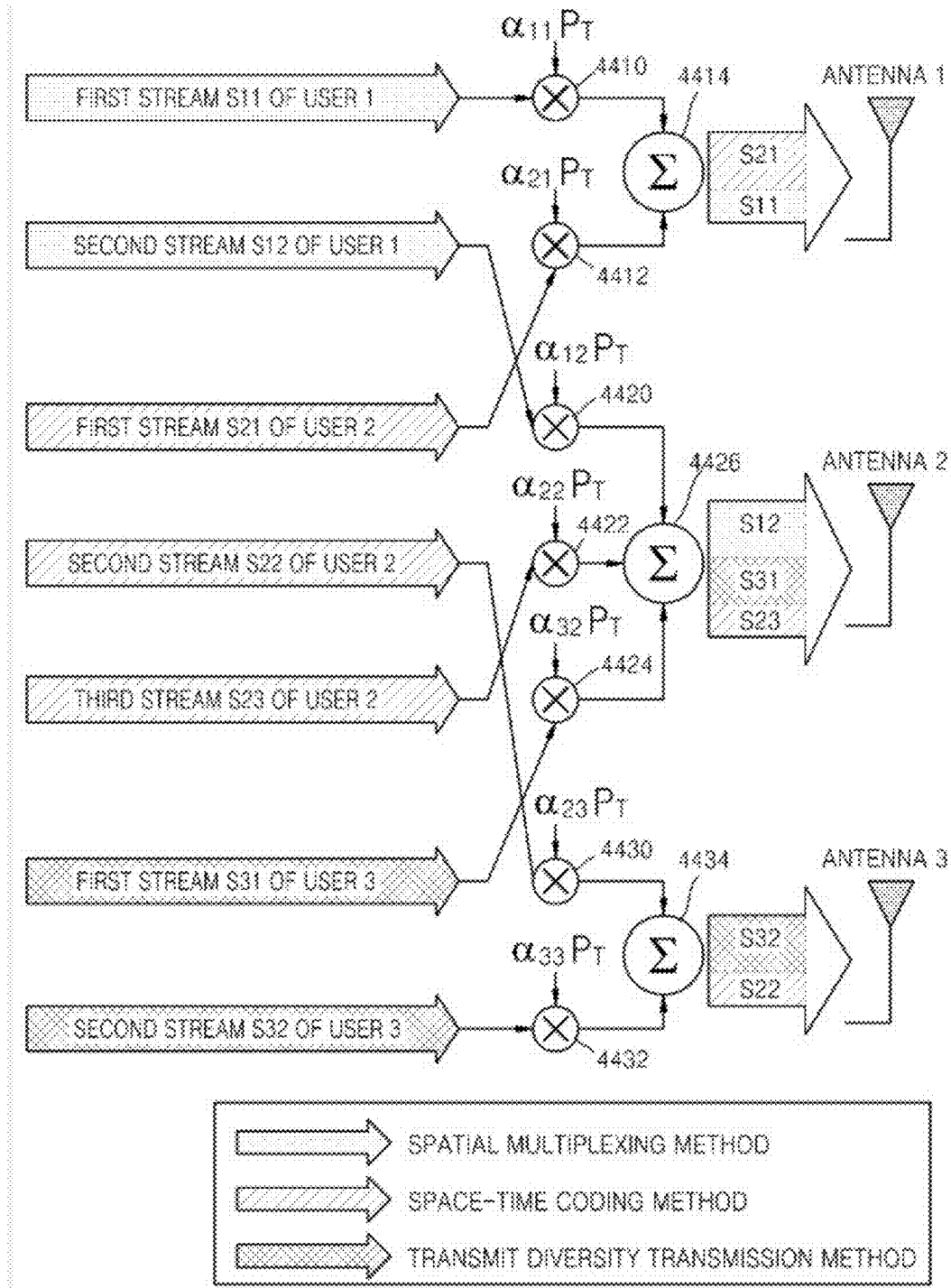
FIG. 44 is a view for explaining an example of transmitting signals multiplexed by a power division multiplexing method using different multiple antenna transmission methods independently for individual users, according to an embodiment of the present invention.

FIG. 44 is a view for explaining an example of transmitting signals multiplexed by a power division multiplexing method using different multiple antenna transmission methods independently for individual users, according to an embodiment of the present invention. That is, FIG. 44 shows an example of independently using multiplex antenna transmission methods including a spatial multiplexing (SM) method, a Space-Time Coding (STC) method, and a transmit diversity method.

Referring to FIG. 44, data streams corresponding to a user 1 are transmitted by the SM method using antennas 1 and 2

(4410 and 4420), data streams corresponding to a user 2 are transmitted by the STC method using antennas 1, 2, and 3 (4412, 4430, and 4422), and data streams corresponding to a user 3 are transmitted by the transmit diversity transmission method using the antennas 2 and 3 (4424 and 4432).

As such, multiple antenna transmission methods are independently used for individual users when multiplexing is performed by a power division multiplexing method using antennas independently for individual users.

Figure 45:
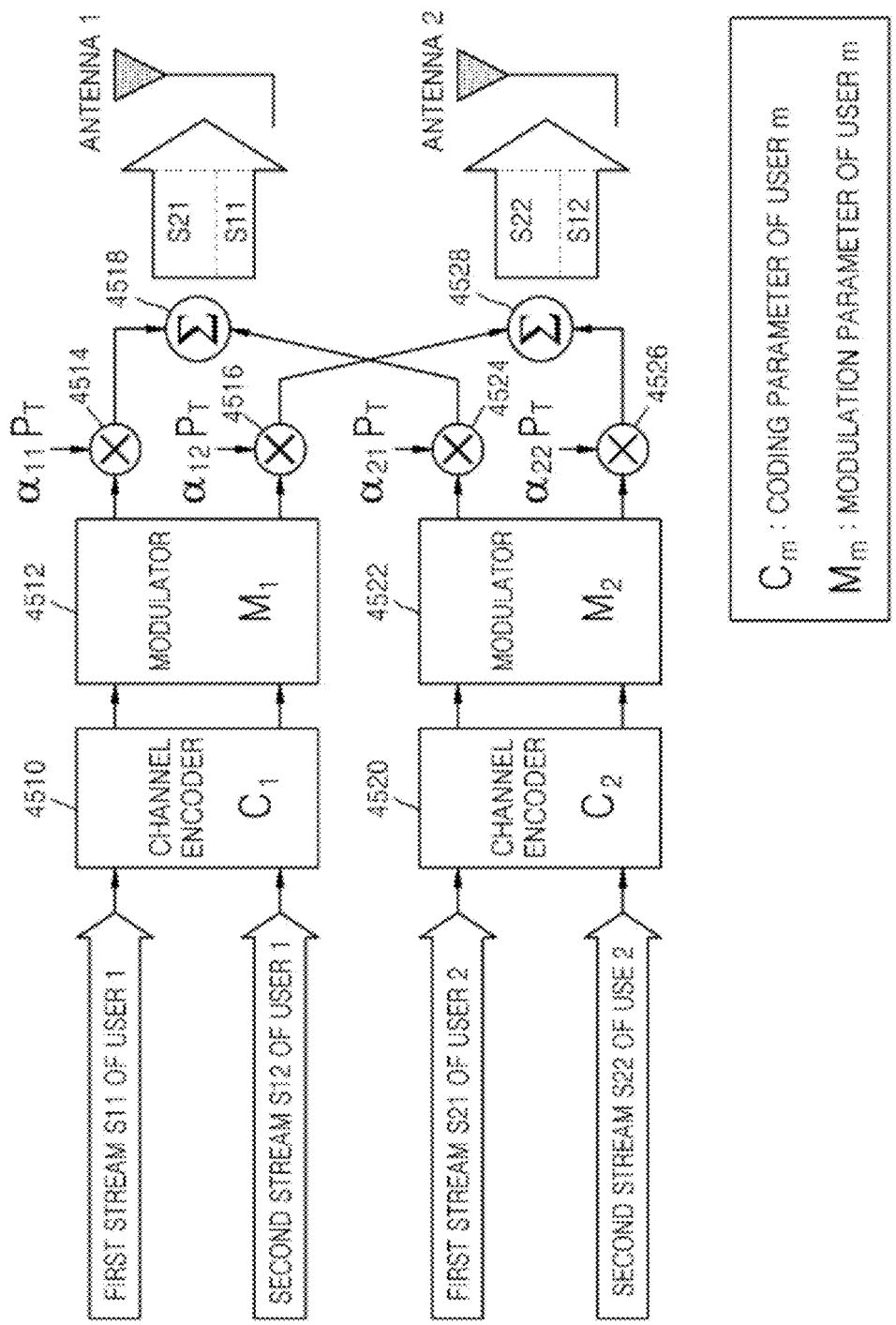
FIG. 45 is a view for explaining an example of transmitting signals multiplexed by a power division multiplexing method using different modulation parameters and coding parameters independently for individual users, according to an embodiment of the present invention.

FIG. 45 is a view for explaining an example of transmitting signals multiplexed by a power division multiplexing method using modulation parameters and coding parameters independently for individual users, according to an embodiment of the present invention.

Referring to FIG. 45, a modulation parameter M1 is independently used to modulate (4512) two data streams corresponding to a user 1, and a modulation parameter M2 is independently used to modulate (4522) two data streams corresponding to a user 2.

As such, modulation parameters are independently used for individual users when multiplexing is performed by a power division multiplexing method using antennas independently for individual users.

Meanwhile, a coding parameter C1 is independently used to code (4510) two data streams corresponding to the user 1, and a coding parameter C2 is independently used to code (4520) two data streams corresponding to the user 2.

As such, coding parameters for individual users are independently used when multiplexing is performed by a power division multiplexing method using antennas independently for individual users.

Figure 46:
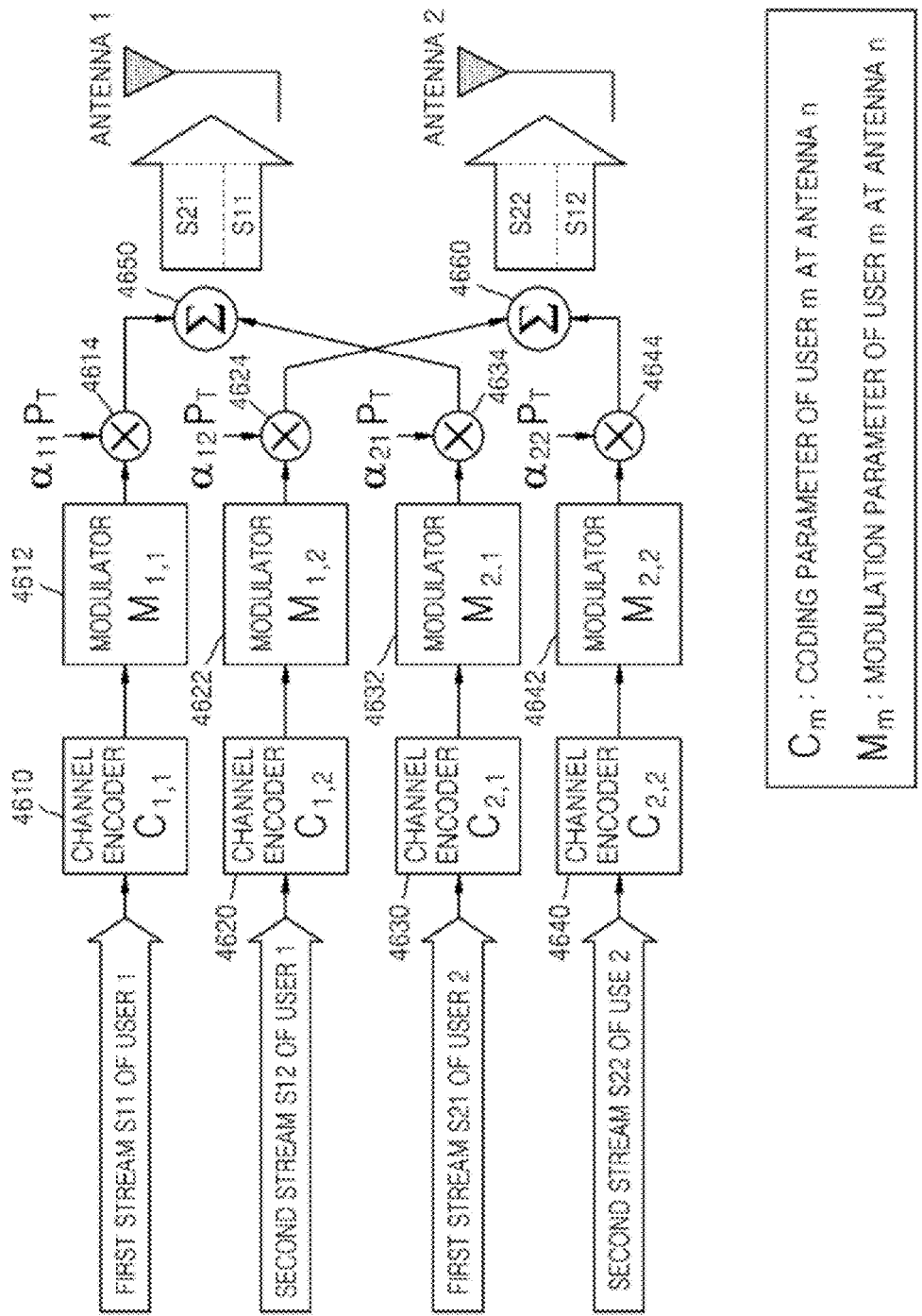
FIG. 46 is a view for explaining an example of transmitting signals multiplexed by a power division multiplexing method using different antenna modulation parameters and antenna coding parameters independently for individual users, according to an embodiment of the present invention.

FIG. 46 is a view for explaining an example of transmitting signals multiplexed by a power division multiplexing method using modulation parameters and coding parameters for antennas independently for individual users, according to an embodiment of the present invention;

Referring to FIG. 46, an independent modulation parameter M1,1 is used to modulate (4612) the first data stream S11 that is transmitted through an antenna 1 among two data streams S11 and S12 corresponding to a user 1, and another independent modulation parameter M1,2 is used to modulate (4622) the second data stream S12 that is transmitted through an antenna 2.

Also, an independent modulation parameter M2,1 is used to modulate (4632) the first data stream S21 that is transmitted through the antenna 1 among two data streams S21 and S22 corresponding to a user 2, and another independent modulation parameter M2,2 is used to modulate (4642) the second data stream S22 that is transmitted through the antenna 2.

As such, modulation parameters for antennas allocated to individual users are independently used when multiplexing is performed by a power division multiplexing method using antennas independently for individual users.

Meanwhile, an independent coding parameter C1,1 is used to code (4610) the first data stream S11 that is transmitted through the antenna 1 among two data streams S11 and S12 corresponding to the user 1, and another independent coding parameter C1,2 is used to code (4620) the second data stream S12 that is transmitted through the antenna 2.

Also, an independent coding parameter C2,1 is used to code (4630) the first data stream S21 that is transmitted through the antenna 1 among two data streams S21 and S22 corresponding to the user 2, and another independent coding parameter C2,2 is used to code (4640) the second data stream S22 that is transmitted through the antenna 2.

As such, coding parameters for antennas allocated to individual users are independently used when multiplexing is performed by a power division multiplexing method using antennas independently for individual users.

G-2. Common Use of Transmission Factors

Hereinafter, an example of transmitting signals multiplexed by a power division multiplexing method when a plurality of users use at least one of transmission factors for each antenna in common in a communication system, according to an embodiment of the present invention, will be described.

FIGS. 47 through 51 are views for explaining examples of transmitting signals multiplexed by a power division multiplexing method when at least two users use transmission factors for each antenna in common, according to embodiments of the present invention.

Figure 47:
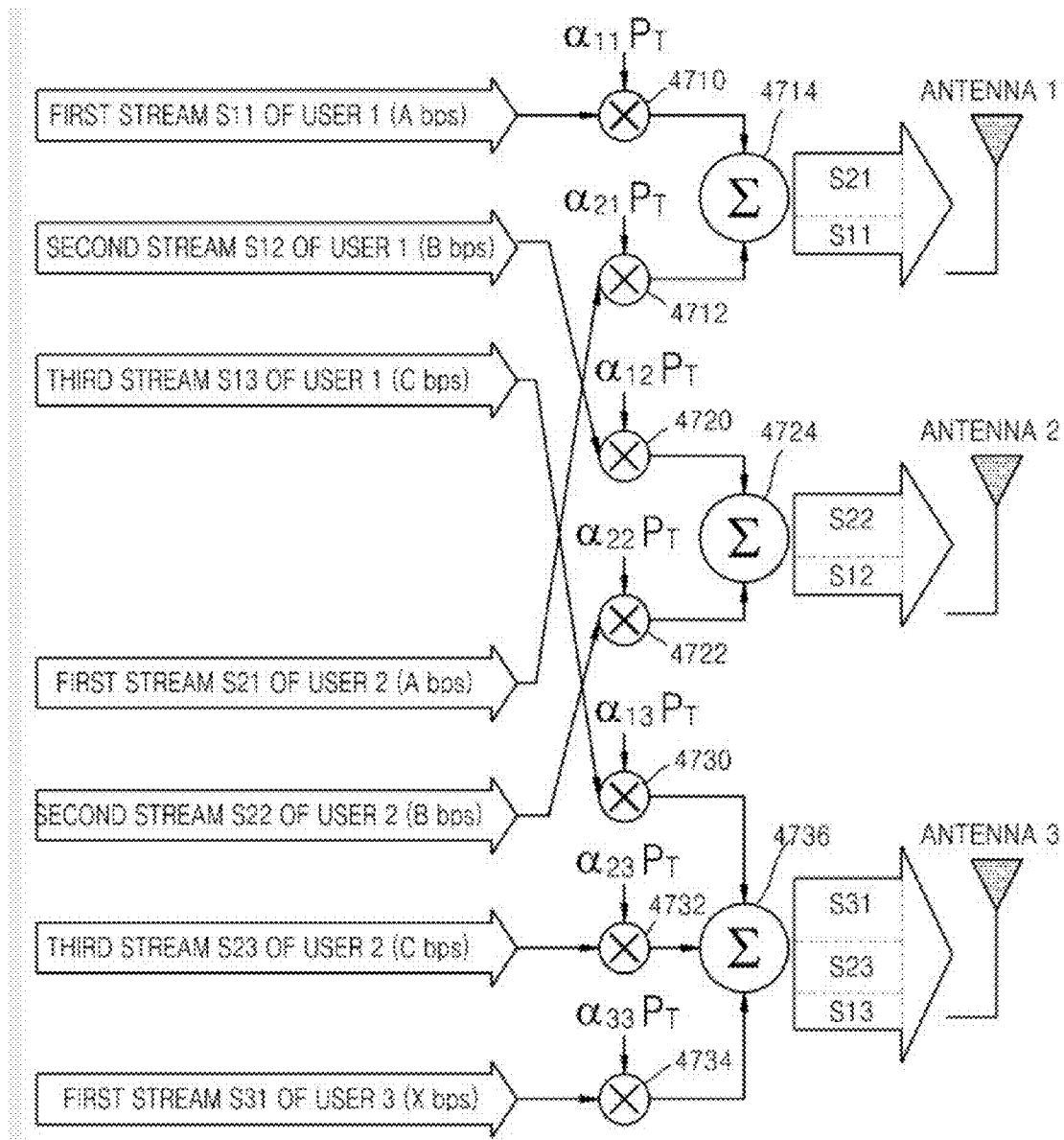
FIG. 47 is a view for explaining an example of transmitting signals multiplexed by a power division multiplexing method using at least one of transmission factors for each antenna over at least two users in common, according to an embodiment of the present invention.

FIG. 47 is a view for explaining an example of transmitting signals multiplexed by a power division multiplexing method using at least one of transmission factors for each antenna over at least two users in common, according to an embodiment of the present invention. That is, the example shown in FIG. 47 relates to a method in which a plurality of users use at least one of an antenna data rate, an antenna data rate for each user, an antenna group allocated to each user, the number of antennas allocated to each user, the order in which antennas are used for each user, and user layer priorities of antennas allocated to each user, in common.

First, in a method in which a plurality of users use an antenna data rate in common, an antenna data rate A is applied in common to the first data stream of a user 1 and the first data stream of a user 2, which are to be transmitted through an antenna 1.

Also, an antenna data rate B is applied in common to the second data stream of the user 1 and the second data stream of the user 2, which are to be transmitted through an antenna 2.

Meanwhile, an antenna data rate C for each antenna is applied in common to the third data stream of the user 1 and the third data stream of the user 2, which are to be transmitted through an antenna 3.

However, a data stream corresponding to a user 3, which is to be transmitted through the antenna 3, is allocated an antenna data rate X that is different from those applied to the other users.

As such, at least two users use the same antenna data rate when multiplexing is performed by a power division multiplexing method using antennas independently for individual users (4710, 4712, 4714, 4720, 4722, 4724, 4730, 4732, 4734, and 4736).

Second, in a method in which a plurality of users use each user's data rate in common, each user's data rate is calculated as a sum of data rates which the user uses for individual antennas.

Accordingly, the users 1 and 2 who use the same data rate for individual antennas have the same antenna data rate of A+B+C for the individual antennas 1, 2, and 3. However, the data rate of the user 3 is a data rate X which is used to transmit data streams through the antenna 3, and is different from the other users' data rate.

As such, at least two users use the same user data rate when multiplexing is performed by a power division multiplexing method using antennas independently for individual users (4710, 4712, 4714, 4720, 4722, 4724, 4730, 4732, 4734, and 4736).

Third, in a method in which a plurality of users use a user antenna group in common, an antenna group for transmitting three data streams corresponding to the user 1 and an antenna group for transmitting three data streams corresponding to the user 2 each consists of the antennas 1, 2, and 3. However, an antenna group for transmitting a data stream corresponding to the user 3 consists of only the antenna 3.

As such, at least two users use the same user antenna group when multiplexing is performed by a power division multiplexing method using antennas independently for individual users (4710, 4712, 4714, 4720, 4722, 4724, 4730, 4732, 4734, and 4736).

Fourth, in a method in which a plurality of users use the number of antennas in common, three antennas are used to transmit three data streams corresponding to the user 1, and the number of antennas for transmitting three data streams corresponding to the user 2 is also three.

However, the number of antennas for transmitting a data stream corresponding to the user 3 is one which is different from the number of antennas that are used by the other users.

As such, at least two users use the same number of antennas when multiplexing is performed by a power division multiplexing method using antennas independently for individual users (4710, 4712, 4714, 4720, 4722, 4724, 4730, 4732, 4734, and 4736).

Fifth, in a method in which a plurality of users use the same order in which antennas are used for each user, the first data stream S11 corresponding to the user 1 is transmitted through the antenna 1 (4710 and 4714), the second data stream S12 corresponding to the user 1 is transmitted through the antenna 2 (4720 and 4724), and the third data stream S13 corresponding to the user 1 is transmitted through the antenna 3 (4730 and 4736).

Also, the first data stream S21 corresponding to the user 2 is transmitted through the antenna 1 (4712 and 4714), the second data stream S22 corresponding to the user 2 is transmitted through the antenna 2 (4722 and 4724), and the third data stream S23 corresponding to the user 2 is transmitted through the antenna 3 (4732 and 4736). That is, the order in which antennas are used for data streams corresponding to the user 1 is the same as the order in which antennas are used for data streams corresponding to the user 2.

However, since the first data stream corresponding to the user 3 is transmitted through the antenna 3 (4734 and 4736), the order in which antennas are used for the data stream corresponding to the user 3 is different from the order in which antennas are used for the data streams corresponding to the other users.

As such, at least two users use the same order in which antennas are used when multiplexing is performed by a power division multiplexing method using antennas independently for individual users (4710, 4712, 4714, 4720, 4722, 4724, 4730, 4732, 4734, and 4736).

Sixth, in a method in which a plurality of users use the same user layer priority for individual antennas, all data streams corresponding to the user 1 have a user layer priority of first priority for the individual antennas 1, 2, and 3, all data streams corresponding to the user 2 have a user layer priority of second priority for the individual antennas 1, 2, and 3, and a data stream corresponding to the user 3 has a user layer priority of third priority for the antenna 3.

Accordingly, the data streams corresponding to the users 1 and 2 have the same user layer priority for all the antennas 1, 2, and 3, however, the data stream corresponding to the user 3 has a user layer priority for only the antenna 3.

As such, at least two users use the same user layer priority for individual antennas when multiplexing is performed by a power division multiplexing method using antennas independently for individual users (4710, 4712, 4714, 4720, 4722, 4724, 4730, 4732, 4734, and 4736).

Figure 48:
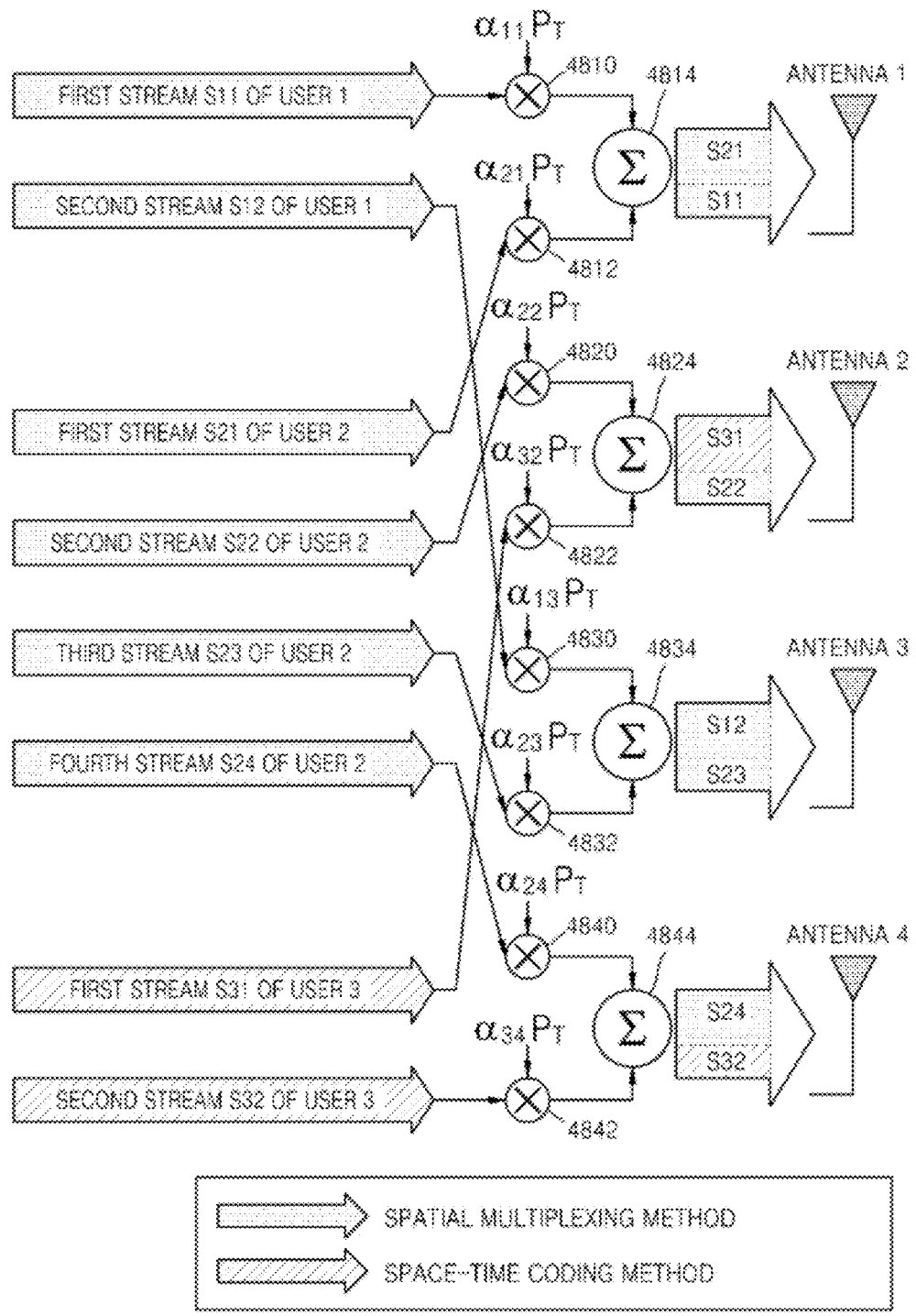
FIG. 48 is a view for explaining an example in which at least two users transmit signals multiplexed by a power division multiplexing method using the same multiple antenna transmission method, according to an embodiment of the present invention.

FIG. 48 is a view for explaining an example in which at least two users transmit signals multiplexed by a power division multiplexing method using the same multiple antenna transmission method, according to an embodiment of the present invention. That is, FIG. 48 shows an example in which at least two users use the same one of multiplex antenna transmission methods including a SM method, a STC method, and a transmit diversity method.

Referring to FIG. 48, data streams corresponding to a user 1 are transmitted by the SM method using antennas 1 and 3 (4810, 4814, 4830, and 4834), and also data streams corresponding to a user 2 are transmitted by the SM method using antennas 1, 2, 3, and 4 (4812, 4814, 4820, 4824, 4834, 4840, and 4844). That is, the data streams corresponding to the user 1 and the data streams corresponding to the user 2 are transmitted using the SM method as a multiple antenna transmission method.

However, the data streams corresponding to the user 3 are transmitted by the STC method using the antennas 2 and 4 (4822, 4824, 4842, and 4844).

As such, at least two users use the same multiple antenna transmission method when multiplexing is performed by a power division multiplexing method using antennas independently for individual users.

Figure 49:
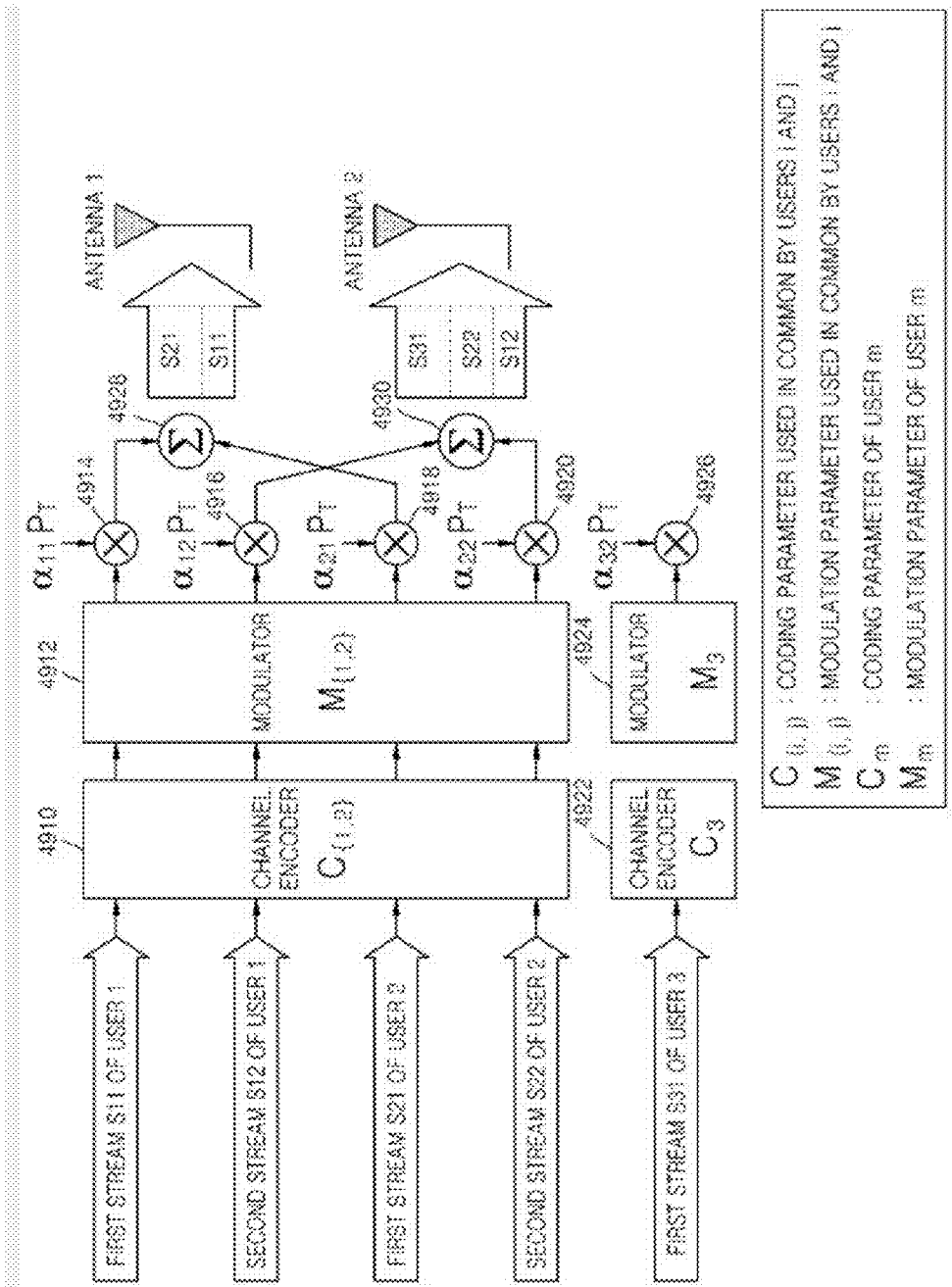
FIG. 49 is a view for explaining an example in which at least two users transmit signals multiplexed by a power division multiplexing method using the same modulation parameter and the same coding parameter, according to an embodiment of the present invention.

FIG. 49 is a view for explaining an example in which at least two users transmit signals multiplexed by a power division multiplexing method using the same modulation parameter and the same coding parameter, according to an embodiment of the present invention.

Referring to FIG. 49, a modulation parameter M{1,2} is used to modulate (4912) two data streams corresponding to a user 1 and two data streams corresponding to a user 2. However, in order to modulate (4924) a data stream corresponding to a user 3, a modulation parameter M3 is used.

Accordingly, the same modulation parameter is used to modulate the data streams corresponding to the users 1 and 2, and a different modulation parameter is used to modulate the data stream corresponding to the user 3.

As such, at least two users use the same user modulation parameter when multiplexing is performed by a power division multiplexing method using antennas independently for individual users (4814, 4816, 4818, 4820, 4826, 4828, and 4830).

Meanwhile, a coding parameter C{1,2} is used to code (4910) two data streams corresponding to the user 1 and two data streams corresponding to the user 2. However, in order to code (4922) a data stream corresponding to a user 3, a modulation parameter C3 is used.

Accordingly, the same coding parameter is used to code the data streams corresponding to the users 1 and 2, and a different coding parameter is used to code the data stream corresponding to the user 3.

As such, at least two users use the same user coding parameter when multiplexing is performed by a power division multiplexing method using antennas independently for individual users (4914, 4916, 4918, 4920, 4926, 4928, and 4930).

Figure 50:
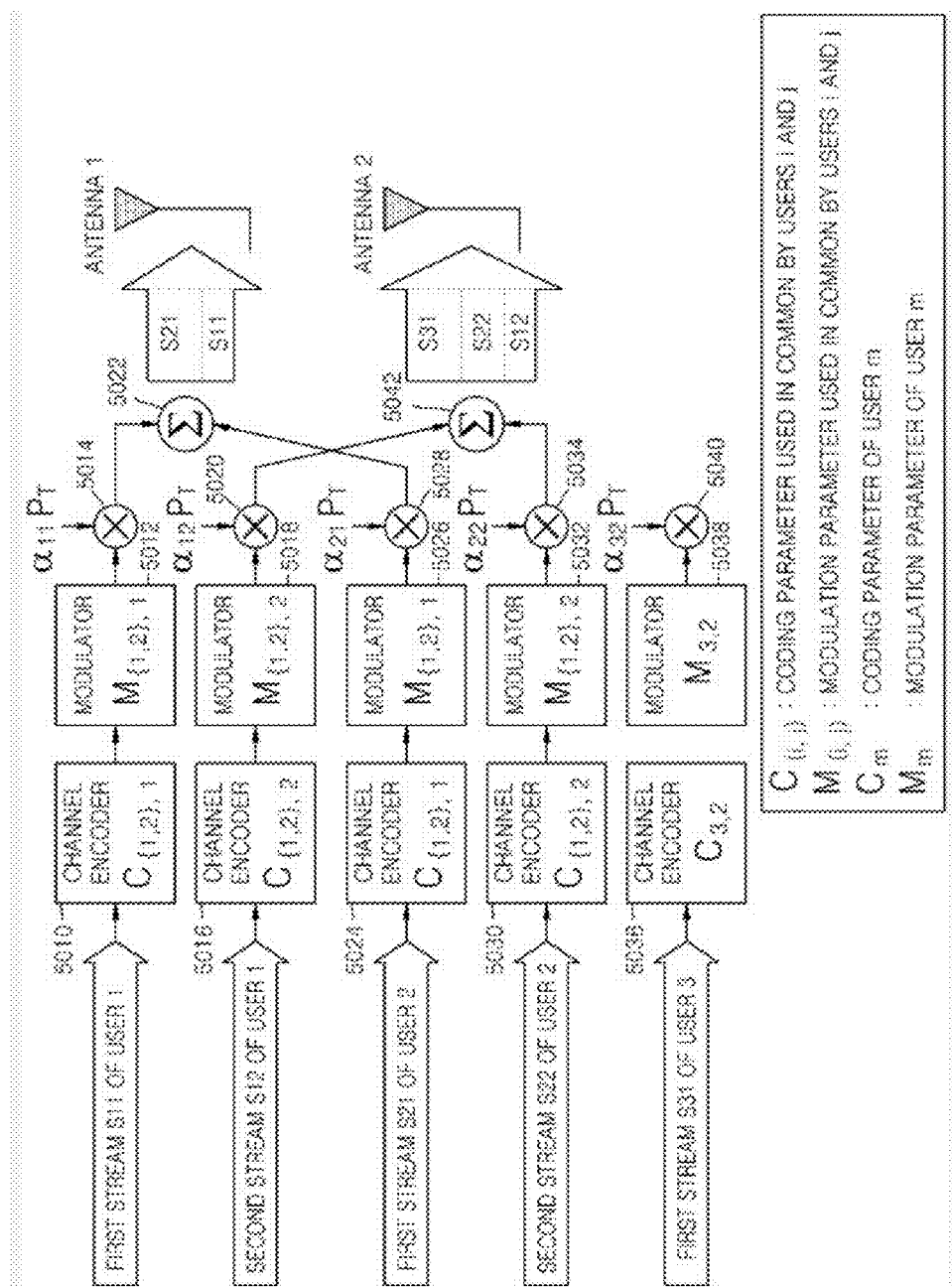
FIG. 50 is a view for explaining an example in which at least two users transmit signals multiplexed by a power division multiplexing method using the same antenna modulation parameter and the same antenna coding parameter, according to an embodiment of the present invention.

FIG. 50 is a view for explaining an example in which at least two users transmit signals multiplexed by a power division multiplexing method using the same antenna modulation parameter and the same antenna coding parameter, according to an embodiment of the present invention.

Referring to FIG. 50, a modulation parameter M{1,2},1 is used to modulate (5012 and 5026) the first one of two data streams corresponding to a user 1 and the first one of two data streams corresponding to a user 2, which are to be transmitted through an antenna 1. Also, a modulation parameter M{1,2},2 is used to modulate (5018 and 5032) the second one of the two data streams corresponding to the user 1 and the second one of the two data streams corresponding to the user 2, which are to be transmitted through an antenna 2. However, in order to modulate (5038) a data stream corresponding to a user 3, which is to be transmitted through the antenna 2, a modulation parameter M3, 2 is used.

Accordingly, the same modulation parameter is used to modulate the data streams corresponding to the users 1 and 2, and a different modulation parameter is used to modulate the data stream corresponding to the user 3.

As such, at least two users use the same antenna modulation parameter when multiplexing is performed by a power division multiplexing method using antennas independently for individual users (5014, 5020, 5022, 5028, 5034, 5040, and 5042).

Meanwhile, a coding parameter C{1,2},1 is used to code (5010 and 5024) the first data stream corresponding to the user 1 and the first data stream corresponding to the user 2, which are to be transmitted through the antenna 1. Also, a coding parameter C{1,2},2 is used to code (5016 and 5030) the second data stream corresponding to the user 1 and the second data stream corresponding to the user 2, which are to be transmitted through the antenna 2. However, in order to code (5036) the data stream corresponding to the user 3, which is to be transmitted through the antenna 2, a coding parameter C3,2 is used.

Accordingly, the same coding parameter is used to modulate the data streams corresponding to the users 1 and 2, and a different coding parameter is used to modulate the data stream corresponding to the user 3.

As such, at least two users use the same antenna coding parameter when multiplexing is performed by a power division multiplexing method using antennas independently for individual users (5014, 5020, 5022, 5028, 5034, 5040, and 5042).

G-3. Adjustment of Transmission Factors

It is possible to adjust transmission factors that are used when signals multiplexed by a power division multiplexing method are transmitted in a communication system according to an embodiment of the present invention, as necessary. Hereinafter, methods of changing a data rate by adjusting a user's data rate, a multiple antenna transmission method, modulation parameters for each user, or coding parameters for each user will be described.

Figure 51:
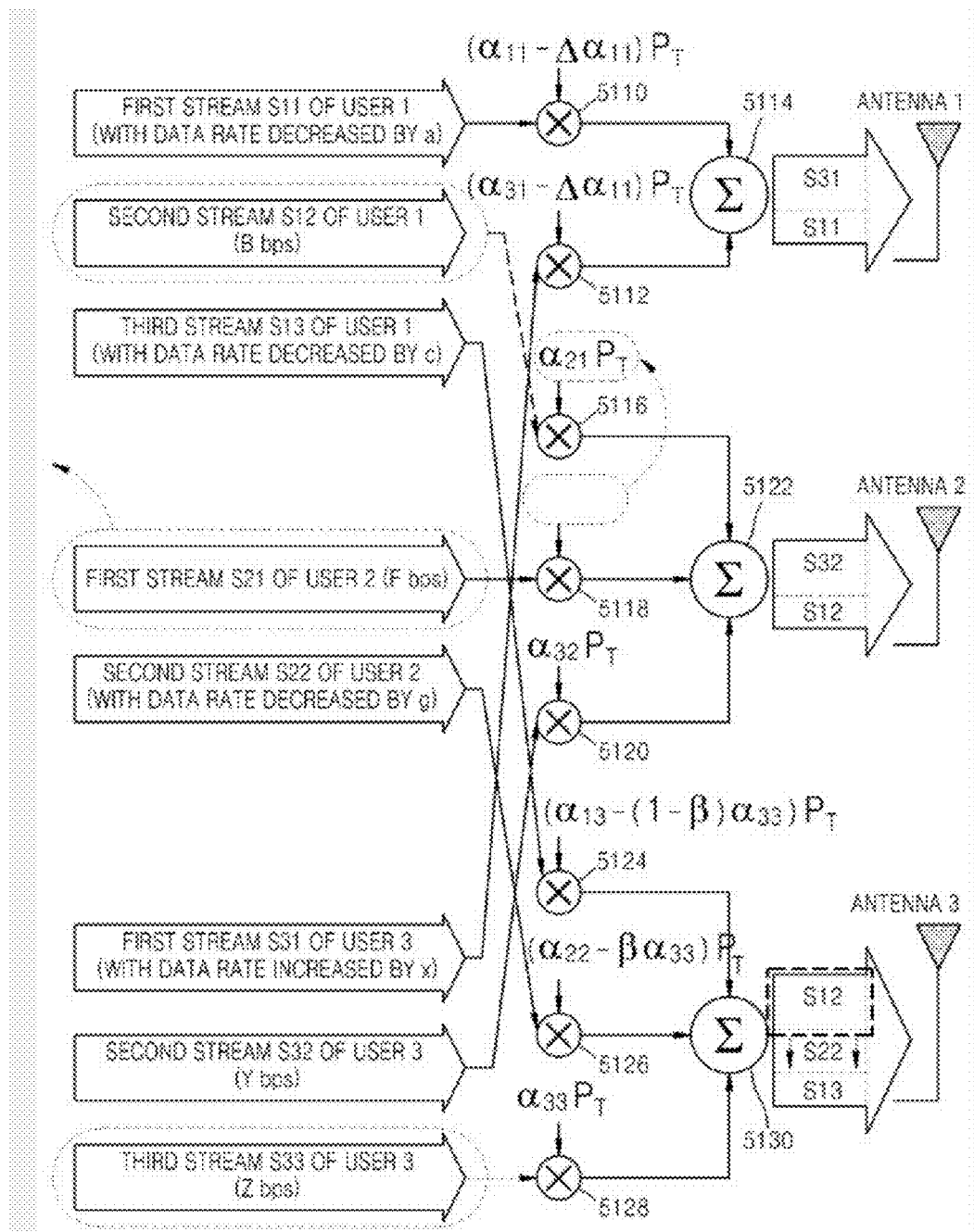
FIG. 51 is a view for explaining an example of changing another user' data rate by adjusting a user's data rate in a multiple antenna system, according to an embodiment of the present invention.

FIG. 51 is a view for explaining examples of changing another user' data rate by adjusting a user's data rate in a multiple antenna system, according to an embodiment of the present invention;

Referring to FIG. 51, examples of changing a user's data rate in three manners are shown.

The first example is a method of allocating a part of a data rate allocated to one of a plurality of users transmitting data streams through an antenna, to another user.

In more detail, a data rate allocated to a first data stream of a user 1 which is to be transmitted through an antenna 1 is decreased by a, and the newly generated data rate is used to increase a data rate for transmitting a first data stream S31 of a user 3 which is to be transmitted through the antenna 1, by x.

For this, transmission power $\alpha 11$PT allocated to transmit the first data stream S11 of the user 1 is adjusted to $(\alpha 11-\Delta\alpha 11)$PT (5110), and transmission power $\alpha 31$PT allocated to transmit the first data stream S31 of the user 2 is adjusted to $(\alpha 31+\Delta\alpha 11)$PT (5112). That is, a part $\Delta\alpha 11$PT of power allocated to transmit the first data stream S11 of the user 1 is reduced, and the reduced power $\Delta\alpha 11$PT is added to power allocated to transmit the first data stream S31 of the user 3.

As such, a data rate can be adjusted by adjusting a power allocation ratio among users when multiplexing is performed by a power division multiplexing method using antennas independently for individual users (5110, 5112, 5114, 5116, 5118, 5120, 5122, 5124, 5126, 5128, and 5130).

The second example is a method of allocating a part of a data rate allocated to each of a plurality of users transmitting data streams through an antenna to another user in order to transmit a new data stream of the other user.

In more detail, the data rate of a third data stream S13 of a user 1, which is to be transmitted through an antenna 3, is decreased by c, and the data rate of a second data stream S22 of a user 2, which is to be transmitted through the antenna 3, is decreased by g. The newly generated data rate is allocated to a user 3 to be used as a data rate for transmitting a third data stream of the user 3, which is to be additionally transmitted through the antenna 3.

For this, transmission power $\alpha 13$PT allocated to transmit the third data stream S11 of the user 1 is adjusted to $(\alpha 31-(1-\beta)\alpha 33)$PT (5124), and transmission power $\alpha 22$PT allocated to transmit the second data stream S22 of the user 2 is adjusted to $(\alpha 22-\beta\alpha 33)$PT (5126). That is, a part $(1-\beta)\alpha 33$PT of power allocated to transmit the third data stream S13 of the user 1 is reduced (5124), and a part $\beta\alpha 33$PT of power allocated to transmit the second data stream S22 of the user 2 is reduced (5126). Power corresponding to a sum of the reduced power $(1-\beta)\alpha 33$PT and $\beta\alpha 33$PT is allocated to transmit the third data stream S33 of the user 3 (5128).

As such, a data rate can be adjusted by adjusting the number of antennas and a power allocation ratio among users when multiplexing is performed by a power division multiplexing method using antennas independently for individual users (5110, 5112, 5114, 5116, 5118, 5120, 5122, 5124, 5126, 5128, and 5130).

The third example is a method of allocating a data rate allocated for one of a plurality of users transmitting data streams through an antenna to another user.

In more detail, a data rate allocated to the first data stream of the user 2, which is to be transmitted through the antenna 2, is used as a data rate for transmitting the second data stream S12 of the user 1.

For this, transmission power $\alpha 22$PT allocated to transmit the first data stream S11 of the user 2 is allocated as the transmission power for transmitting the second data stream S12 of the user 1 (5118 and 5116).

As such, a data rate can be adjusted by adjusting an antenna group and a power allocation ratio among users when multiplexing is performed by a power division multiplexing method using antennas independently for individual users (5110, 5112, 5114, 5116, 5118, 5120, 5122, 5124, 5126, 5128, and 5130).

Figure 52:
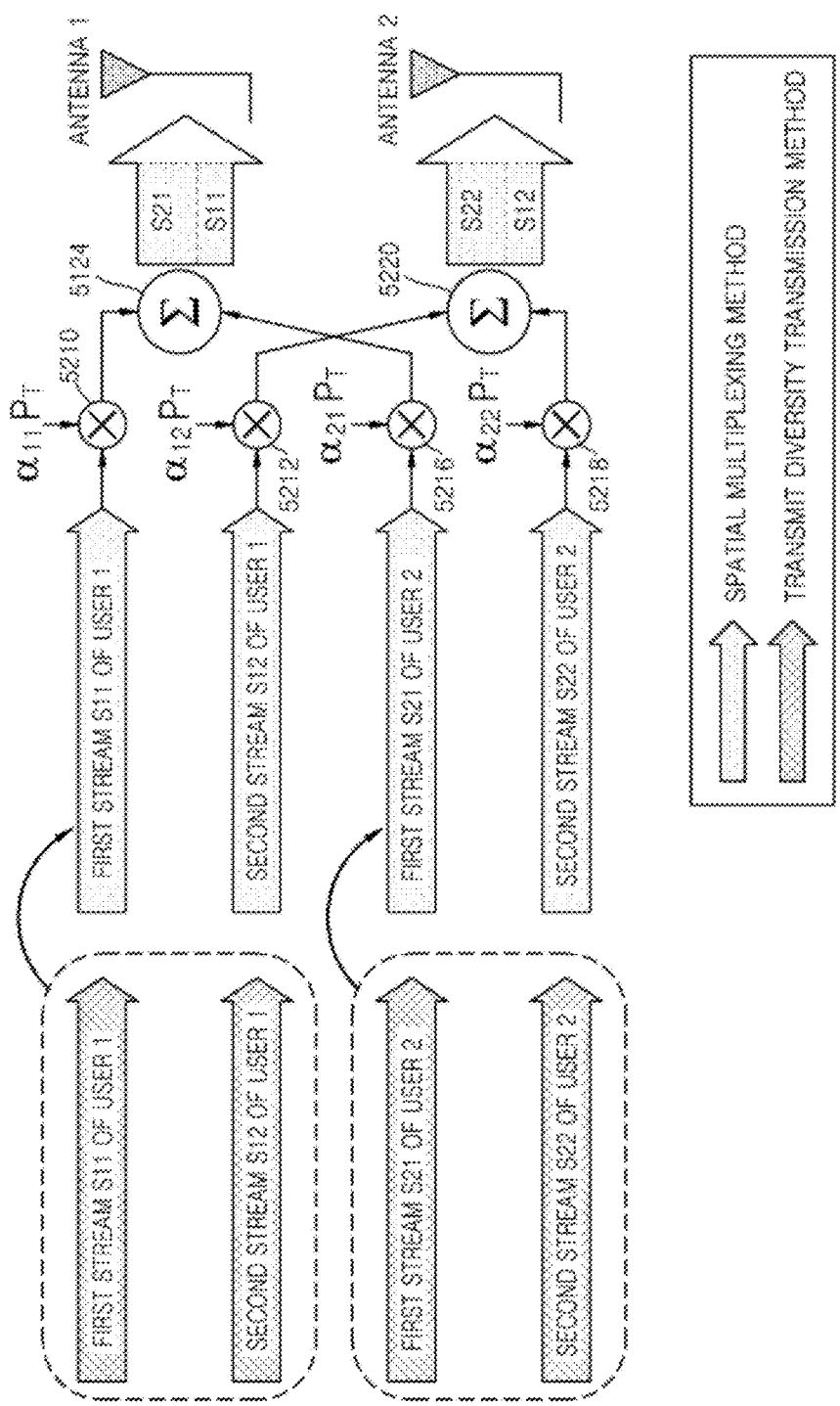
FIG. 52 is a view for explaining an example of adjusting a user's data rate by changing a multiple antenna transmission method in a multiple antenna system, according to an embodiment of the present invention.

FIG. 52 is a view for explaining an example of adjusting a user's data rate by changing a multiple antenna transmission method in a multiple antenna system, according to an embodiment of the present invention.

Referring to FIG. 52, a multiple antenna transmission method for transmitting data streams of users 1 and 2 through antennas 1 and 2 is converted from a transmit diversity transmission method to a SM method. Thereby, by sacrificing diversity gain and increasing multiplexing gain, it is possible to increase a data rate.

As such, a data rate can be adjusted using a multiple antenna transmission method when multiplexing is performed by a power division multiplexing method using antennas independently for individual users (5210, 5212, 5214, 5216, 5218, and 5220).

Also, user signals can be multiplexed by a power division multiplexing method using antenna coding parameters or antenna modulation parameters independently for individual users.

Figure 53:
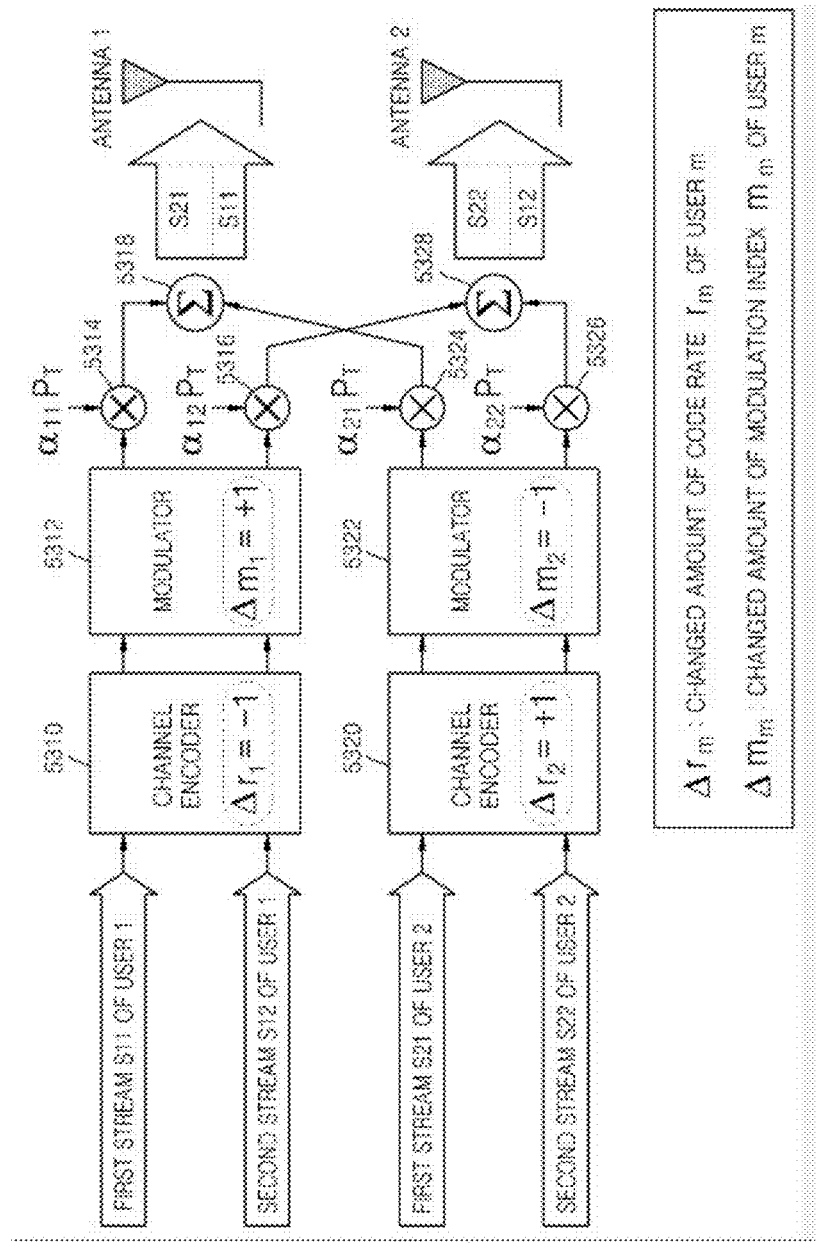
FIG. 53 is a view for explaining an example of adjusting a data rate by adjusting at least one of a user modulation parameter and a user coding parameter of each user in a multiple antenna system, according to an embodiment of the present invention.

FIG. 53 is a view for explaining an example of adjusting a data rate by adjusting at least one of a user modulation parameter and a user coding parameter in a multiple antenna system, according to an embodiment of the present invention.

Referring to FIG. 53, in order to increase the data rate of data streams S11 and S12 corresponding to a user 1, a code rate corresponding to the user 1 is decreased by one level (5310). Also, in order to decrease the data rate of data streams S21 and S22 corresponding to a user 2, a code rate corresponding to the user 2 is increased by one level (5320).

As such, a data rate can be adjusted using a coding parameter for each user when multiplexing is performed by a power division multiplexing method using antennas independently for individual users (5314, 5316, 5318, 5324, 5326, and 5328).

Also, in order to increase the data rate of data streams S11 and S12 corresponding to the user 1, a modulation index corresponding to the user 1 is increased by one level (5312). Also, in order to decrease the data rate of data streams S21 and S22 corresponding to a user 2, a modulation index corresponding to the user 2 is decreased by one level (5322).

As such, a data rate can be adjusted using a modulation parameter for each user when multiplexing is performed by a power division multiplexing method using antennas independently for individual users (5314, 5316, 5318, 5324, 5326, and 5328).

Figure 54:
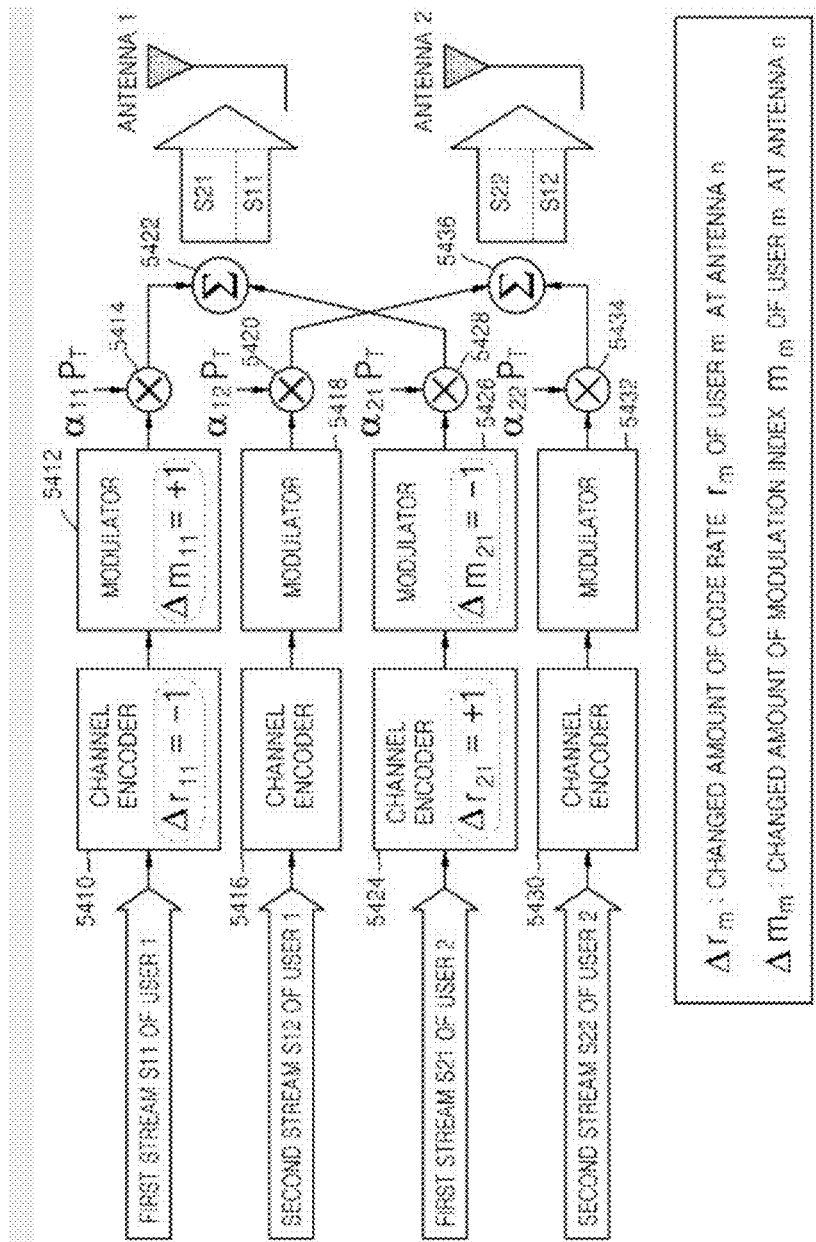
FIG. 54 is a view for explaining an example of adjusting a data rate by adjusting at least one of an antenna modulation parameter and an antenna coding parameter of each user in a multiple antenna system, according to an embodiment of the present invention.

FIG. 54 is a view for explaining an example of adjusting a data rate by adjusting at least one of an antenna modulation parameter and an antenna coding parameter of each user in a multiple antenna system, according to an embodiment of the present invention.

Referring to FIG. 54, in order to increase the data rate of a first data stream S11 corresponding to the user 1, a code rate corresponding to the first data steam S11 of the user 1 is decreased by one level (5410). Also, in order to decrease the data rate of a first data stream S21 corresponding to a user 2, a code rate corresponding to the first data stream S21 of the user 2 is increased by one level (5424).

As such, a data rate can be adjusted using an antenna coding parameter for each user when multiplexing is performed by a power division multiplexing method using antennas independently for individual users (5414, 5420, 5428, 5434, 5422, and 5436).

Meanwhile, in order to increase the data rate of the first data stream S11 corresponding to the user 1, a modulation index corresponding to the first data stream S11 of the user 1 is increased by one level (5412). Also, in order to decrease the data rate of the first data stream S21 corresponding to the user 2, a modulation index corresponding to the first data stream S21 of the user 2 is decreased by one level (5426).

As such, a data rate can be adjusted using an antenna modulation parameter for each user when multiplexing is performed by a power division multiplexing method using antennas independently for individual users (5414, 5420, 5428, 5434, 5422, and 5436).

G-4. Definition and Decision of Transmission Factors

Hereinafter, methods of deciding coding parameters and modulation parameters that are used to transmit signals multiplexed by a power division multiplexing method in a multiple antenna system, according to embodiments of the present invention, will be described below.

Figure 55:
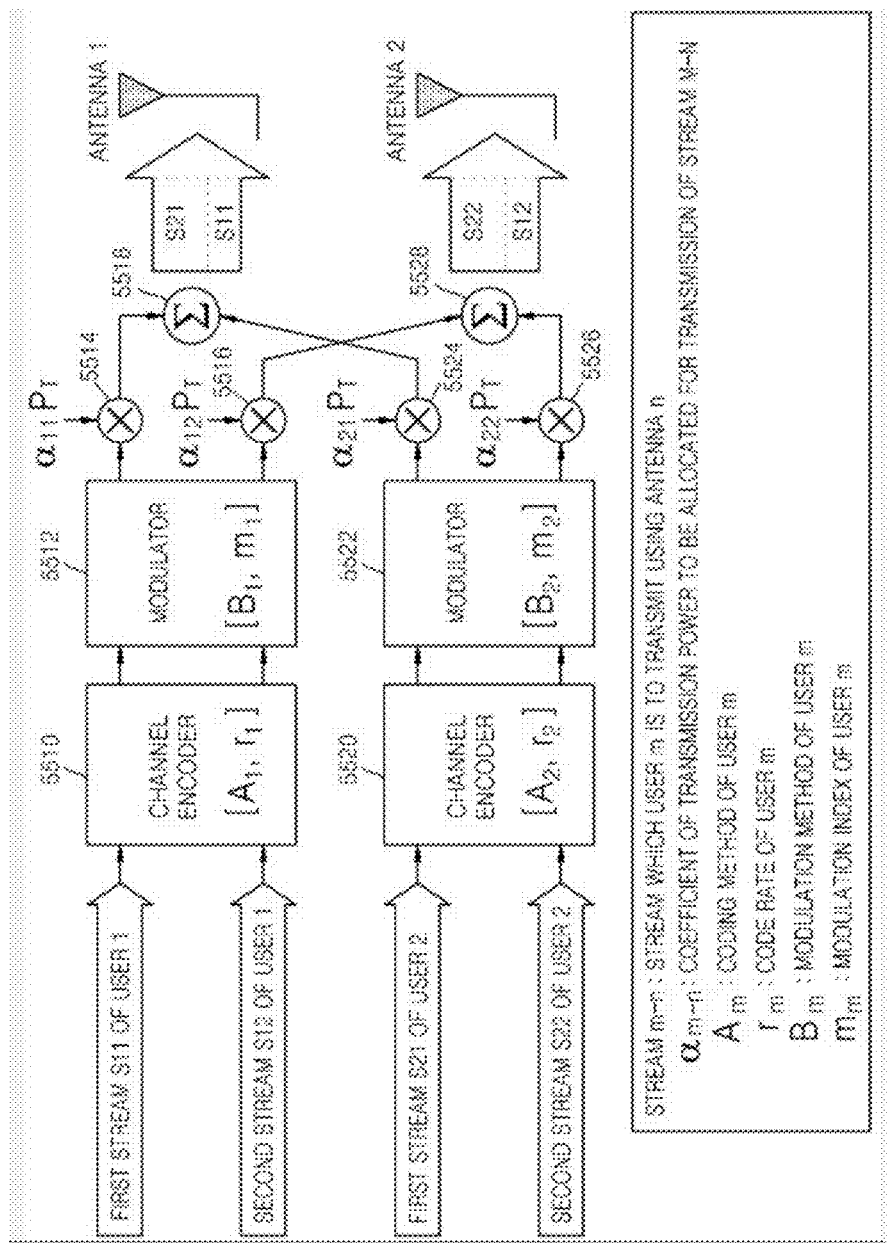
FIG. 55 is a view for explaining an example of defining a user modulation parameter and a user coding parameter that are used to transmit signals multiplexed by a power division multiplexing method in a multiple antenna system, according to an embodiment of the present invention.

FIG. 55 is a view for explaining an example of defining a user modulation parameter and a user coding parameter that are used to transmit signals multiplexed by a power division multiplexing method in a multiple antenna system, according to an embodiment of the present invention.

Referring to FIG. 55, a user modulation parameter of a user m can be defined as [Bm, mm] including a modulation method Bm and a modulation index mm. As such, a user modulation parameter of each user can include at least one of a modulation method and a modulation index when multiplexing is performed by a power division multiplexing method using antennas independently for individual users (5514, 5516, 5518, 5524, 5526, and 5528).

Meanwhile, a user coding parameter of the user m can be defined as [Am, rm] including a coding method Am and a code rate rm. As such, a user coding parameter of each user can include at least one of a coding method and a code rate when multiplexing is performed by a power division multiplexing method using antennas independently for individual users (5514, 5516, 5518, 5524, 5526, and 5528).

Figure 56:
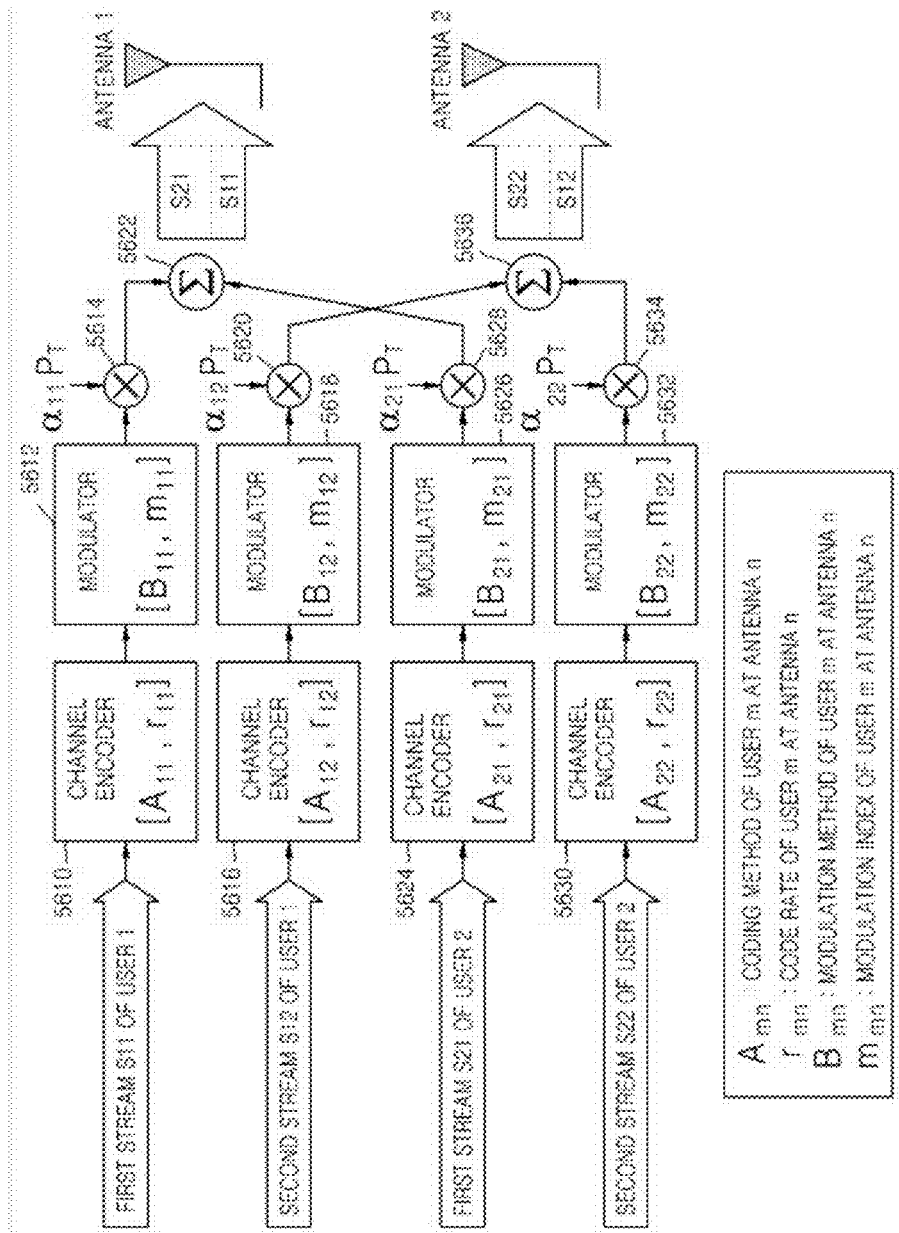
FIG. 56 is a view for explaining an example of defining an antenna modulation parameter and an antenna coding parameter that are used to transmit signals multiplexed by a power division multiplexing method in a multiple antenna system, according to an embodiment of the present invention.

FIG. 56 is a view for explaining an example of defining an antenna modulation parameter and an antenna coding parameter that are used to transmit signals multiplexed by a power division multiplexing method in a multiple antenna system, according to an embodiment of the present invention;

Referring to FIG. 56, an antenna modulation parameter of a user m who is to use an antenna n can be defined as [Bmn, mmn] including a modulation method Bmn and a modulation index mmn. As such, an antenna modulation parameter of each user can include at least one of a modulation method and a modulation index when multiplexing is performed by a power division multiplexing method using antennas independently for individual users (5614, 5620, 5622, 5628, 5634, and 5636).

Meanwhile, an antenna coding parameter of the user m who is to use the antenna n can be defined as [Amn, rmn] including a coding method Amn and a code rate rmn. As such, an antenna coding parameter of each user can include at least one of a coding method and a code rate when multiplexing is performed by a power division multiplexing method using antennas independently for individual users (5614, 5620, 5622, 5628, 5634, and 5636).

G-5. Allocation of Transmission Power for Each Antenna

Hereinafter, power division multiplexing methods of independently allocating transmission power for each antenna, according to embodiments of the present invention, will be described.

Figure 57:
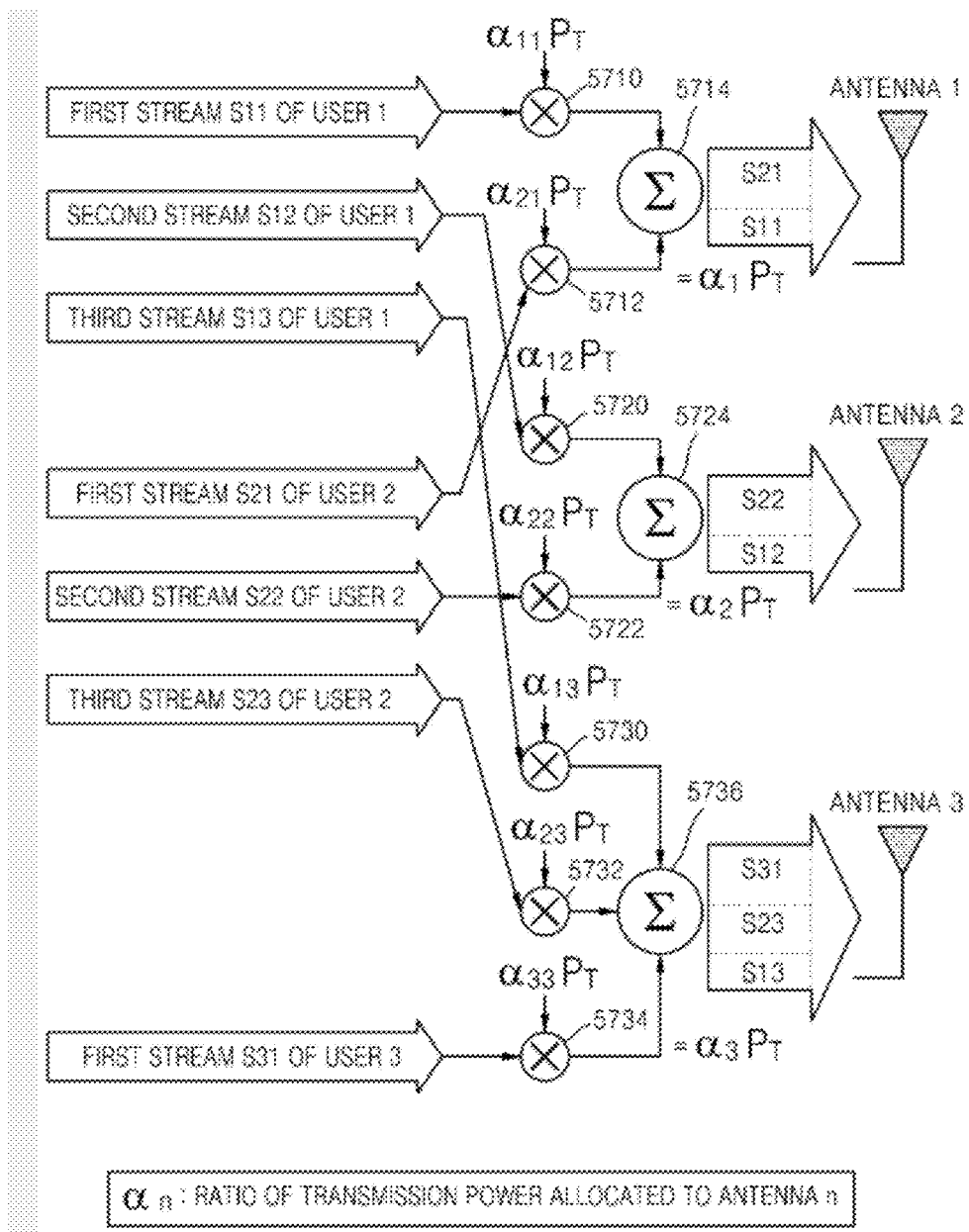
FIG. 57 is a view for explaining an example of independently allocating the total transmission power to individual antennas, the total transmission power used to transmit signals multiplexed by a power division multiplexing method, in a multiple antenna system, according to an embodiment of the present invention.

FIG. 57 is a view for explaining an example of independently allocating the total transmission power for each antenna, which is used to transmit signals multiplexed by a power division multiplexing method in a multiple antenna system, according to an embodiment of the present invention.

Referring to FIG. 57, transmission power $\alpha 1PT$, $\alpha 2PT$, and $\alpha 3PT$ are independently allocated to antennas 1, 2, and 3, respectively, in the range of total transmission power PT (5710, 5712, 5714, 5720, 5722, 5724, 5730, 5732, 5734, and 5736). At this time, total transmission power of the antenna 1 is divided to $\alpha 11PT$ and $\alpha 21PT$, and the transmission power $\alpha 11PT$ and $\alpha 21PT$ are allocated to the users 1 and 2, respectively (5710 and 5712). Total transmission power of the antenna 2 is divided to α12PT and α22PT, and the transmission power α12PT and α22PT are allocated to the users 1 and 2, respectively (5720 and 5722). Also, total transmission power of the antenna 3 is divided to α13PT, α23PT, and α33PT, and the transmission power α13PT, α23PT, and α33PT are allocated to the users 1, 2, and 3, respectively (5730, 5732, and 5734).

As such, the total transmission power for each antenna can be independently allocated when multiplexing is performed by a power division multiplexing method using antennas independently for individual users (5710, 5712, 5714, 5720, 5722, 5724, 5730, 5732, 5734, and 5736).

Figure 58:
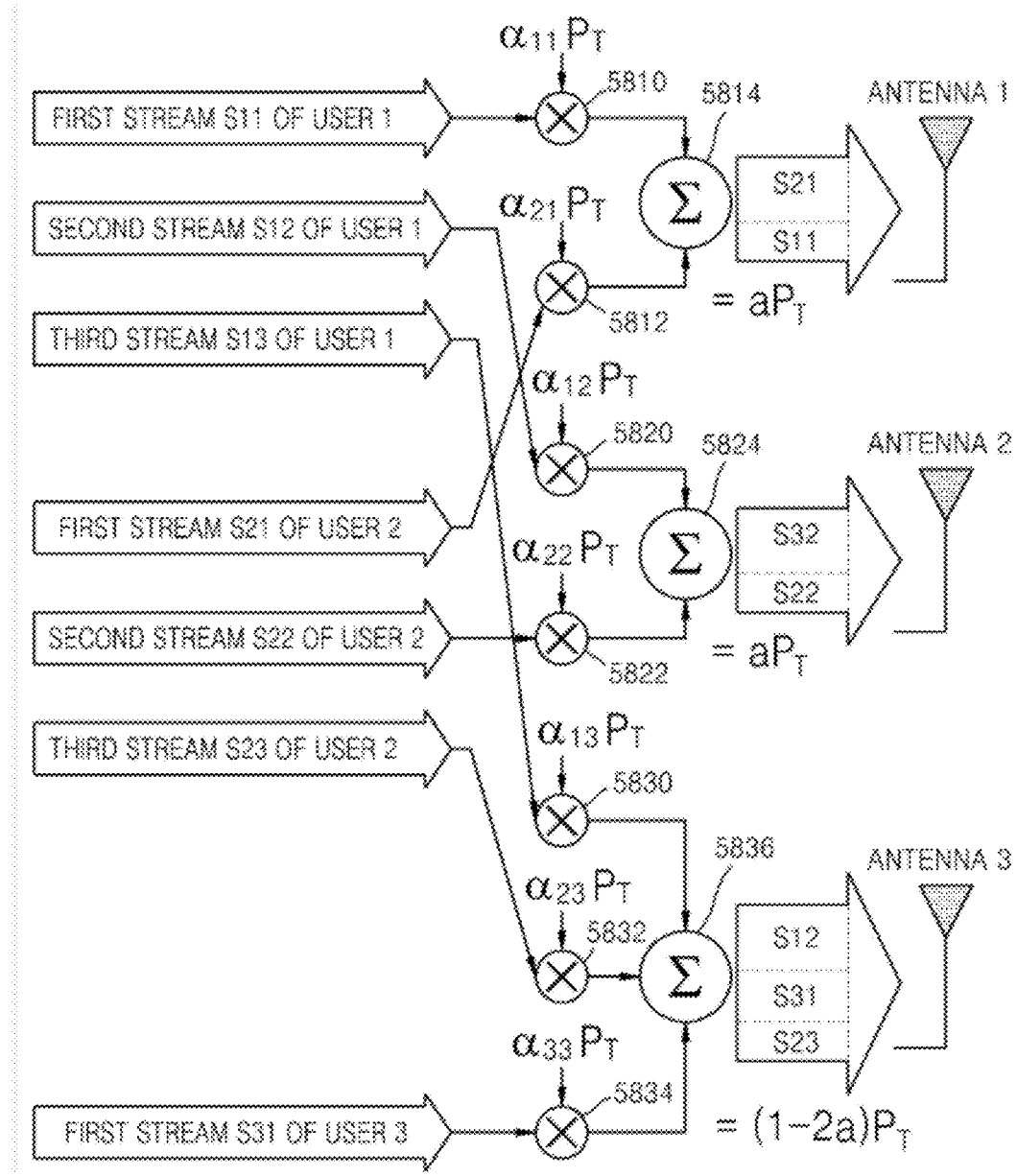
FIG. 58 is a view for explaining an example of equally allocating the total antenna transmission power to at least two antennas in order to transmit signals multiplexed by a power division multiplexing method in a multiple antenna system, according to an embodiment of the present invention.

FIG. 58 is a view for explaining an example of equally allocating total antenna transmission power to at least two antennas in order to transmit signals multiplexed by a power division multiplexing method in a multiple antenna system, according to an embodiment of the present invention.

Referring to FIG. 58, transmission power aPT is allocated as total transmission power of each of antennas 1 and 2 (5810, 5812, 5814, 5820, 5822, and 5824), and the remaining transmission power (1−2a)PT is allocated as total transmission power of an antenna 3 (5830, 5832, 5834, and 5836). As such, the total transmission power for each antenna can be equally allocated to at least two antennas when multiplexing is performed by a power division multiplexing method using antennas independently for individual users (5810, 5812, 5814, 5820, 5822, 5824, 5830, 5832, 5834, and 5836).

G-6. Transmission Method with at Least One of Antenna not Supporting Power Division Multiplexing In the present disclosure, the case where a power division multiplexing method is applied when there is at least one antenna that does not use a power division multiplexing method is considered.

Figure 59:
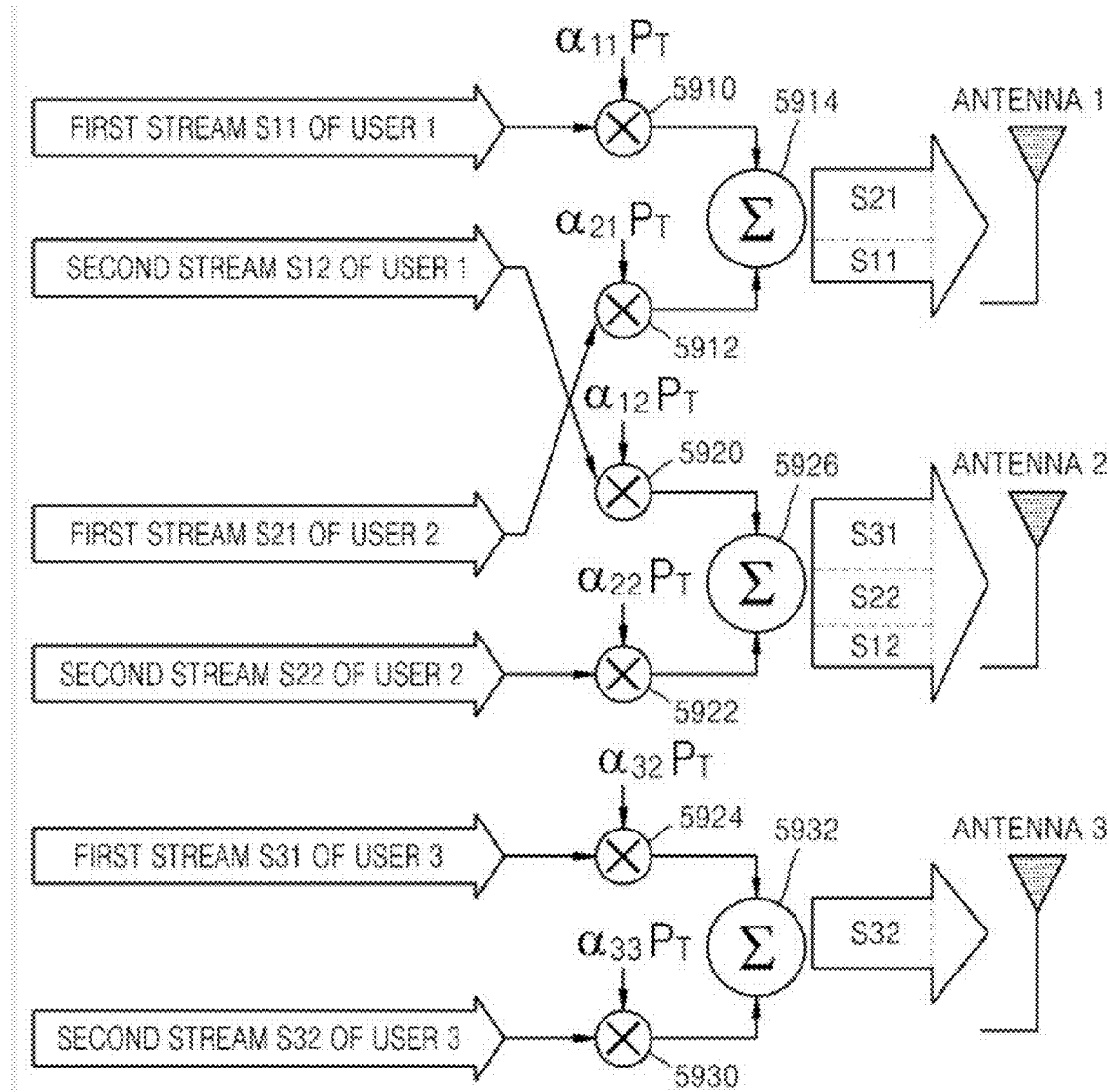
FIG. 59 is a view for explaining an example of a transmission method when an antenna that does not perform multiplexing by a power division multiplexing method is included in a multiple antenna system, according to an embodiment of the present invention.

FIG. 59 is a view for explaining an example of a transmission method when an antenna that does not perform multiplexing by a power division multiplexing method is included in a multiple antenna system, according to an embodiment of the present invention.

Referring to FIG. 59, users 1 and 2 transmit data streams through antennas 1 and 2, and a user 3 transmits data streams through antennas 2 and 3. At this time, the data streams corresponding to the user 3 are transmitted without multiplexing by the power division multiplexing method since the data streams are transmitted using the antenna 3 independently. As such, the power division multiplexing method can be applied to the case where only a single user is assigned to an antenna when multiplexing is performed by the power division multiplexing method using antennas independently for individual users (5910, 5912, 5914, 5920, 5922, 5924, 5926, 5930, and 5932).

Figure 60:
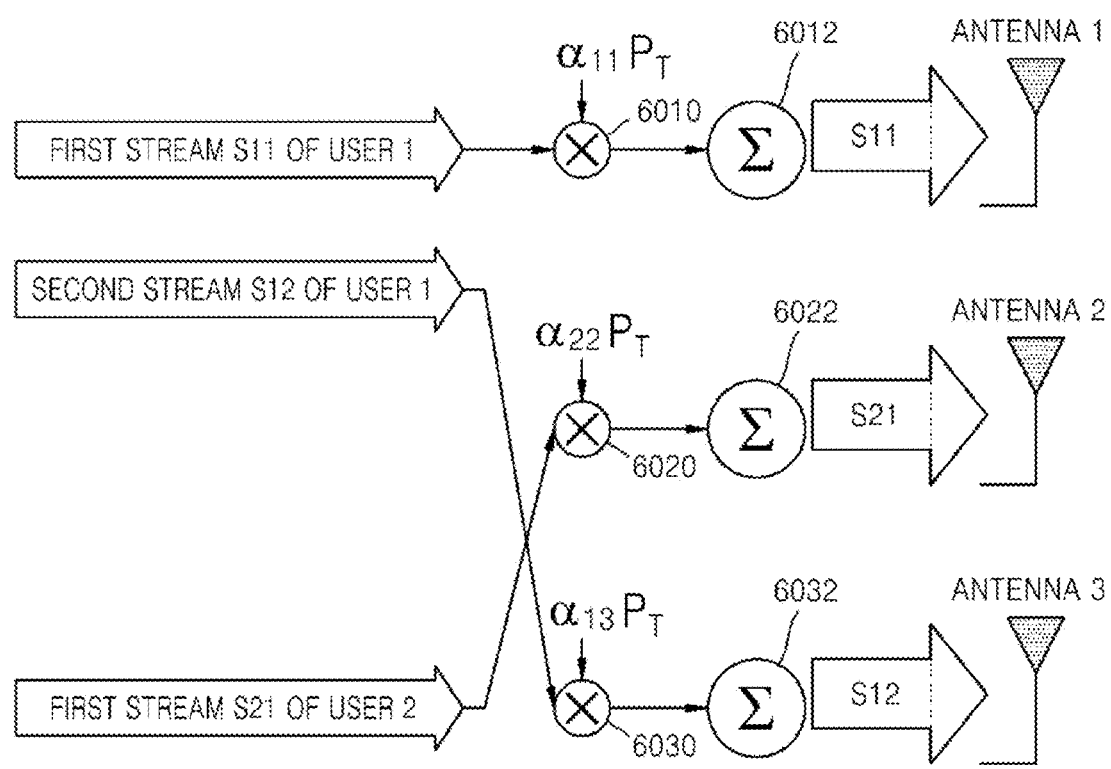
FIG. 60 is a view for explaining an example in which antenna groups of individual users are arranged not to overlap in order to transmit signals multiplexed by a power division multiplexing method in a multiple antenna system, according to an embodiment of the present invention.

FIG. 60 is a view for explaining an example in which antenna groups of individual users are arranged not to overlap in order to transmit signals multiplexed by a power division multiplexing method in a multiple antenna system, according to an embodiment of the present invention.

Referring to FIG. 60, a user 1 uses antennas 1 and 3 independently (6010, 6012, 6030, and 6032), and a user 2 uses an antenna 2 independently (6020 and 6022). In this way, antenna groups of individual users can be arranged not to overlap. As such, antenna groups of individual users can be arranged not to overlap when multiplexing is performed by a power division multiplexing method using antennas independently for individual users (6010, 6012, 6020, 6022, 6030, and 6032).

A number of examples have been described above. Nevertheless, it will be understood that various modifications can be made. For example, suitable results can be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of simultaneously transmitting a plurality of signals to a plurality of user groups using at least one antenna group in a communication system, comprising:

assigning the at least one antenna group to the plurality of user groups;

generating a user group signal by combining user signals for each user group using a user multiplexing method;

combining a plurality of user group signals using a group multiplexing method; and transmitting the combined plurality of user group signals to a plurality of users belonging to the plurality of user groups using the at least one antenna group, wherein the plurality of user group signals are different from each other in terms of at least one of channel condition factors, service condition factors, user condition factors, and transmission condition factors, wherein the channel condition factors include at least one of quality factors related to channel characteristics, and quality factors related to spatial characteristics;

wherein the service condition factors include at least one of Quality-of-Service (QoS), a traffic class, and a location;

wherein the user condition factors include at least one of the cost, the terminal capability, and a security level; and wherein the transmission condition factors include at least one of the user multiplexing method, a group combining weight vector, an antenna group, a duplexing method, a multiple access method, a modulation method, a channel coding method, and a Multiple-Input Multiple-Output (MIMO) transmission method, wherein the quality factors related to channel characteristics include at least one of a Received Signal Strength Indicator (RSSI), a Signal-to-Noise Ratio (SNR), a Received Signal Strength Indicator (SINR), an error rate, a channel capacity, a providable data rate, the variance of a providable data rate, and an outage rate; and the quality factors related to spatial characteristics include at least one of the correlation among user channels, the correlation among antennas, a rank of a channel matrix, and channel quality factors for each stream.

2. The communication method of claim 1, wherein in the configuring of the plurality of user groups, each user group is configured to include at least one user of the plurality of users for the purpose of at least one among transmission through the efficient use of resources, multicasting, channel-adaptive transmission, spatial division transmission among groups, and transmission differentiation among groups, and in the transmission differentiation among the groups, at least one among a Received Signal Strength Indicator (RSSI), a Signal-to-Noise Ratio (SNR), a Signal-to-Interference plus Noise Ratio (SINR), an error rate, a channel capacity, a providable data rate, the variance of a providable data rate, an outage rate, the correlation among user channels, the correlation among antennas, a channel rank, channel quality factors for individual streams, the use of channel quality information, and the use of channel state information, according to channel conditions; Quality-of-Service (QoS), a traffic class, and a location, according to service conditions; the cost, the terminal capability, and a security level, according to user conditions; and a transmission method, the user multiplexing method, the group multiplexing method, group combining codes, group combining weight vectors, antenna groups, the transmission power, layer priorities, modulation parameters, and coding parameters, according to transmission conditions is differentiated among the plurality of user groups and transmitted.

3. The communication method of claim 1, wherein the generating of the user group signal comprises combining a plurality of user signals for each user group using the user multiplexing method among a power division multiplexing method, a code division multiplexing method, and a spatial division multiplexing method, and wherein the combining of the plurality of user group signals comprises combining a plurality of user group signals, each user group signal to which a plurality of user signals have been combined, using the group multiplexing method among a power division multiplexing method, a code division multiplexing method, and a spatial division multiplexing method.

4. The communication method of claim 1, wherein transmission factors for each antenna are used independently over a plurality of antennas, or at least one of transmission factors for each antenna is used over a plurality of antennas in common, in order to simultaneously transmit the plurality of signals to the plurality of user groups using the at least one antenna group.

5. The communication method of claim 1, wherein in the generating of the user group signal, at least one of transmission factors for each user signal is used independently over the plurality of user signals, or at least one of transmission factors for each user signal is used over the plurality of user signals in common.

6. The communication method of claim 1, wherein in the combining of the plurality of user group signals, at least one of transmission factors for each user group signal is used independently over the plurality of user group signals, or at least one of transmission factors for each user group signal is used over the plurality of user group signals in common.

7. A communication apparatus of simultaneously transmitting a plurality of signals to a plurality of user groups using at least one antenna group in a communication system, comprising:

a transmitting apparatus configured to assign at least one antenna group to a plurality of user groups, to generate a user group signal by combining user signals for each user group using a user multiplexing method, to combine a plurality of user group signals using a group multiplexing method, and to transmit the combined plurality of user group signals to a plurality of users belonging to the plurality of user groups using the at least one antenna group;

wherein the plurality of user group signals are different from each other in terms of at least one of channel condition factors, service condition factors, user condition factors, and transmission condition factors, wherein the channel condition factors include at least one of quality factors related to channel characteristics, and quality factors related to spatial characteristics;

wherein the service condition factors include at least one of Quality-of-Service (QoS), a traffic class, and a location;

wherein the user condition factors include at least one of the cost, the terminal capability, and a security level; and wherein the transmission condition factors include at least one of the user multiplexing method, a group combining weight vector, an antenna group, a duplexing method, a multiple access method, a modulation method, a channel coding method, and a Multiple-Input Multiple-Output (MIMO) transmission method, wherein the quality factors related to channel characteristics include at least one of a Received Signal Strength Indicator (RSSI), a Signal-to-Noise Ratio (SNR), a Received Signal Strength Indicator (SINR), an error rate, a channel capacity, a providable data rate, the variance of a providable data rate, and an outage rate; and the quality factors related to spatial characteristics include at least one of the correlation among user channels, the correlation among antennas, a rank of a channel matrix, and channel quality factors for each stream.

8. The communication apparatus of claim 7, wherein the transmitting apparatus configures the plurality of user groups such that each user group includes at least one user of the plurality of users for the purpose of at least one among transmission through the efficient use of resources, multicasting, channel-adaptive transmission, spatial division transmission among groups, and transmission differentiation among groups, and in the transmission differentiation among the groups, at least one of a Received Signal Strength Indicator (RSSI), a Signal-to-Noise Ratio (SNR), a Signal-to-Interference plus Noise Ratio (SINR), an error rate, a channel capacity, a providable data rate, the variance of a providable data rate, an outage rate, the correlation among user channels, the correlation among antennas, a channel rank, channel quality factors for individual streams, the use of channel quality information, and the use of channel state information, according to channel conditions; Quality-of-Service (QoS), a traffic class, and a location, according to service conditions; the cost, the terminal capability, and a security level, according to user conditions; and a transmission method, the user multiplexing method, the group multiplexing method, group combining codes, group combining weight vectors, antenna groups, the transmission power, layer priorities, modulation parameters, and coding parameters, according to transmission conditions is differentiated among the plurality of user groups and transmitted.

9. The communication apparatus of claim 7, wherein the transmitting apparatus assigns the at least one antenna group such that at least two user groups of the plurality of user groups share at least one antenna group, or such that at least one antenna group is independently assigned to each of all or a part of the plurality of user groups.

10. The communication apparatus of claim 9, wherein a plurality of user signals for each user group independently use at least one antenna group assigned to the user group.

11. The communication apparatus of claim 7, wherein the transmitting apparatus generates the user group signal by combining a plurality of user signals for each user group using the user multiplexing method among a power division multiplexing method, a code division multiplexing method, and a spatial division multiplexing method, and the transmitting apparatus combines the plurality of user group signals using the group multiplexing method of the power division multiplexing method, the code division multiplexing method, and the spatial division multiplexing method.

12. The communication apparatus of claim 11, wherein at least one user group signal of the plurality of user group signals is generated by combining at least two user group signals.

13. The communication apparatus of claim 11, wherein the spatial division multiplexing method is one of a precoding method, a dirty-paper coding (DPC) method, a spatial multiplexing method, a beamforming method, an antenna selection method, a transmit diversity method, and an antenna group division method.

14. The communication apparatus of claim 7, wherein the transmitting apparatus uses independently transmission factors for each antenna over a plurality of antennas, or uses at least one of transmission factors for each antenna over a plurality of antennas in common.

15. The communication apparatus of claim 14, wherein the transmission factors for each antenna are at least one among the number of users for each antenna, the number of layers for each antenna, layer priorities for each antenna, a data rate of each antenna, the data rate of each user signal for each antenna, the transmission power of each antenna, the transmission power of each user signal for each antenna, modulation parameters of each user signal for each antenna, and coding parameters of each user signal for each antenna.

16. The communication apparatus of claim 7, wherein the transmitting apparatus uses independently at least one of transmission factors for each user signal over the plurality of user signals, or uses at least one of transmission factors for each user signal over the plurality of user signals in common.

17. The communication apparatus of claim 16, wherein the transmission factors for each user signal are at least one among a data rate for each user signal, an antenna data rate for each user signal, an antenna group for each user signal, the number of antennas for each user signal, the transmission power for each user signal, the antenna transmission power for each user signal, modulation parameters for each user signal, and coding parameters for each user signal.

18. The communication apparatus of claim 7, wherein the transmitting apparatus uses independently at least one of transmission factors for each group user signal over the plurality of user group signals, or uses at least one of transmission factors for each user group signal over the plurality of user group signals in common.

19. The communication apparatus of claim 18, wherein the transmission factors for each user group signal are at least one among a data rate for each user group signal, an antenna group for each user group signal, the transmission power for each user group signal, a transmission method for each user group signal, the user multiplexing method for each user group signal, the group multiplexing method for each user group signal, a group combining code for each user group signal, a group combining weight vector for each user group signal, layer priorities for each user group signal, modulation parameters for each user group signal, and coding parameters for each user group signal.

* * * * *